(12) United States Patent
Park et al.

(10) Patent No.: US 10,871,701 B2
(45) Date of Patent: Dec. 22, 2020

(54) LENS DRIVING DEVICE, AND CAMERA MODULE AND OPTICAL DEVICE, WHICH INCLUDE SAME

(71) Applicant: LG INNOTEK CO., LTD., Seoul (KR)

(72) Inventors: Tae Bong Park, Seoul (KR); Jun Taek Lee, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 163 days.

(21) Appl. No.: 16/319,063

(22) PCT Filed: Jul. 11, 2017

(86) PCT No.: PCT/KR2017/007399
§ 371 (c)(1),
(2) Date: Jan. 18, 2019

(87) PCT Pub. No.: WO2018/016790
PCT Pub. Date: Jan. 25, 2018

(65) Prior Publication Data
US 2020/0209710 A1    Jul. 2, 2020

(30) Foreign Application Priority Data

Jul. 21, 2016   (KR) .................. 10-2016-0092608
Sep. 27, 2016   (KR) .................. 10-2016-0123835

(51) Int. Cl.
*G03B 3/10* (2006.01)
*G02B 7/09* (2006.01)
(Continued)

(52) U.S. Cl.
CPC ................. *G03B 3/10* (2013.01); *G02B 7/09* (2013.01); *H04N 5/2254* (2013.01); *G03B 2205/0069* (2013.01); *H04N 5/335* (2013.01)

(58) Field of Classification Search
CPC ........... G03B 3/10; G02B 7/09; H04N 5/2254
See application file for complete search history.

(56) References Cited

U.S. PATENT DOCUMENTS

| 2013/0016428 A1 | 1/2013 | Sugawara et al. |
| 2013/0121652 A1 | 5/2013 | Taniguchi et al. |
| 2015/0153539 A1* | 6/2015 | Yoo ...................... H04N 5/2254 348/373 |

FOREIGN PATENT DOCUMENTS

| EP | 3 021 158 A1 | 5/2016 |
| EP | 3 045 949 A1 | 7/2016 |
(Continued)

OTHER PUBLICATIONS

International Search Report in International Application No. PCT/KR2017/007399, filed Jul. 11, 2017.
(Continued)

*Primary Examiner* — Minh Q Phan
(74) *Attorney, Agent, or Firm* — Saliwanchik, Lloyd & Eisenschenk

(57) ABSTRACT

An embodiment comprises: a housing; a bobbin, accommodated inside the housing, for mounting a lens; a first coil arranged on an outer peripheral surface of the bobbin; magnets arranged in the housing; a coil board which comprises second coils arranged below the housing and arranged so as to be spaced from each other and connection parts connected to the second coils; a circuit board, which is arranged below the coil board and comprises first pad parts arranged at locations corresponding to the connection parts; and a conductive adhesive member for bonding the connection part and the first pad part, which correspond to each other, wherein each of the connection parts comprises a groove part depressed from the outer surface of the coil board, and exposing any one corresponding upper surface among the first pad parts, and a bonding part prepared around the groove part, and the conductive adhesive member is arranged on the upper surface of the bonding part and on the upper surface of the first pad part exposed by the (Continued)

groove part and electrically connects the bonding part with the first pad part.

20 Claims, 33 Drawing Sheets

(51) Int. Cl.
    *H04N 5/225*     (2006.01)
    *H04N 5/335*     (2011.01)

(56) References Cited

FOREIGN PATENT DOCUMENTS

| | | |
|---|---|---|
| JP | 2013-024944 A | 2/2013 |
| JP | 2014-149550 A | 8/2014 |
| JP | 2015-034911 A | 2/2015 |
| KR | 10-2008-0046819 A | 5/2008 |
| KR | 10-2015-0009685 A | 1/2015 |
| KR | 10-2016-0000728 A | 1/2016 |
| KR | 10-2016-0008860 A | 1/2016 |

OTHER PUBLICATIONS

Supplementary European Search Report dated Jul. 5, 2019 in European Application No. 17831263.3.

\* cited by examiner

FIG. 26
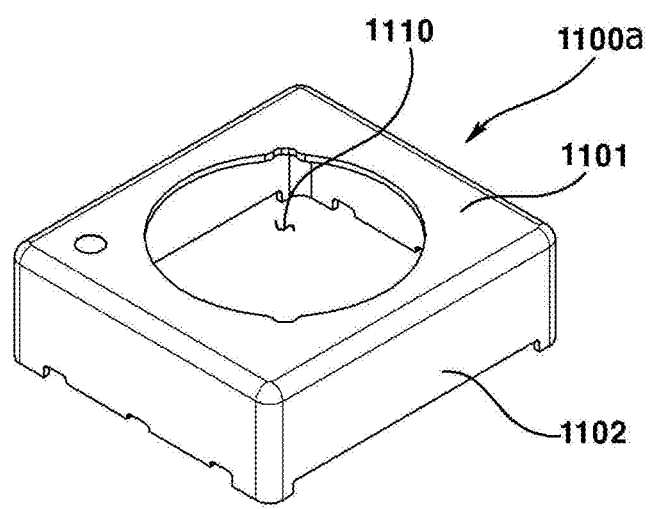
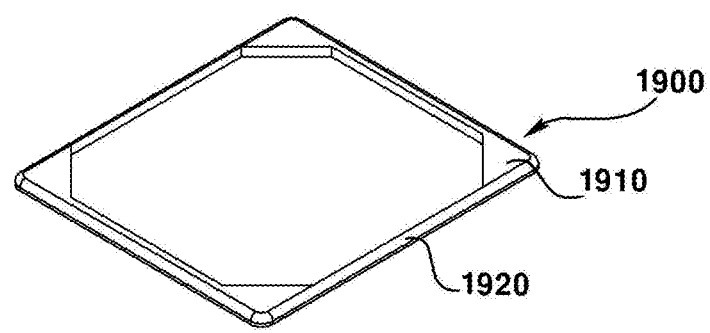
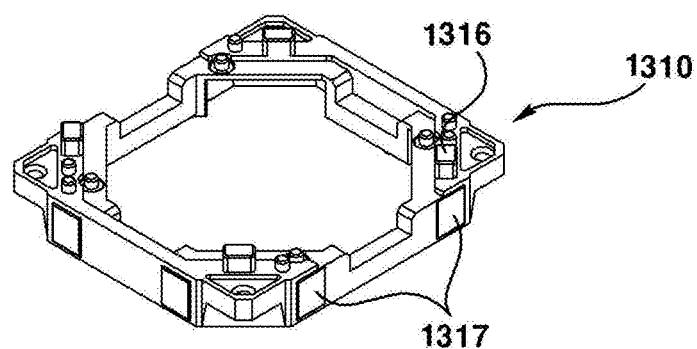

LENS DRIVING DEVICE, AND CAMERA MODULE AND OPTICAL DEVICE, WHICH INCLUDE SAME

CROSS-REFERENCE TO RELATED APPLICATIONS

This application is the U.S. national stage application of International Patent Application No. PCT/KR2017/007399, filed Jul. 11, 2017; which claims the benefit under 35 U.S.C. § 119 of Korean Application Nos. 10-2016-0092608, filed Jul. 21, 2016, and 10-2016-0123835, filed Sep. 27, 2016; the disclosures of each of which are incorporated herein by reference in their entirety.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a micro-scale, low-power camera module, and studies related thereto have been actively conducted.

The demand for electronic products, such as smartphones and cellular phones equipped with cameras, is increasing. The trend is for a camera for a cellular phone to become high-resolution and miniaturized, and the associated actuator is correspondingly developed so as to realize miniaturization, a large aperture and multiple functions. In order to realize a high-resolution camera for a cellular phone, there are demands for increased performance of the camera for a cellular phone and for additional functions, such as autofocusing, reduction in shaking of a shutter, zooming and the like.

DISCLOSURE

Technical Problem

Embodiments provide a lens moving apparatus capable of inhibiting electrical short between solders and support members, damage to bonding portions of a coil board and generation of cracks in solders, and a camera module and an optical device each including the lens moving apparatus.

Furthermore, embodiments provides a lens moving apparatus, which is provided with a mechanical stopper for a housing disposed in a driving direction of the housing, and a camera module and an optical device each including the lens apparatus.

Technical Solution

A lens moving apparatus according to an embodiment comprises a housing; a bobbin accommodated in the housing, a lens being mounted on the bobbin; a first coil disposed on an outer peripheral surface of the bobbin; magnets disposed on the housing; a coil board comprising second coils disposed under the housing so as to be spaced apart from each other and connectors connected to the second coils; a circuit board disposed under the coil board and comprising first pads disposed at positions corresponding to the connectors; and a conductive adhesive member for bonding the first pads to the corresponding connectors, wherein each of the connectors comprises a recess, which is depressed from an outer surface of the coil board so as to expose an upper surface of a corresponding one of the first pads, and a bonding portion disposed near the recess, and wherein the conductive adhesive member is disposed on an upper surface of the bonding portion and an upper surface of the first pad which is exposed through the recess so as to conductively connect the bonding portion to the first pad.

The conductive adhesive member may be solder or conductive paste, the conductive adhesive member may be spaced apart from an outer surface of the circuit board and positioned inside the outer surface of the circuit board, and the conductive adhesive member may protrude from an upper surface of the coil board in a direction toward the coil board from the circuit board.

The bonding portion of the coil board may be disposed so as to be aligned with a corresponding one of the first pads in a direction parallel to an optical axis.

A lower surface of the conductive adhesive member may cover the upper surface of the pad of the circuit board and the upper surface of the bonding portion of the coil board, and an upper surface of the conductive adhesive member may be positioned higher than an upper surface of the coil board.

The lens moving apparatus may further include upper elastic members coupled both to an upper portion of the bobbin and to an upper portion of the housing; a lower elastic member coupled both to a lower portion of the bobbin and to a lower portion of the housing; and support members disposed on side portions of the housing, wherein each of the support members include an upper terminal portion, a lower terminal portion, and an elastic deformation portion connecting the upper terminal portion to the lower terminal portion, and wherein each of the upper terminal portions of the support members is connected to a corresponding one of the upper elastic members.

The circuit board may further include second pads, which are spaced apart from the first pads and connected to at least one of the lower terminal portions of the support members, at least one side of an upper surface of the circuit board may be provided with two first pads, which are spaced apart from each other, and two second pads, which are spaced apart from each other, and the two second pads may be positioned between the two first pads.

The coil board may further include wires or patterns connecting the second coils to the bonding portions of the connectors.

The recess may be provided in a first region of at least one side of an upper surface of the coil board, the at least one side of the upper surface of the coil board may be provided with a second region, which is a remaining region excluding the first region, and the first region is depressed lower than the second region.

A first surface of the conductive adhesive member that faces toward the outer surface of the circuit board may be a flat surface, a second surface of the conductive adhesive member may be a curved surface, and the second surface of the conductive adhesive member may face the first surface of the conductive adhesive member.

The lens moving apparatus may further include a cover member including a top plate and a side plate; and a base disposed under the circuit board, wherein the housing comprises a stopper protruding from an upper surface of a corner of the housing, wherein the cover member comprises a depressed portion, which is formed by depressing a corner of the top plate, and wherein the stopper overlaps at least part of the depressed portion in a direction perpendicular to an optical axis.

Advantageous Effects

Embodiments are capable of inhibiting electrical shorts between solders and support members, damage to bonding portions of a coil board and generation of cracks in solders.

Furthermore, embodiments are capable of reducing stroke dispersion of a housing and making hole calibration easy, thereby improving feedback control in handshaking correction.

DESCRIPTION OF DRAWINGS

FIG. 16b is an enlarged view of a first bonding portion illustrated in FIG. 16a;

FIG. 16c is an enlarged view of a second bonding portion of FIG. 16a;

FIG. 17b is an enlarged view of a first bonding region in FIG. 17a;

FIG. 17c is an enlarged view of a second bonding region in FIG. 17a;

FIG. 26 is an exploded perspective view of some components of the lens moving apparatus illustrated in FIG. 25;

BEST MODE

Hereinafter, embodiments will be clearly elucidated via description thereof with reference to the accompanying drawings. In the following description of the embodiments, it will be understood that, when an element such as a layer (film), region, pattern, or structure is referred to as being "on" or "under" another element, it can be "directly" on or under the other element, or can be "indirectly" formed such that an intervening element may also be present. In addition, it will also be understood that the meaning of "on" and "under" are determined on the basis of the drawings. The same reference numbers will be used throughout the drawings to refer to the same or like parts.

Hereinafter, a lens moving apparatus according to an embodiment will be described with reference to the accompanying drawings. For the convenience of description, although the lens moving apparatus will be described using a rectangular coordinate system (x, y, z), the lens moving apparatus may be described using some other coordinate systems, and the embodiment is not limited thereto. In the respective drawings, the X-axis and the Y-axis mean directions perpendicular to an optical axis, i.e. the Z-axis, and the optical axis (Z-axis) direction may be referred to as a "first direction", the X-axis direction may be referred to as a "second direction", and the Y-axis direction may be referred to as a "third direction".

A "handshake correction device", which is applied to a subminiature camera module of a mobile device such as, for example, a smart phone or a tablet PC, may be a device that is configured to inhibit the contour line of a captured image from being indistinctly formed due to vibration caused by shaking of the user's hand when capturing a still image.

In addition, an "auto-focusing device" is a device that automatically focuses an image of a subject on an image sensor surface. The handshake correction device and the auto-focusing device may be configured in various ways, and the lens moving apparatus according to the embodiment may move an optical module, which is constituted of at least one lens, in the first direction, which is parallel to the optical axis, or relative to a plane defined by the second and third directions, which are perpendicular to the first direction, thereby performing handshake correction motion and/or auto-focusing.

Figure 1:
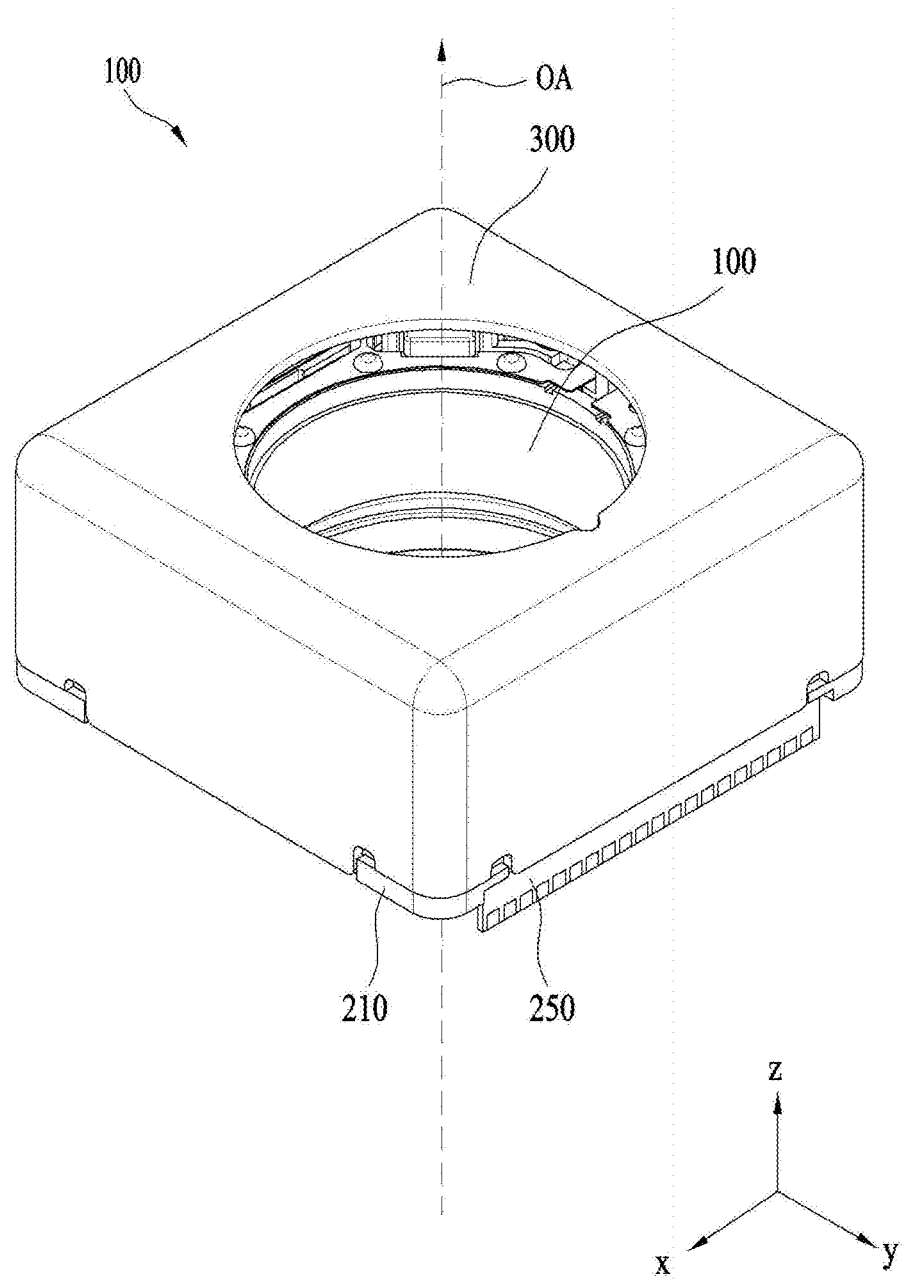
FIG. 1 is a schematic perspective view of a lens moving apparatus according to an embodiment.
Figure 2:
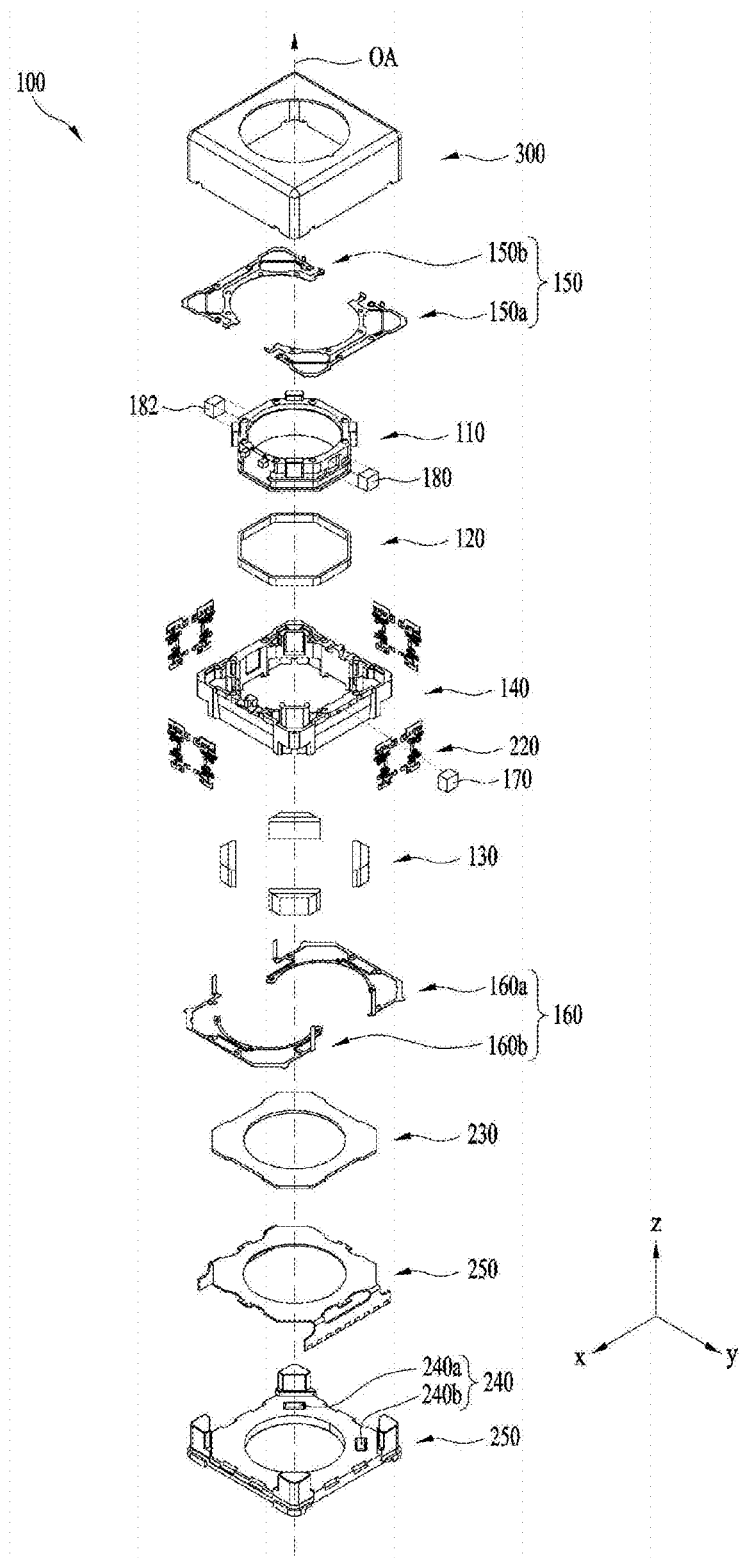
FIG. 2 is an exploded perspective view of the lens moving apparatus illustrated in FIG. 1.
Figure 3:
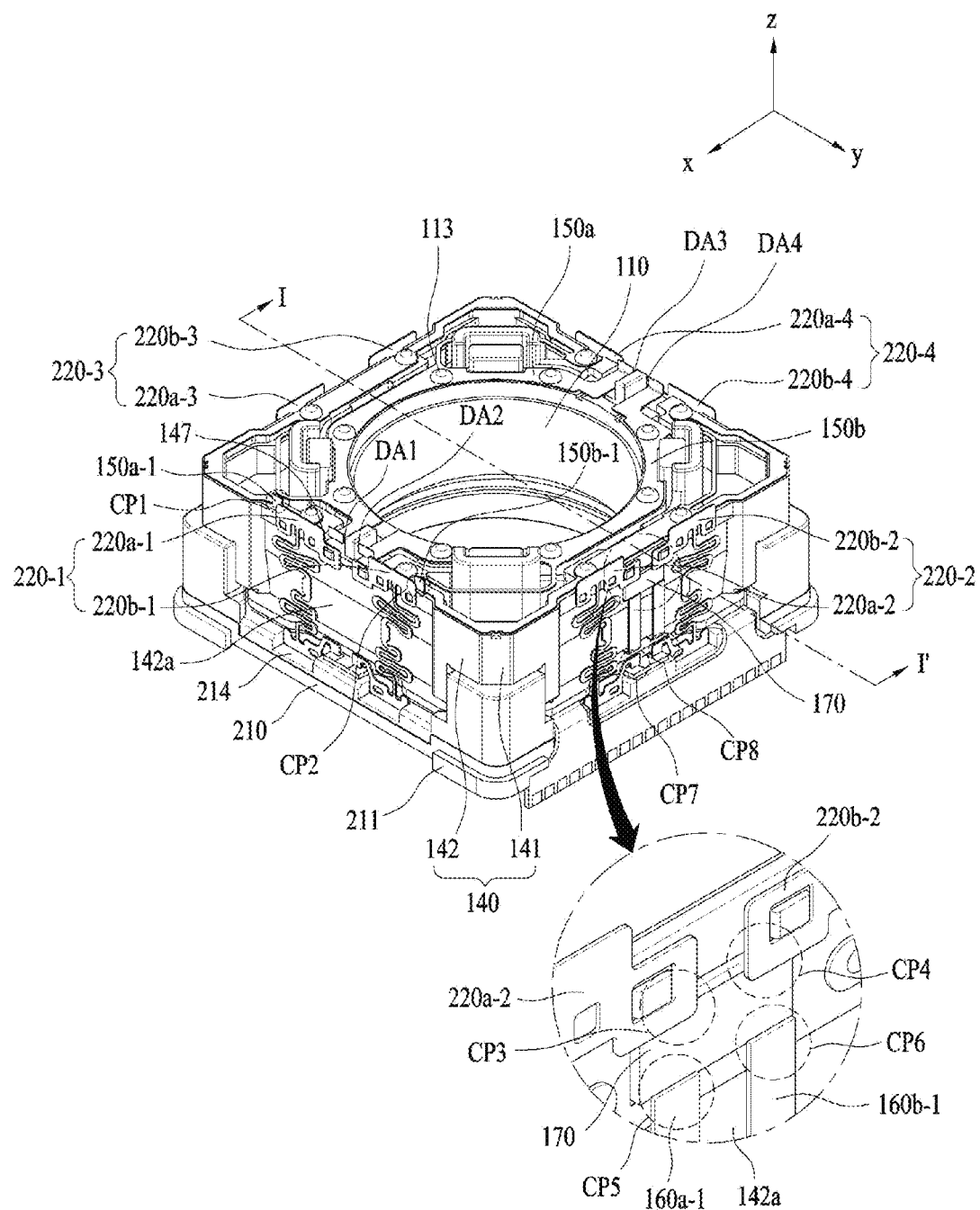
FIG. 3 is a perspective view of the lens moving apparatus from which a cover member is removed.
Figure 11:
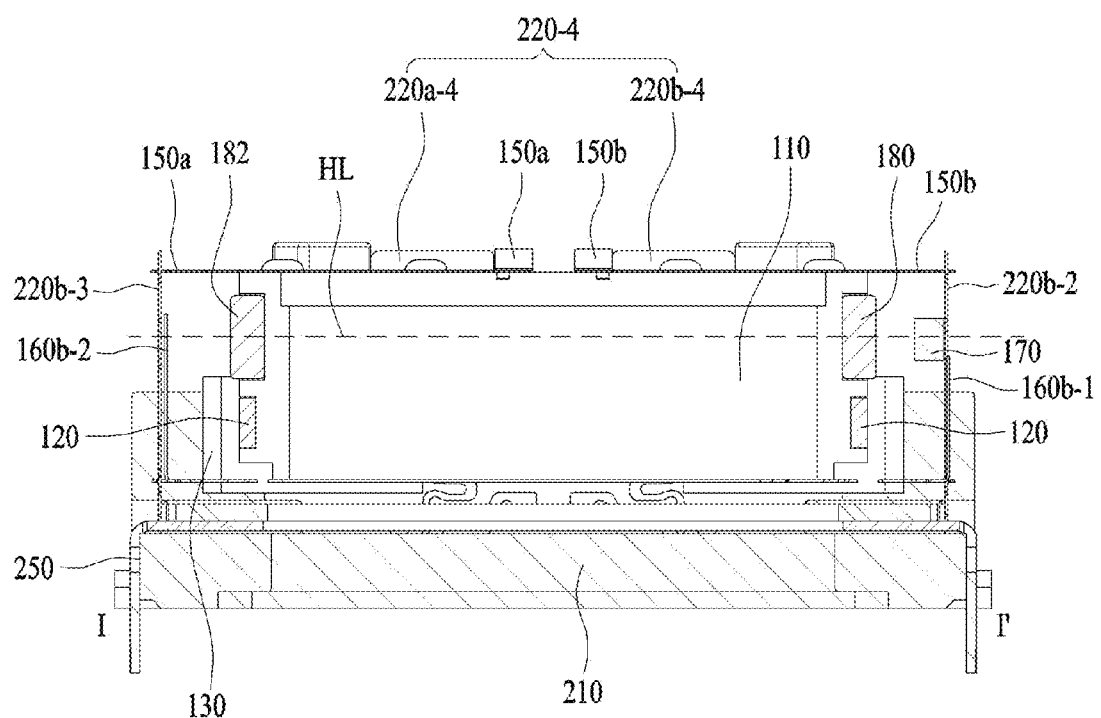
FIG. 11 is a cross-sectional view taken along line I-I' of FIG. 3.

FIG. 1 is a schematic perspective view illustrating the lens moving apparatus 100 according to an embodiment, and FIG. 2 is an exploded perspective view of the lens moving apparatus 100 illustrated in FIG. 1. FIG. 3 is a perspective view of the lens moving apparatus 100 from which a cover member 300 is removed, and FIG. 11 is a cross-sectional view taken along line I-I' of FIG. 3.

Referring to FIGS. 1 to 3 and FIG. 11, the lens moving apparatus 100 includes a bobbin 110, a first coil 120, first magnets 130, a housing 140, an upper elastic member 150, a second coil 230, a circuit board 250 and conductive adhesive members 239a and 239b.

The lens moving apparatus 100 may further include a cover member 300, a first position sensor 170, a second magnet 180, a magnetic compensation metal 182, a base 210, a support member 220 and a second position sensor 240.

First, the cover member 300 will be described.

The cover member 300 defines an accommodation space along with the base 210, such that the upper elastic member 150, the bobbin 110, the first coil 120, the housing 140, the first magnets 130, the first position sensor 170, the second magnet 180, the lower elastic member 160, a plurality of the support members 220, the second coil 230, the second position sensor 240 and the circuit board 250 are accommodated in the accommodation space.

The cover member 300 may take the form of a box that has an open bottom and includes an upper plate and side plates. The bottom of the cover member 300 may be coupled to the top of the base 210. The upper plate of the cover member 300 may have a polygonal shape, such as, for example, a square or octagonal shape.

The cover member 300 may have a bore formed in the upper plate thereof in order to expose a lens (not shown), coupled to the bobbin 110, to outside light. In addition, the bore in the cover member 300 may be provided with a window formed of a light-transmitting material, in order to inhibit impurities, such as, for example, dust or moisture, from entering a camera module.

Although the material of the cover member 300 may be a non-magnetic material such as, for example, SUS in order to inhibit the cover member 300 from being attracted by the first magnets 130, the cover member 300 may be formed of a magnetic material, and may function as a yoke.

Next, the bobbin 110 will be described.

The bobbin 110 is placed inside the housing 140, and is movable in the direction of the optical axis or in the first direction, for example, in the Z-axis direction, via electromagnetic interaction between the first coil 120 and the first magnets 130.

The bobbin 110 may be provided with a lens directly mounted or coupled thereto, without being limited thereto. The bobbin 110 or may include a lens barrel (not shown) in which at least one lens is installed. The lens barrel may be coupled inside the bobbin 110 in any of various manners.

The bobbin 110 may be configured to have a bore for mounting the lens or the lens barrel. The bore may have a circular, elliptical, or polygonal shape, without being limited thereto.

Figure 4:
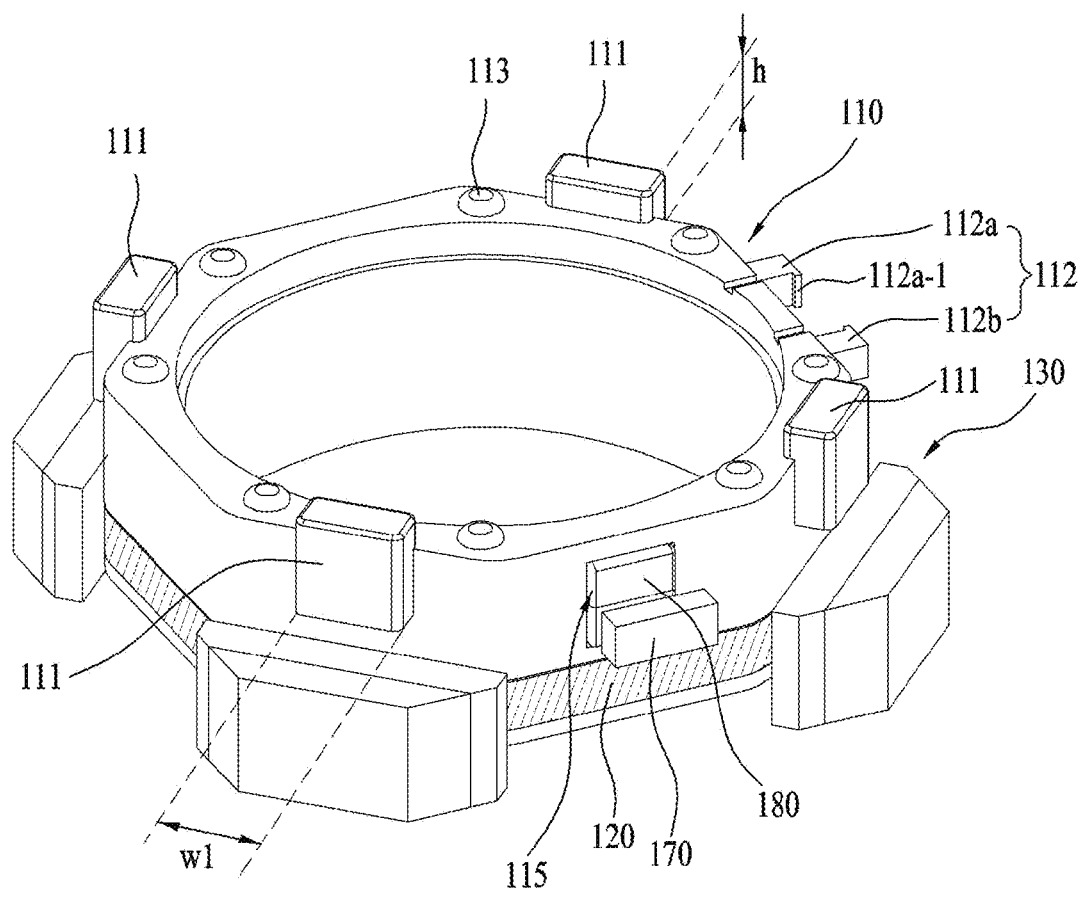
FIG. 4 is a first perspective view of a bobbin, a first coil, a first position sensor, first magnets and a second magnet, which are illustrated in FIG. 1.
Figure 5:
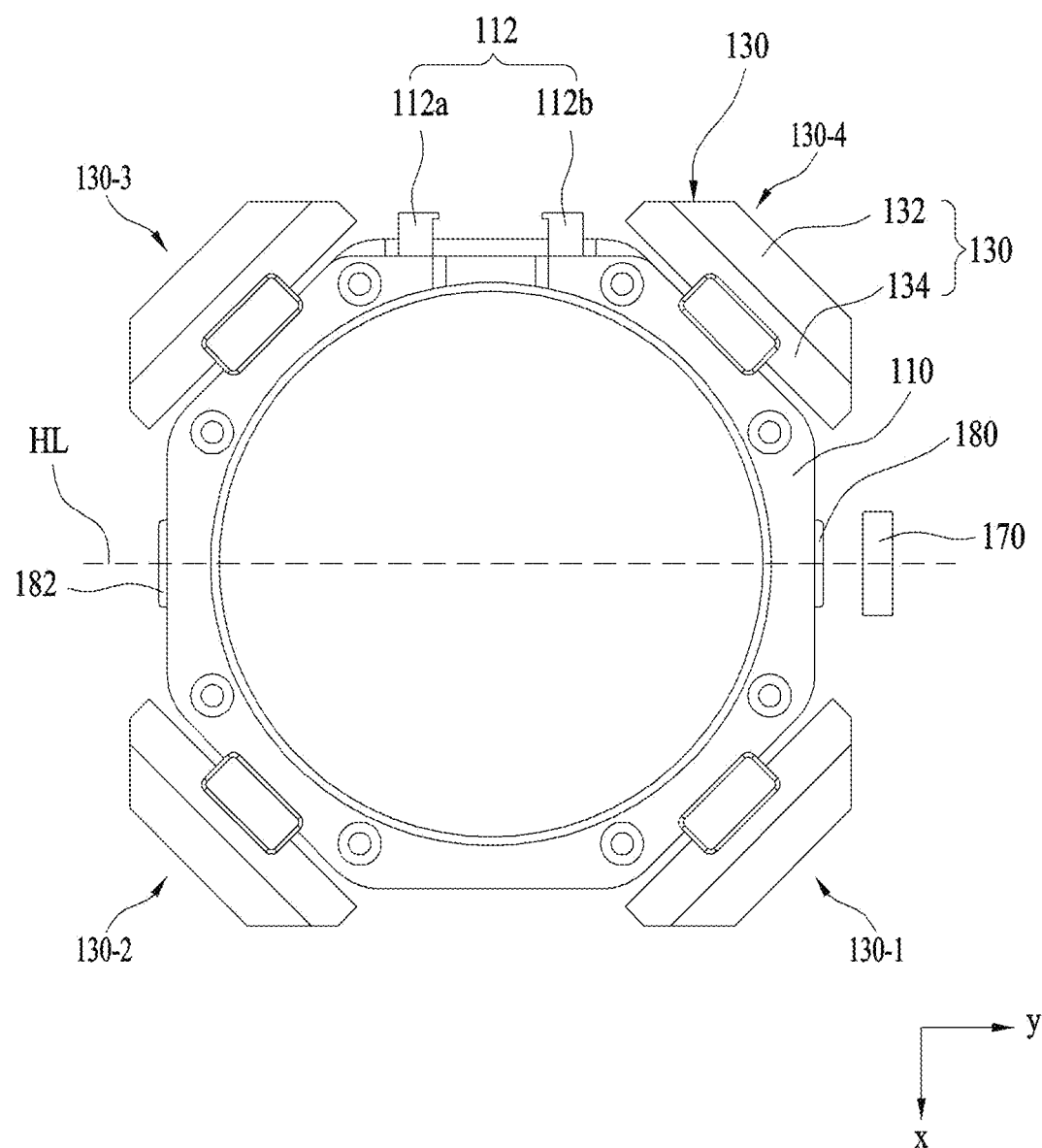
FIG. 5 is a plan view of FIG. 4.

FIG. 4 is a first perspective view showing the bobbin 110, the first coil 120, the first position sensor 170, the first magnets 130 and the second magnet 180, which are illustrated in FIG. 1, and FIG. 5 is a plan view of FIG. 4.

Referring to FIGS. 4 and 5, the bobbin 110 may include first stoppers 111 and winding protrusions 112. The first stoppers 110 may protrude in a first direction from the upper surfaces of the bobbin 110. For example, the first stoppers 111 may protrude upwards a first height h1 from the upper surface of the bobbin 110. The first stopper 111 may inhibit the upper surface of the bobbin 110 from directly colliding with the inner surface of the upper plate of the cover member 300 even when the bobbin 110 moves beyond a predetermined range due to external impact or the like during movement of the bobbin 110 in the first direction to implement an autofocusing function.

The first stoppers 111 may be configured to protrude upwards the upper surface of the bobbin 110 while protruding from the side surface of the bobbin 110 in a direction perpendicular to the optical axis OA. For example, the first stoppers 111 may be disposed at an edge at which the upper surface of the bobbin 110 meets the side surface of the bobbin 110.

The first stoppers 111 may be fitted in first seating grooves 146-1 provided in the housing 140. Consequently, even when the bobbin 110 is forced in a rotational direction about the optical axis OA, it is possible to inhibit the bobbin 110 from being rotated by means of the first stoppers 111 fitted in the first seating grooves 146-1 in the housing 140.

The winding protrusions 112 protrude from an upper peripheral surface or an outer peripheral surface of the bobbin 110, and the first coil 120 is wound around the winding protrusions 112. Although two winding protrusions 112a and 112b are illustrated in FIG. 4, the disclosure is not limited thereto. Each of the starting wire and the terminating wire of the first coil 120 may be wound around a corresponding one of the two winding protrusions 112.

For example, the winding protrusions 112 may protrude from the side surface of the bobbin in a direction perpendicular to the optical axis OA, and may be seated in or supported by second seating grooves 146-2 provided in the housing 140.

The bobbin 110 may be provided on the upper surface thereof with upper support protrusions 113, which are fitted into through holes 151a in the upper elastic member 150. The bobbin 110 may be provided on the lower surface thereof with lower support protrusions (not shown), which are fitted into through holes 161a in the lower elastic member 160.

The bobbin 110 may be provided in the outer peripheral surface or the outer surface thereof with a first-coil-seating groove (not shown) in which the first coil 120 is disposed. For example, the first-coil-seating groove may be provided in the lower end of the outer peripheral surface of the bobbin 110.

The bobbin 110 may further be provided in the upper end of the outer peripheral surface thereof with a second-magnet-seating recess 115 in which the second magnet 180 is disposed or seated. In addition, the bobbin 110 may be provided in the upper end of the outer peripheral surface thereof with a compensation metal recess (not shown) in which a magnetic field compensation metal is disposed or seated.

Next, the first coil 120 will be described.

The first coil 120 is disposed on the outer peripheral surface or the outer surface of the bobbin 110.

For example, the fist coil 120 may be wound around the outer peripheral surface of the bobbin 110 so as to be rotated clockwise or counterclockwise about the optical axis OA.

For example, the first coil 120 may be directly wound around the outer peripheral surface or the outer surface of the bobbin 110, and may be configured to have a ring shape, without being limited thereto. In another embodiment, the first coil, which is wound around the outer peripheral surface of the bobbin, may be a coil block, which is rotated in a direction perpendicular to the optical axis and is configured to have a ring shape or a polygonal shape. The starting wire and the terminating wire of the first coil 120 may be wound around the winding protrusions 112 and then secured thereto.

For example, the first coil 120 may be disposed on a lower area of the outer peripheral surface of the bobbin 110.

When a drive signal, for example, drive current or voltage, is supplied to the first coil 120, the bobbin 110 may be moved by means of electromagnetic force caused by interaction between the first magnets 130 and the first coil 120. The movement of the bobbin 110 in the optical-axis direction may be controlled so as to allow the lens mounted on the bobbin 110 to be focused.

The first coil 120 may be disposed so as to correspond to or to face the first magnets 130 in a direction perpendicular to the optical axis.

Next, the housing 140 will be described.

The housing 140 accommodates therein the bobbin 110, and supports the first magnets 130.

Figure 6:
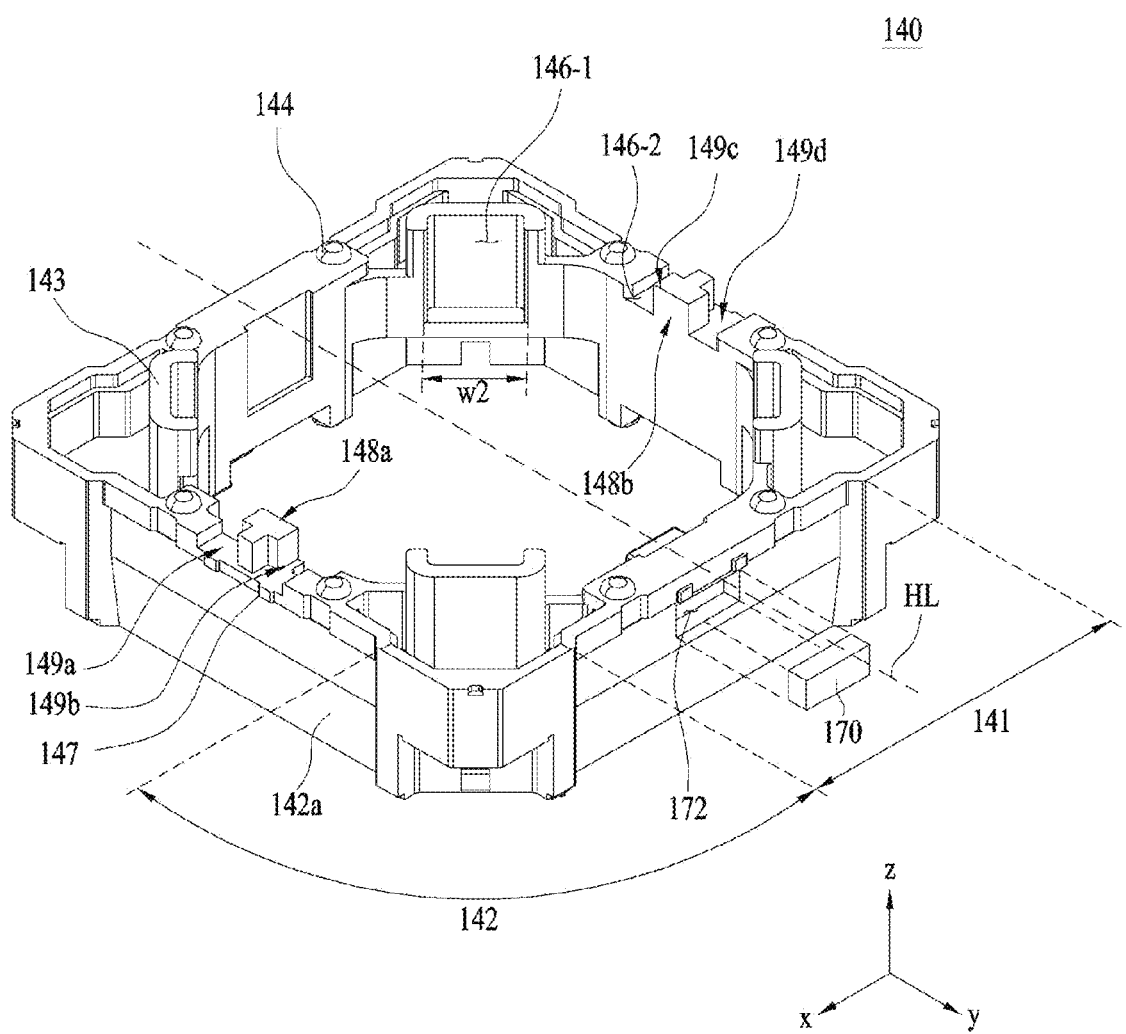
FIG. 6 is a first perspective view of a housing illustrated in FIG. 1.
Figure 7:
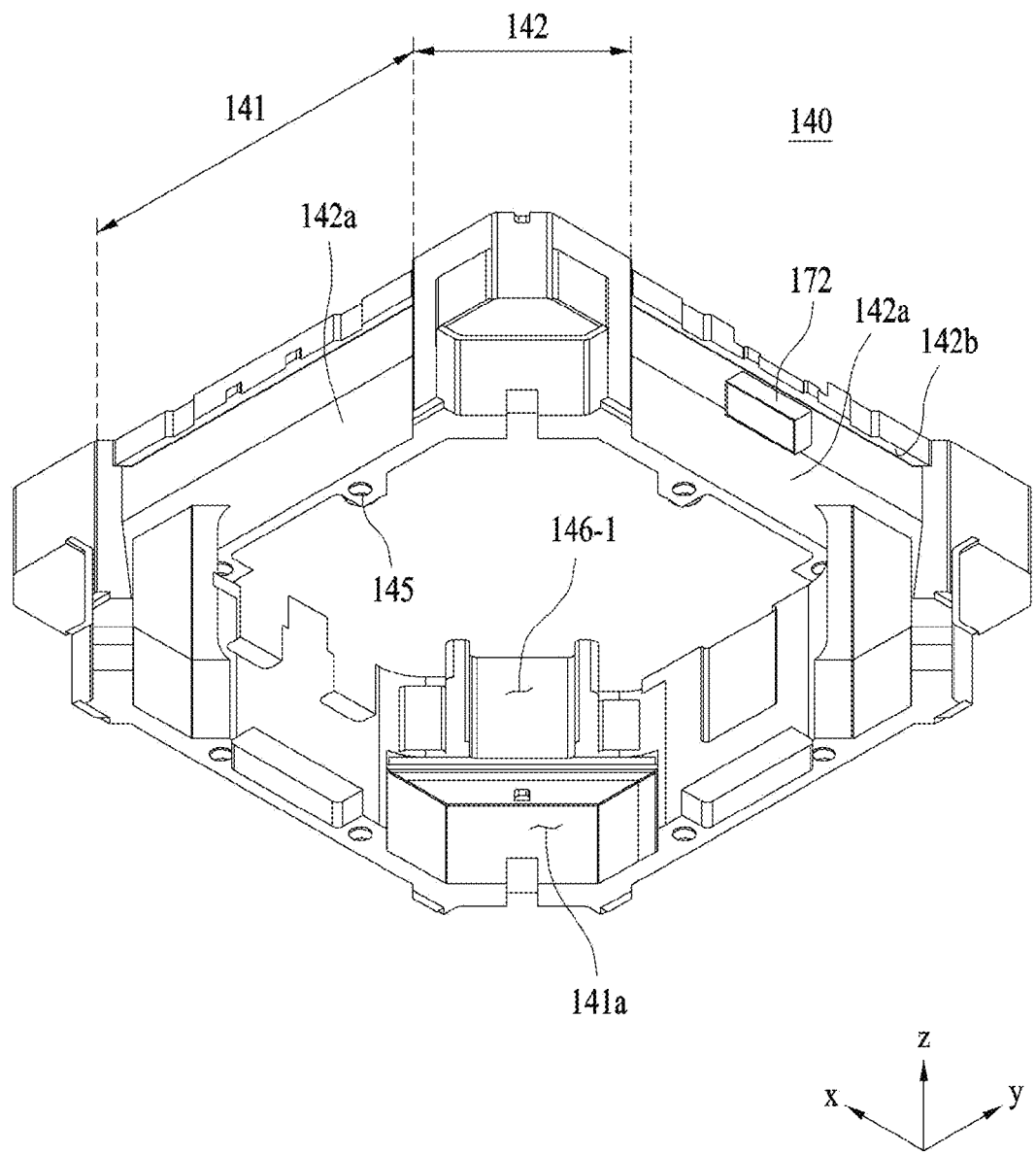
FIG. 7 is a second perspective view of the housing illustrated in FIG. 1.

FIG. 6 is a first perspective view of the housing 140 illustrated in FIG. 1, and FIG. 7 is a second perspective view of the housing 140 illustrated in FIG. 1.

Referring to FIGS. 6 and 7, the housing 140 may be configured to have a hollow column shape overall. For example, the housing 140 may have a polygonal cavity (for example, a square or octagonal shape) or a circular cavity.

Although the housing may be configured to have a polygonal shape, for example, an octagonal shape, when viewed in a plan view, the disclosure is not limited thereto.

The housing 140 may include a plurality of side portions 141 and 142.

For example, the housing 140 may include first side portions 141 and second side portions 142. The first magnets 130 may be disposed or mounted on the first side portions 141, and the elastic support members 220 may be disposed on the second side portions 142. Each of the second side portions 142 may connect two adjacent first side portions 141 to each other. For example, the side portions of the housing 140 may be referred to as "corner portions" of the housing 140.

The housing 140 may include first seating portions 141a, in which the first magnets 130 are disposed, and a second seating portion 172, in which the first position sensor 170 is disposed.

The first seating portions 141a may be provided in the inner surface of the second side portions 142, and each of the first seating portions 141a may be formed so as to have a recess or mounting-hole shape having a size corresponding to the size of each of the first magnets. For example, in order to allow the first magnets 130 to be easily fitted in the first seating portions 141a, each of the first seating portions 141a may have an opening formed in the bottom surface of the first seating portion 141a that faces the second coil 230.

The first side portions 142 of the housing 140 may be respectively provided in the outer surfaces thereof with escape recesses 142a, each having a predetermined depth, in which the elastic support members 220 are disposed.

Furthermore, the housing 140 may include second stoppers 143, which protrude from the upper surface of the housing 140 in order to inhibit collision with the cover member 300.

For example, the housing 140 may include four second stoppers 143, which are spaced apart from one another. The second stoppers 143 may be positioned so as to correspond to or be aligned with the first stoppers 111 of the bobbin 110.

The second stoppers 143 of the housing 140 may be provided with the first seating grooves 146-1, in which the stoppers 111 are fitted or seated. The second stoppers 143 of the housing 140 may function to guide mounting positions of the upper elastic members 150.

The housing 140 may include guide protrusions 148a and 148b protruding from the upper surface thereof, and guide grooves 149a, 149b, 149c and 149d formed in the upper surface thereof at both lateral sides of the guide protrusions 148a and 148b.

The guide protrusions 148a and 148b may be disposed between first ends or between second ends of the upper elastic members (for example, 150a and 150b) so as to cause the upper elastic members (for example, 150a and 150b) to be spaced apart from each other.

In order to absorb and buffer vibrations of the bobbin 110, the lens moving apparatus 100 may further include damping members DA1 to DA4 (see FIG. 3), each of which is disposed between the upper elastic member 150a or 150b and the first or second guide protrusion 148 of the housing 140.

Each of the guide grooves 149a to 149d may be configured to be depressed from the upper surface of the housing 140, and may open in inward and outward directions of the housing 140.

Each of the first and second ends of the upper elastic members (for example, 150a and 150b) may be disposed in a corresponding one of the guide grooves 149a to 149d. Although each of the first and second ends of the upper elastic members 150a and 150b may be spaced apart from a corresponding one of the guide grooves 149a to 149d of the housing 140, the disclosure is not limited thereto. The two portions may be in contact with each other.

Each of the damping members DA1 to DA4 may be disposed between a corresponding one of the lateral side surfaces of the guide protrusions 148 and a corresponding one of damping contact portions 150-1 to 150-4 of the upper elastic members 150a and 150b.

Since each of the damping members DA1 to DA4 is disposed between a corresponding one of the lateral side surfaces of the guide protrusions 148, which are parallel to the direction of movement of the bobbin 110, and a corresponding one of the damping contact portions 150-1 to 150-4, it may be easy to control a function of absorbing or buffering vibrations of the bobbin 110 in the direction of movement of the bobbin 110.

The housing 140 may include the second seating portion 172, which is provided in the outer surface of one of the first side portions 141, and the second seating portion may be formed so as to have a groove shape.

At the initial position of the bobbin 110, the second seating portion 172 of the housing 140 may be aligned with or may overlap the second-magnet-seating recess of the bobbin 110 in a direction perpendicular to the optical axis.

The initial position of the bobbin 110 may be the starting position of an AF operating unit when power is not applied to the first coil 120, or a position at which the AF operating unit is disposed when the upper and lower elastic members 150 and 160 are elastically deformed due to the weight of the AF operating unit.

In other words, the initial position of the bobbin 110 may be a position at which the AF operating unit is disposed when gravity is applied toward the base 210 from the bobbin 110 or when gravity is applied in the opposite direction, toward the bobbin 110 from the base 210. The AF operating unit may include the bobbin 110 and components mounted on the bobbin 110.

The housing 140 may be provided on the upper surface thereof with first coupling portions 144, which are fitted into through holes 152a in the upper elastic member 150. Furthermore, the housing 140 may be provided on the lower surface thereof with second coupling portions 145, which are fitted into through holes 162a in the lower elastic member 160. Although each of the first coupling portions 144 may be configured to have a protrusion shape, the disclosure is not limited thereto. In another embodiment, each of the first coupling portions 144 may be configured to have a hole shape. Alternatively, although each of the second coupling portions 145 may be configured to have a hole shape, the disclosure is not limited thereto. In another embodiment, each of the second coupling portions 145 may be configured to have a protrusion shape.

Next, the first position sensor 170 will be described.

The first position sensor 170 may be disposed in one of the first side portions 141 of the housing 140. For example, the first position sensor 170 may be disposed in the second seating portion in the housing 140.

The first position sensor 170 may create an output signal for detecting displacement of the bobbin 110 by detection of intensity of a magnetic field of the second magnet 180 mounted on the bobbin 110. For example, the output signal may be an output voltage or a detection voltage.

A controller included in the camera module may perform AF feedback control for the lens moving apparatus using the output signal detected by the first position sensor 170.

The first position sensor 170 may be embodied as a hall sensor alone, or may be embodied as a driver including a hall sensor. However, the disclosure is not limited thereto, and any sensor may be used as long as it can detect variation in magnetic force.

Next, the first magnets 130 will be described.

The first magnets 130 are disposed on the housing 140. For example, the first magnets 130 may be disposed on the second side portions 142 or the corner portions of the housing 140.

For example, the first magnets 130-1 to 130-4 may be disposed or mounted in the first seating portions 141a in the housing 140. Although each of the first magnets 130 may be configured to have an approximately trapezoidal shape, which corresponds to the corner portion of the housing 140, the disclosure is not limited thereto.

In another embodiment, the first magnets 130-1 to 130-4 may be disposed on the first side portions of the housing 140, and the first position sensor may be disposed on one (for example, the first corner portion) of the second side portions or corner portions of the housing 140. Here, the second magnet 180 may be disposed on the outer surface of the bobbin 110 corresponding to the first corner portion of the housing 140 so as to face the first position sensor 170.

Each of the first magnets 130-1 to 130-4 may be configured to have a polyhedral shape, for example, a rectangular parallelepiped shape.

Each of the first magnets 130-1 to 130-4 may be configured as a single body, and may be oriented such that a first surface thereof facing the first coil 120 is the N-pole and a second surface opposite the first surface is the S-pole 134, without being limited thereto, and the opposite configuration is also possible.

At least two first magnets 130 may be provided, and in the embodiment, four first magnets 130 may be installed.

Next, the second magnet 180 will be described.

The second magnet 180 is disposed on the outer peripheral surface or the outer surface of the bobbin 110.

The second magnet 180 may be positioned between two adjacent first magnets among the first magnets 130-1 to 130-4 (for example, 130-1 and 130-4), which are adjacent to each other in a direction perpendicular to the optical axis. The reason for this is to minimize the interference of a magnetic field between the first magnets 130-1 to 130-4 and the second magnet 180.

Although the second magnet 180 may be disposed above the first coil 120 so as to be spaced apart from the first coil 120, this embodiment is not limited thereto.

For example, the second magnet 180 may overlap the first coil 120 in the optical-axis direction or the first direction, without being limited thereto.

For example, the second magnet 180 may not overlap the first coil 120 in a direction perpendicular to the optical axis.

The magnetic field compensation metal 182 is disposed on the outer peripheral surface or the outer surface of the bobbin 110. For example, the magnetic field compensation metal 182 may be disposed so as to face the second magnet 180 in a direction perpendicular to the optical axis.

For example, the magnetic field compensation metal 182 and the second magnet 180 may be disposed on the outer peripheral surface of the bobbin 110 so as to be aligned with each other along an imaginary line HL which extends through the center of the bobbin 110 while being perpendicular to the optical axis.

For example, the second magnet 180 may not overlap any of the first magnets 130 in the optical-axis direction or the first direction.

The interaction between the first magnets 130 and the first coil 120 may be interrupted or hindered due to a magnetic field generated from the second magnet 180. The magnetic field compensation metal 182 may function to reduce the interruption of the interaction between the first magnets 130 and the first coil 120 attributable to the magnetic field generated from the second magnet 180.

For example, the magnetic field compensation metal 182 may be made of a metal, without being limited thereto. The magnetic field compensation metal 182 may be made of a material having a magnetic property, for example, a magnetic material or a magnet.

The magnetic field compensation metal 182 may be configured to have the same shape as the second magnet 180. The magnetic field compensation metal 182 may function to balance the weight of the second magnet 180 mounted on the bobbin 110, thereby realizing precise AF operation.

In another embodiment, the lens moving apparatus 100 may not include the first position sensor 170, the second magnet 180 or the magnetic field compensation metal 182.

At the initial position of the bobbin 110, each of the first magnets 130-1 to 130-4 may be aligned with the first coil 120 or may overlap the first coil 120 in a direction perpendicular to the optical axis.

At the initial position of the bobbin 110, the first position sensor 170 and the second magnet 180 may overlap each other in a direction perpendicular to the optical axis, without being limited thereto. In another embodiment, at the initial position of the bobbin 110, the first position sensor 170 and the second magnet 180 may not overlap each other in a direction perpendicular to the optical axis.

Next, the upper elastic member 150 and the lower elastic member 160 will be described.

The upper elastic member 150 is coupled to an upper portion (or the upper surface or the upper end) of the bobbin 110 as well as to an upper portion (or the upper surface or the upper end) of the housing 140. The lower elastic member 160 is coupled to a lower portion (or the lower surface or the lower end) of the bobbin 110 as well as to a lower portion (the lower surface or the lower end) of the housing 140.

Figure 9:
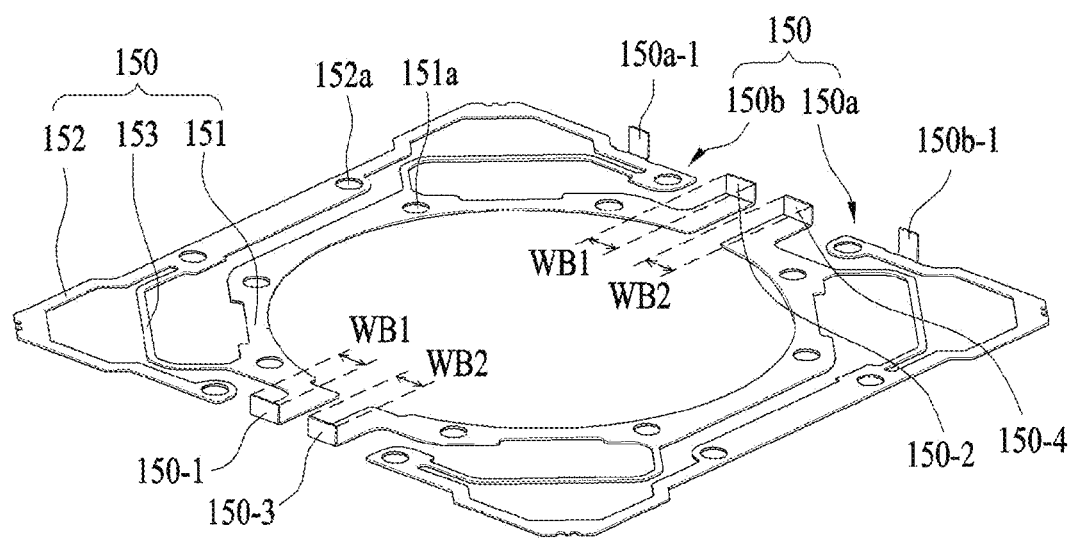
FIG. 9 is a perspective view of an upper elastic member illustrated in FIG. 1.

FIG. 9 is a perspective view of the upper elastic member 150 illustrated in FIG. 1.

Referring to FIG. 9, the upper elastic member 150 may include a plurality of upper elastic members or upper springs (for example, 150a and 150b), which are spaced apart from each other and which are conductively isolated from each other.

Each of the plurality of upper elastic members (for example, 150a and 150b) may include a first inner frame 151 coupled to an upper portion (for example, the upper support protrusions 113) of the bobbin 110, a first outer frame 152 coupled to an upper portion (for example, the upper frame support protrusions 144) of the housing 140, and a first connector 153 connecting the first inner frame 151 to the first outer frame 152.

At least one of the plurality of upper elastic members 150a and 150b may further include damping contact portions 150-1 to 150-4 provided at the first inner frame 151. The damping contact portions 150-1 to 150-4 may protrude upwards from the upper surface of the first inner frame 151, for example, in a direction toward the upper elastic member 150 from the lower elastic member 160.

For example, each of the damping contact portions 150-1 to 150-4 may be an end of the first inner frame 151, which is bent upwards.

At least one of the plurality of upper elastic members 150a and 150b may further include support member contact portions 150a-1 and 150b-1, which protrude from the first outer frame 152.

For example, the support member contact portions 150a-1 and 150b-1 may protrude upwards, for example, in a direction toward the upper elastic member 150 from the lower elastic member 160.

The damping contact portions 150-1 to 150-4 may also be referred to as "first contact portions", and the support member contact portions 150a-1 and 150b-1 may also be referred to as "second contact portions".

Figure 10:
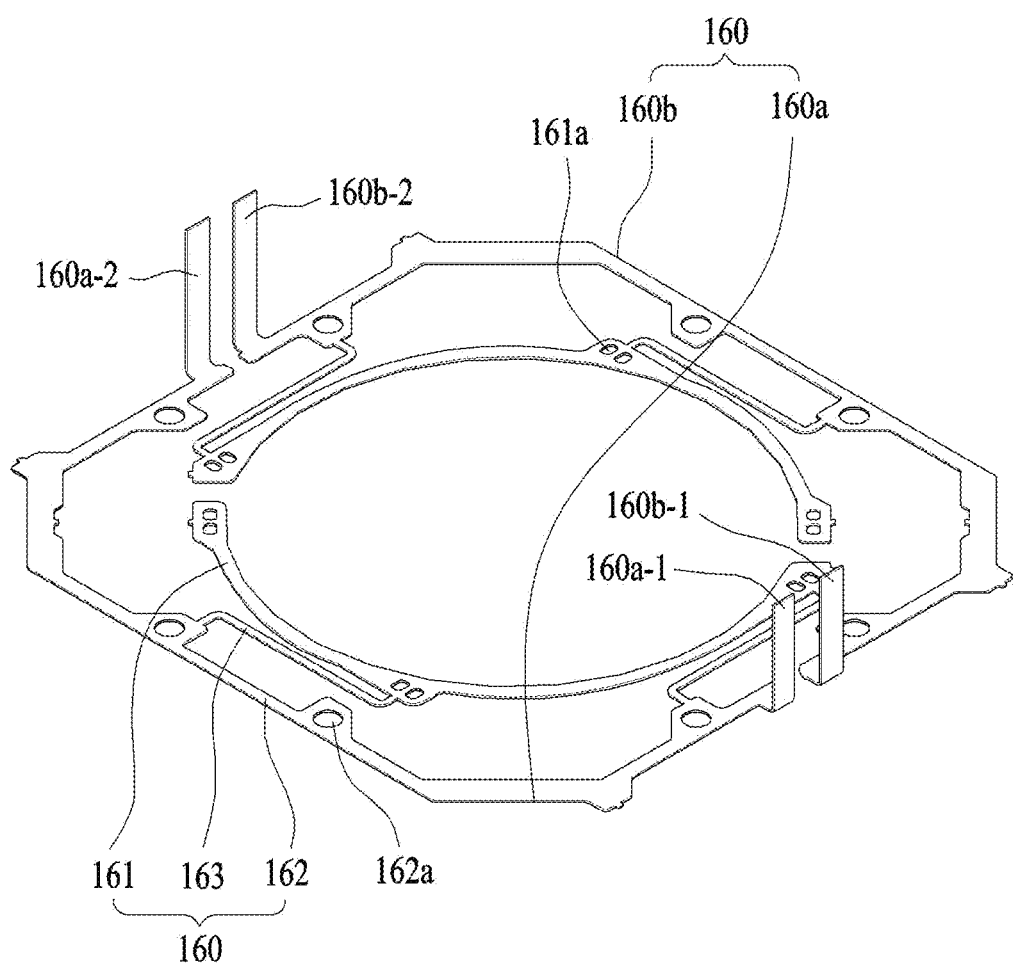
FIG. 10 is a perspective view of the lower elastic member illustrated in FIG. 1.

FIG. 10 is a perspective view of the lower elastic member 160 illustrated in FIG. 1.

Referring to FIG. 10, the lower elastic member 160 may include a plurality of lower elastic members or lower springs (for example, 160a and 160b), which are spaced apart from each other and which are conductively isolated from each other.

Each of the plurality of lower elastic members (for example, 160a and 160b) may include a second inner frame 161 coupled to a lower portion (for example, the lower support protrusions) of the bobbin 110, a second outer frame 162 coupled to a lower portion (for example, the second coupling portions 145) of the housing 140, and a second connector 163 connecting the second inner frame 161 to the second outer frame 162.

Each of the first and second connectors 153 and 163 may be bent once or more so as to define a predetermined pattern. By positional variation and fine deformation of the first and second connectors 153 and 163, upward and/or downward movement of the bobbin 110 in the first direction, parallel to the optical axis, may be elastically supported.

At least one of the plurality of lower elastic members 160a and 160b may include sensor contact portions 160a-1, 160a-2, 160b-1 and 160b-2 provided at the second outer frame 162. The sensor contact portions 160a-1, 160a-2, 160b-1 and 160b-2 may be portions of the second outer frame 162 that protrude upwards.

For example, in order to inhibit an oscillation phenomenon of the bobbin 110 during movement, a damper may be disposed between the first connector 153 of each of the upper elastic members 150a and 150b and the upper surface of the bobbin 110. Furthermore, a damper (not shown) may be disposed between the second connector 163 of each of the lower elastic members 160a and 160b and the lower surface of the bobbin 110.

Alternatively, a damper may be applied to a coupled portion between each of the bobbin 110 and the housing 140 and the upper elastic member 150 or to a coupled portion between each of the bobbin 110 and the housing 140 and the lower elastic member 160. For example, the damper may be made of gel-type silicone.

Next, the support members 220 will be described.

Figure 8:
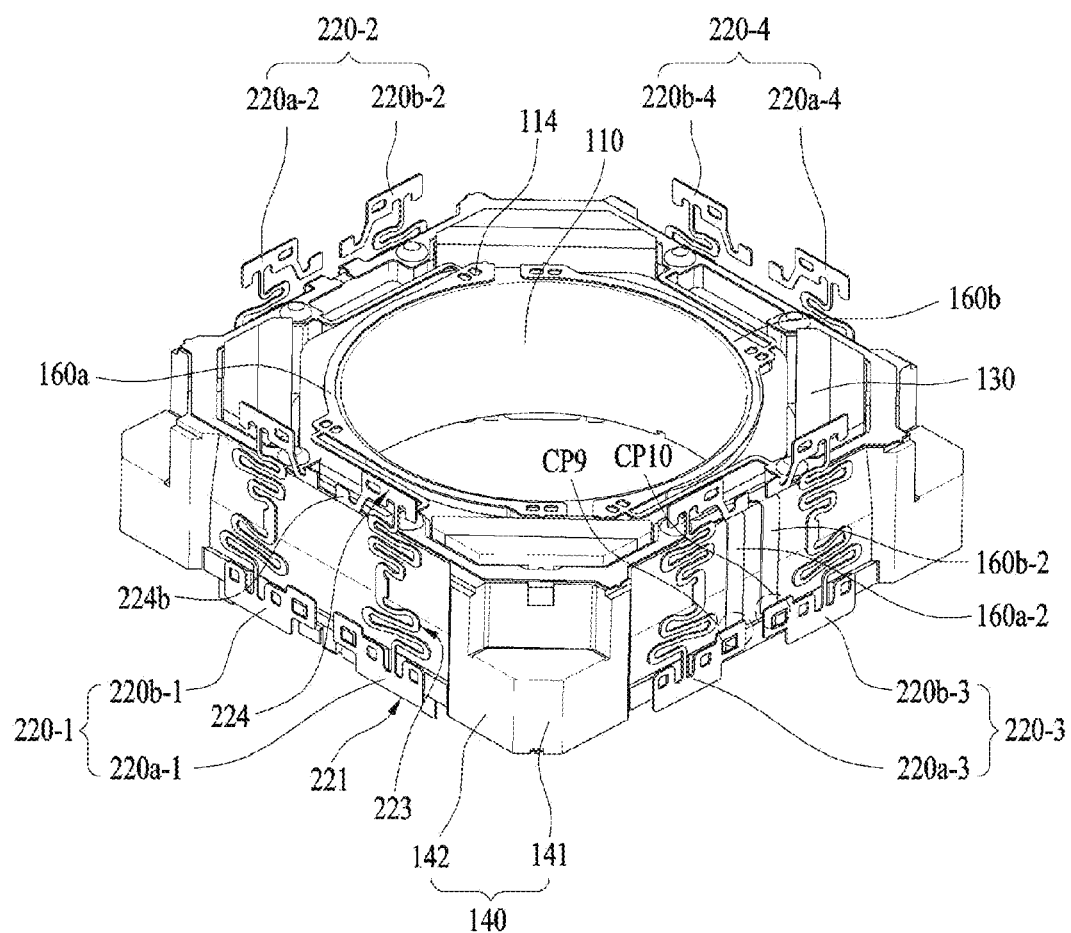
FIG. 8 is an assembled perspective view of the bobbin, the first magnets, the housing, a lower elastic member and a support member, which are illustrated in FIG. 1.

FIG. 8 is an assembled perspective view of the bobbin 110, the first magnets 130, the housing 140, the lower elastic member 160 and the support members 220, which are illustrated in FIG. 1.

Referring to FIG. 8, the support members 220 are disposed on the first side portions 141 of the housing 140. The support members 220 may include a plurality of support members.

At least one support member may be disposed on the outer surface of each of the first sides 141 of the housing 140. For example, two support members, which are conductively isolated from each other, may be disposed on each of the first side portions 141 of the housing, without being limited thereto.

For example, the first to fourth support members 220-1 to 220-4 may be respectively disposed on the first side portions 141 of the housing 140, and may support the housing 140 and the bobbin 110 so as to cause the housing 140 and the bobbin 110 to be spaced apart from the base 210.

Each of the first to fourth support members 220-1 to 220-4 may include two elastic support members 220a-1 and 220b-1, 220a-2 and 220b-2, 220a-3 and 220b-3, or 220a-4 and 220b-4.

For example, the two elastic support members disposed on one of the side portions of the housing 140, illustrated in FIG. 8, may be configured to be symmetrical with each other in a direction perpendicular to the optical-axis direction (for example, in the x-axis or y-axis direction).

Each of the elastic support members 220a-1 to 220a-4 and 220b-1 to 220b-4 may include an upper terminal portion 221, an elastic deformation portion 223 and a lower terminal portion 224.

The upper terminal portion 221 may be coupled to the upper end of the first side portion 141 of the housing 140, for example, a coupling protrusion. For example, the upper terminal portion 221 may include a groove portion or a through hole, which is coupled to the coupling protrusion 147 of the housing 140.

Two elastic support members 220a-1 and 220b-1, which are selected from among the elastic support members 220a-1 to 220a-4 and the 220b-1 to 220b-4, may be conductively connected to the support member contact portions 150a-1 and 150b-1 of the upper elastic members 150a and 150b via solders or conductive adhesive members (see CP1 and CP2 in FIG. 3).

For example, opposite ends of the first coil 120 may be conductively connected to the first inner frames 151 of the upper elastic members 150a and 150b, and the elastic support members 220a-1 and 220b-1, which are brought into conductive contact with the support member contact portions 150a-1 and 150b-1, may be conductively connected to the circuit board 250. The circuit board 250 may supply a drive signal to the first coil 120 by way of the elastic support members 220a-1 and 220b-1 and the upper elastic members 150a and 150b.

Each of the elastic deformation portions 223 may extend from the upper terminal portion 221 in a direction parallel to the optical-axis direction, and may be bent once or more so as to have a predetermined pattern.

The lower terminal portion 224 may extend from the elastic deformation portion 223 and may be coupled to the base 210. One end of the lower terminal portion 224 may be fitted or disposed in a support-member-seating groove 214 provided in the base 210 and may be securely coupled thereto using an adhesive member such as epoxy.

A damper may be disposed between each of the elastic support members 220a-1 to 220a-4 and 220b-1 to 220b-4 and the housing 141. For example, the damper may be disposed between the elastic deformation portion 223 and the first side portion 141 of the housing 140.

One end 224b of at least one lower terminal portion 224 of the elastic support members 220a-1 to 220a-4 and 220b-1 to 220b-4 may be bonded to a corresponding one of first and second pads 15-1 to 15-8 and 252-1 to 252-8 of the circuit board 250 via a solder or a conductive adhesive member.

Upper terminal portions 221 of two elastic support members 220a-2 and 220b-2, which are selected from among the elastic support members 220a-1 to 220a-4 and 220b-1 to 220b-4, may be conductively connected to first and second pins of the first position sensor 170 via a solder or a conductive adhesive member (see CP3 and CP4 in FIG. 3). The lower terminal portions 221 of the two selected elastic support members 220a-2 and 220b-2 may be conductively connected to a corresponding one of the second pads 15-1 to 15-8 of the circuit board 250 (see CP7 and CP8 in FIG. 3).

The sensor contact portions 160a-1 and 160b-1, which are provided at ends of the second outer frames 162 of the lower elastic members 160a and 160b, may be conductively connected to third and fourth pins of the first position sensor 170 (see CP5 and CP6).

The sensor contact portions 160a-2 and 160b-2, which are provided at the opposite ends of the second outer frames 162 of the lower elastic members 160a and 160b, may be conductively connected to the upper terminal portions 221 of two other elastic support members 220a-3 and 220b-3, which are selected from among the elastic support members 220a-1 to 220a-4 and 220b-1 to 220b-4 (see CP9 and CP10 in FIG. 8).

As described above, the first coil 120 may be conductively connected to two of the second pads 15-1 to 15-8 of the circuit board 250 via, for example, the elastic support members 220a-1 and 220b-1. The first position sensor 170 may be conductively connected to four other second pads among the second pads 15-1 to 15-8 via the elastic support members 220a-2, 220b-2, 220a-3 and 220b-3 and the lower elastic members 160a and 160b. However, the disclosure is not limited thereto, and in another embodiment, conductive connection between each of the first coil 120 and the first position sensor 170 may be implemented in various manners via the upper elastic members 150a and 150b, the lower elastic members 160a and 160b and the support members 220-1 and 220-4.

Although each of the elastic support members 220a-1 to 220a-4 and 220b-1 to 220b-4 is embodied as a leaf spring disposed on the first side portion 141 of the housing 140 in the embodiment illustrated in FIG. 8, the disclosure is not limited thereto. In another embodiment, the elastic support members may be disposed on the second side portions 142 of the housing 140, and may be embodied as coil springs, suspension wires or the like. In a further embodiment, the elastic support members may be integrally formed with the upper elastic member 150.

Next, the second coil 230, the circuit board 250, the base 210 and the second position sensor 240 will be described.

Figure 12:
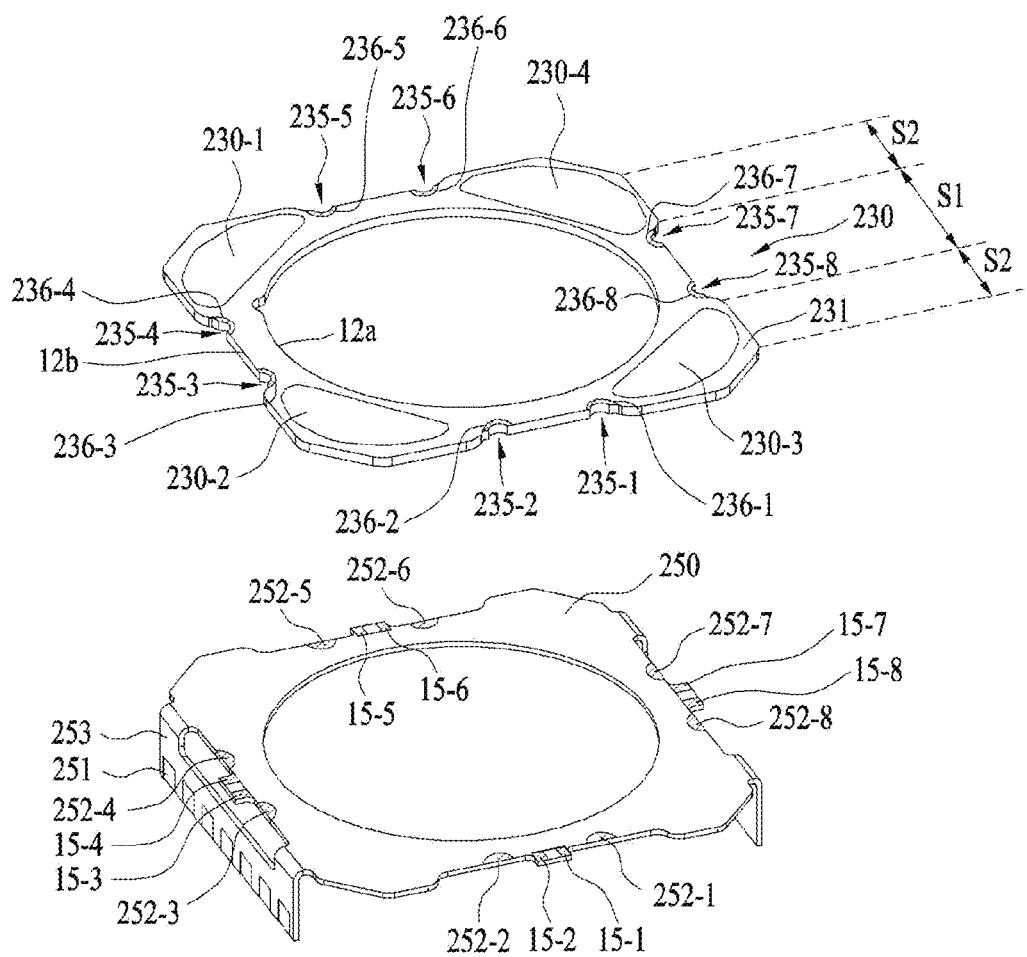
FIG. 12 is an exploded perspective view of a second coil, a circuit board and a base.
Figure 13:
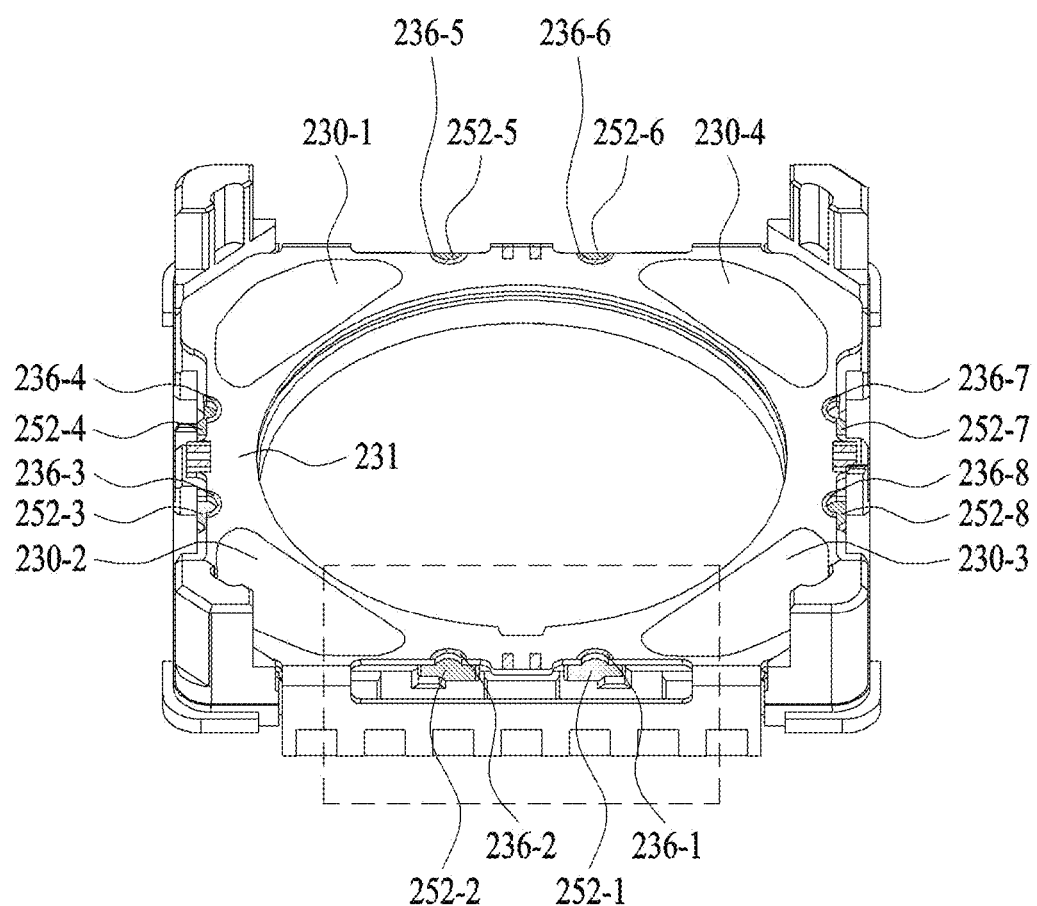
FIG. 13 is an assembled perspective view of a second coil, the circuit board and the base illustrated in FIG. 12.

FIG. 12 is an exploded perspective view of the second coil 230, the circuit board 250 and the base 210, and FIG. 13 is an assembled perspective view of the second coil 230, the circuit board 250 and the base 210, which are illustrated in FIG. 12.

Referring to FIGS. 12 and 13, the base 210 may have a bore corresponding to the bore in the bobbin 110 and/or the bore in the housing 140, and may have a shape that corresponds to that of the cover member 300, for example, a square shape.

The base 210 may have a stepped portion 211, to which an adhesive is applied when the cover member 300 is secured to the base 210 using the adhesive. Here, the stepped portion 211 may guide the cover member 300 when being coupled to the cover member 300, and the lower end of the cover member 300 may come into contact with the stepped portion 211 of the base 210.

The base 210 may be provided in a peripheral area of the upper surface thereof with the support-member-seating groove 214, having a depressed recess shape, in which the support member 220 is fitted.

The end of the support member 220 may be fitted or disposed in the support-member-seating groove 214, and the support member 220 may be secured to the support-member-seating groove 214 via an adhesive or the like.

The support-member-seating groove 214 may include one or more support-member-seating grooves, which are provided in peripheral areas of the upper surface of the base 210 that correspond to or are aligned with the first side portions 141 of the housing 140 on which the support member 220 is mounted.

In addition, a seating groove 215 may be formed in the upper surface of the base 210 so that the second position sensor 240 may be disposed in the seating groove 215.

For example, the base 210 may be provided in the upper surface thereof with two seating grooves 215-1 and 215-2, and each of the first and second position sensors 240a and 240b may be disposed in a corresponding one of the seating grooves 215-1 and 215-2 of the base 210. For example, imaginary lines connecting the centers of the seating grooves 215-1 and 215-2 to the center of the base 210 may intersect each other. Although the angle defined between the imaginary lines may be an angle of 90° by way of example, the disclosure is not limited thereto.

For example, each of the seating grooves 215-1 and 215-2 of the base 210 may be disposed at or near the center of a corresponding one 230-3 or 230-2 of the second coils 230-1 to 230-4 so as to be aligned with the center of the second coil in the optical-axis direction or in the first direction. For example, the center of each of the first and second position sensors 240a and 240b, which are disposed in the seating grooves 215-1 and 215-2, may be aligned with or overlap a corresponding one of the second coils 230-3 and 230-2 in the optical-axis direction or in the first direction.

The second position sensors 240 may be disposed in the seating grooves 215-1 and 215-2 in the base 210. The second position sensors 240 may detect the intensity of a magnetic field of the first magnets 130 disposed on the housing 140.

The second position sensor 240 may be embodied as a driver including a hall sensor, or may be embodied as a detection sensor alone, such as a hall sensor.

The second position sensor 240 may detect displacement of the housing 140 relative to the base in the x-axis or y-axis direction, which is perpendicular to the optical axis OA.

The second position sensor 240 may include the first sensor 240a for detecting displacement of the housing 140 in the x-axis direction, and the second sensor 240b for detecting displacement of the housing 140 in the x-axis direction.

The circuit board 250 may be disposed on the upper surface of the base 210, and may have a bore corresponding to the bore in the bobbin 110, the bore in the housing 140 and/or the bore in the base 210.

The outer peripheral surface of the circuit board 250 may have a shape that coincides with or corresponds to the upper surface of the base 210, for example, a square shape.

The second coil 230 may be disposed above the circuit board 250, and the second position sensor 240 may be disposed under the circuit board 250.

The circuit board 250 may be conductively connected to the first and second sensors 240a and 240b disposed thereunder, and may provide the respective first and second sensors 240a and 240b with a drive signal. The outputs of the first and second sensors 240a and 240b may be output to the circuit board 250.

The circuit board 250 may include at least one terminal rib 253, which is bent at the upper surface thereof and is provided with a plurality of terminals 251, which receive electrical signals from the outside.

The circuit board 250 may receive external power through the plurality of terminals 251 provided on the terminal rib 253 of the circuit board 250, and may supply drive signals or power to the first and second coils 120 and 230 and the first and second position sensors 170 and 240. The circuit board 250 may outwardly output signals received from the first and second position sensors 170 and 240.

In the embodiment, although the circuit board 250 may be embodied as a Flexible Printed Circuit Board (FPCB), the disclosure is not limited thereto. The terminals 251 of the circuit board 250 may be directly formed on the surface of the base 210 via, for example, a surface electrode process.

The circuit board 250 may include the first pads 251-1 to 251-8 conductively connected to the second coils 230-1 to 230-4, and the second pads 15-1 to 18-8 conductively connected to the support members 220-1 to 220-4.

For example, the circuit board 250 may be provided on at least one side of the upper surface thereof with two first pads (for example, 252-1 and 252-2), which are spaced apart from each other, and two second pads (for example, 15-1 and 15-2), which are spaced apart from each other. The two second pads (for example, 15-1 and 15-2) may be positioned between the two first pads (for example, 252-1 and 252-2).

The terminals 251 of the circuit board 250 may be conductively connected to the first pads 251-1 to 251-8 and the second pads 15-1 to 15-8.

The second coil 230 may be disposed under the lower elastic member 160 but above the circuit board 250.

The second coil 230 may be formed on a coil board or a circuit member 231, which is provided separately from the circuit board 250. For example, the second coil 230 may be configured to have a fine pattern (FP) coil shape.

An adhesive member may be disposed between the coil board 231 and the circuit board 250, and the coil board 231 may thus be secured to the circuit board 250 by means of the adhesive member and the conductive adhesive members 239a and 239b.

The coil board 231 may include the plurality of second coils 230-1 to 230-4, which correspond to the first magnets 130-1 to 130-4, and connectors, which are connected to first and second ends of the second coils 230-1 to 230-4.

Although the second coils 230-1 to 230-4 may be disposed on, for example, the corner portions of the coil board 231 or the corner portions of the upper surface of the coil board 231 so as to correspond to or to be aligned with the first magnets 130-1 to 130-4 in a direction parallel to the optical axis, the disclosure is not limited thereto. In another embodiment, the second coils may also be disposed on the sides of the upper surfaces of the coil board 231.

Each of the second coils 230-1 to 230-4 may be embodied as a ring-shaped coil block.

In the embodiment, although the four second coils 230-1 to 230-4 may be disposed on the corners of the coil board 231 as illustrated in FIGS. 12 and 13, the disclosure is not limited thereto.

In another embodiment, the coil board 231 may be provided with one second coil for the second direction (for example, the x-axis direction) and one second coil for the third direction (for example, the y-axis direction). In a further embodiment, the coil board 231 may also be provided with four or more second coils.

Electromagnetic force may be generated by interaction between the first magnets 130-1 to 130-4, which are positioned so as to face one another, and the second coils 230-1 to 230-4, to which a drive signal is supplied. The housing 140 is moved in the second and/or third directions using the electromagnetic force, thereby implementing handshake correction.

The first end of each of the second coils 230-1 to 230-4 is bonded to a corresponding one of the first pads 252-1 to 252-8 of the circuit board 250, and the second end of each of the second coils 230-1 to 230-4 is bonded to another corresponding one of the first pads 252-1 to 252-8 of the circuit board 250.

One or more connectors may be positioned between two adjacent second coils provided on the coil board 231.

As illustrated in FIG. 12, for example, the second coils 230-1 to 230-4 may be disposed on the corners of the upper surface of the coil board 231, and two of the connectors may be disposed on each side of the upper surface of the coil board 231 so as to be spaced apart from each other.

In order to bond the connectors of the coil board 231 to the first pads 252-1 to 252-8 of the circuit board 250, the connectors of the coil board 231 may be aligned with or may overlap the first pads 252-1 to 252-8 of the circuit board 250 in a direction parallel to the optical axis.

Each of the connectors of the coil board 231 may include a corresponding one of recesses 235-1 to 235-8, which are depressed in the outer surface of the coil board 231, and a corresponding one of bonding portions 236-1 to 236-8 provided adjacent to the corresponding one of the recess 235-1 to 235-8.

For example, the bonding portions 236-1 to 236-8 may be provided on regions of the upper surface of the coil board 231 adjacent to the recesses 235-1 to 235-8.

The recesses 235-1 to 235-8 may be provided on at least one side of the upper surface of the coil board 231. For example, at least one recess may be formed in each of sides of the upper surface of the coil board 231. For example, two recesses may be provided in each of sides of the upper surface of the coil board 231 so as to be spaced apart from each other.

For example, the recesses 235-1 to 235-8 may be provided in a first section S1 (see FIG. 12) of at least one side of the coil board 231. The first section S1 may be configured to be depressed relative to second sections S2. The second sections S2 may be the remaining region of the at least one side of the upper surface of the coil board 231 excluding the first section S1.

For example, the first section S1 of the coil board 231 may be the central region of the one side of the coil board 213, and the second sections S2 may be regions between the first section S1 and corners adjacent to the one side of the coil board 213.

In another embodiment, the first section may not be a depressed structure, and the first section and the second sections of the coil board 231 may be positioned on the same plane.

Each of the bonding portions 236-1 to 236-8 of the coil board 231 may be conductively connected to a corresponding one of the second coils 230-1 to 230-8 via a wire or pattern formed on the coil board 231, without being limited thereto. The connections between first and second ends of the second coils 230-1 to 230-8 and the bonding portions 236-1 to 236-8 of the coil board 231, which are illustrated in FIG. 12, may be variously implemented.

The coil board 231 may include a conductive layer (for example, a copper layer) and an insulation layer disposed on the conductive layer. The second coils 230-1 to 230-4 may be formed by patterning the conductive layer, and the bonding portions 236-1 to 236-8 may be formed by removing parts of the insulation layer adjacent to the recesses 235-1 to 235-8 of the coil board 231 and thus partially exposing the conductive layer.

For example, two bonding portions may be disposed on each of the sides of the upper surface of the coil board 231 so as to be spaced apart from each other.

Figure 14:
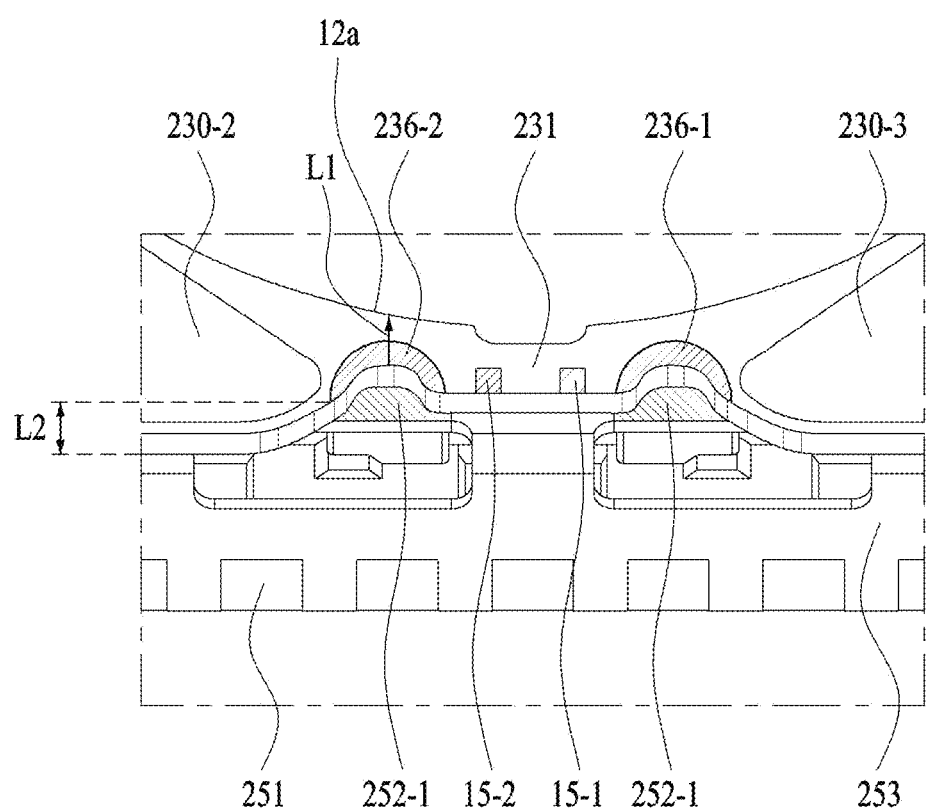
FIG. 14 is an enlarged view of a dotted rectangular area of FIG. 13.

FIG. 14 is an enlarged view of the dotted rectangular area in FIG. 13.

Referring to FIG. 14, each of the bonding portions 236-1 to 236-8 of the coil board 231 may be disposed so as to be aligned with or to overlap a corresponding one of the first pads 252-1 to 252-8 of the circuit board 250 in a direction parallel to the optical axis.

Each of the recesses 235-1 to 235-8 of the coil board 213 may expose a corresponding one of the first pads 252-1 to 252-8 of the circuit board 250. For example, each of the recesses 235-1 to 235-8 may expose the upper surface of a corresponding one of the first pads 252-1 to 252-8.

Each of the recesses 235-1 to 235-8 of the coil board 231 may be configured to have a semicircular, semi-elliptical or polygonal shape, without being limited thereto. Each of the recesses 235-1 to 235-8 may be configured to have any shape, as long as it exposes a corresponding one of the first pads 252-1 to 252-8.

Each of the bonding portions 236-1 to 236-8 may be provided on a region of the upper surface of the coil board 231 within a predetermined distance from a corresponding one of the recesses 235-1 to 235-8. For example, each of the bonding portions 236-1 to 236-8 may be configured to have a semicircular, semi-elliptical or polygonal band.

The circuit pattern and the wiring pattern formed on the coil board 231 are relatively simple, compared to the circuit pattern and the wiring pattern formed on the circuit board 250.

More specifically, no pattern, or only a simple circuit pattern or wiring pattern, is provided on the region of the coil board 231 between the regions of the coil board 231 on which the second coils 230-1 to 230-4 are formed. Consequently, the restriction on the space required to form the recesses 235-1 to 235-8 in the region between the outer surface 12b and the inner surface 12a of the coil board 231 may be alleviated. Thus, the distance L1 between the center of one of the recesses 235-1 to 235-8 and the inner surface 12a of the coil board 231 may be freely designed.

Since the distance L1 between the center of one of the recesses 235-1 to 235-8 and the inner surface 12a of the coil board 231 may be freely set, it is possible to position the recesses 235-1 to 235-8 in the vicinity of the inner surface 12a of the coil board 231 in consideration of the range required for electrical contact and bonding to the first pads 252-1 to 252-8.

Since it is possible to position the recesses 235-1 to 235-8 in the vicinity of the inner surface 12a of the coil board 231, it is possible to increase the spacing L2 between the edge of the coil board 231 and a corresponding one of the bonding portions 252-1 to 252-8.

The conductive adhesive members 239a and 239b function to bond the first pads 252-1 to 252-8 of the circuit board 250 to the bonding portions 252-1 to 252-8 of the coil board 231.

Figure 15:
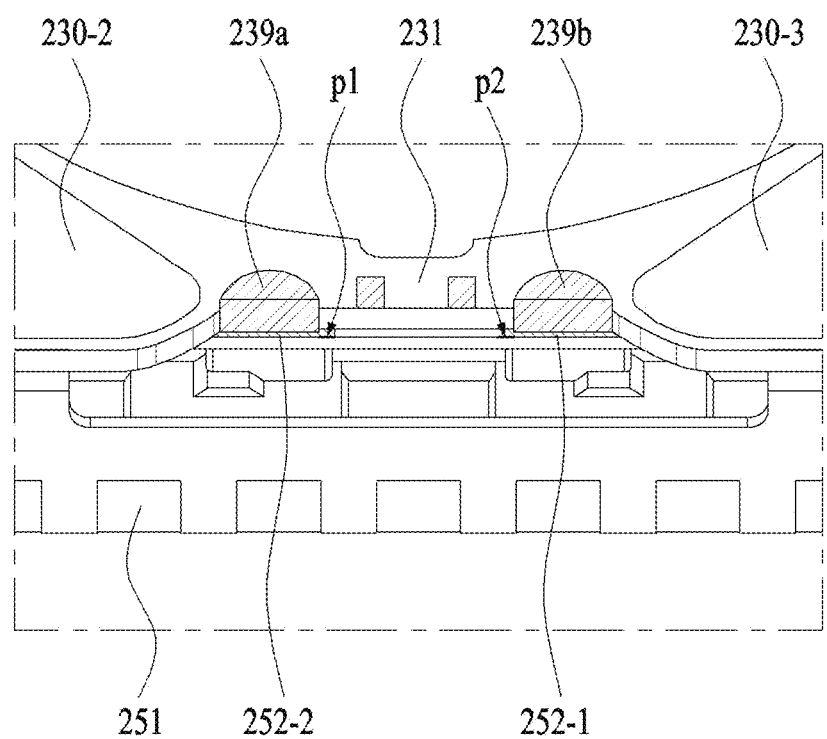
FIG. 15 is a view showing a conductive adhesive member for bonding first pads to bonding portions illustrated in FIG. 14.

FIG. 15 is a view showing the conductive adhesive members 239a and 239b for bonding the first pads 252-1 to 252-8 to the bonding portions 252-1 to 252-8, which are illustrated in FIG. 14.

Referring to FIG. 15, the conductive adhesive members 239a and 239b may be disposed on the upper surfaces of the first pads (for example, 252-1 and 252-2) of the circuit board 250 and on the upper surfaces of the bonding portions 252-1 to 252-8 of the coil board 231, thereby bonding the upper surfaces of the first pads (for example, 252-1 and 252-2) to the upper surfaces of the bonding portions 252-1 to 252-8 and connecting the them to each other.

The conductive adhesive members 239a and 239b bonded to the bonding portions 252-1 to 252-8 of the coil board 231 may be configured to protrude from the upper surface of the coil board 231.

For example, the lower surfaces of the conductive adhesive members 239a and 239b may cover all of the upper surfaces of the first pads (for example, 252-1 and 252-2) of the circuit board 250 and the upper surfaces of the bonding portions 252-1 to 252-8 of the coil board 231.

The upper surfaces of the conductive adhesive members 239a and 239b may protrude upwards from the upper surface of the coil board 231 so as to be positioned above the upper surface of the coil board 231.

For example, each of the conductive adhesive members 239a and 239b may be disposed on a corresponding one of the first pads (for example, 252-1 and 252-2) of the circuit board 250 and a corresponding one of the bonding portions 252-1 to 252-8 of the coil board 231, which are exposed through the recesses 235-1 to 235-8, and may thus come into contact with the first pads (for example, 252-1 and 252-2) and the bonding portions 252-1 to 252-8.

The conductive adhesive members 239a and 239b may be made of conductive adhesive material, for example, solder or conductive paste, without being limited thereto.

The conductive adhesive members 239a and 239b may be positioned so as to be spaced apart from the outer surface or the edges p1 and p2 of the circuit board 250 adjacent to the first pads 252-1 to 252-8.

For example, the conductive adhesive members 239a and 239b may be positioned inside the outer surface or the edges p1 and p2 of the circuit board 250 adjacent to the first pads 252-1 to 252-8.

First surfaces of the conductive adhesive members 239a and 239b, which face toward the outside of the outer surface or the edges p1 and p2 of the circuit board 250, may have a linear shape or a flat surface, and second surfaces of the conductive adhesive members 239a and 239b may have a curved shape or a curved surface. Here, the second surfaces of the conductive adhesive members 239a and 239b may face the first surfaces of the conductive adhesive members 239a and 239b.

The conductive adhesive members 239a and 239b do not protrude outward beyond the edges p1 and p2 of the circuit board 250 adjacent to the first pads 252-1 to 252-8. For example, the first surfaces of the conductive adhesive members 239a and 239b may not protrude outward beyond the edges p1 and p2 of the circuit board 250. Consequently, it is possible to inhibit electrical contact between the conductive adhesive members 239a and 239b and the elastic support members 220-1 to 220-4.

Figure 16A:
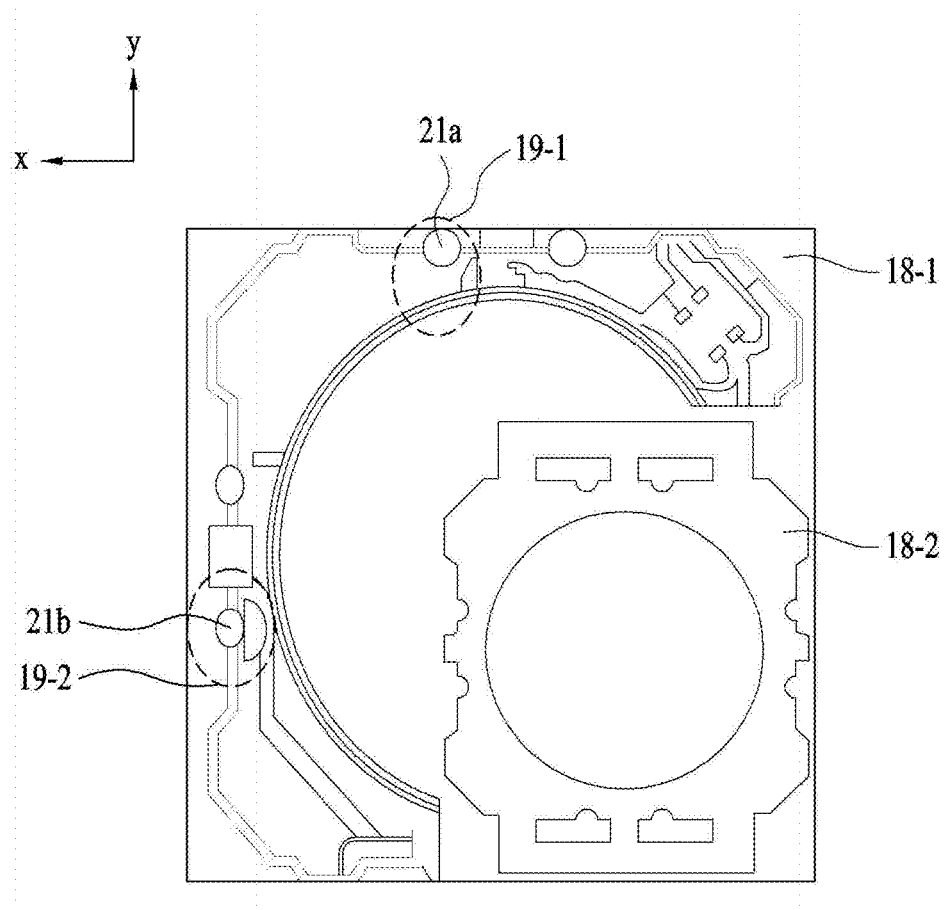
FIG. 16a is a view showing general bonding between the circuit board and a coil board.
Figure 16B:
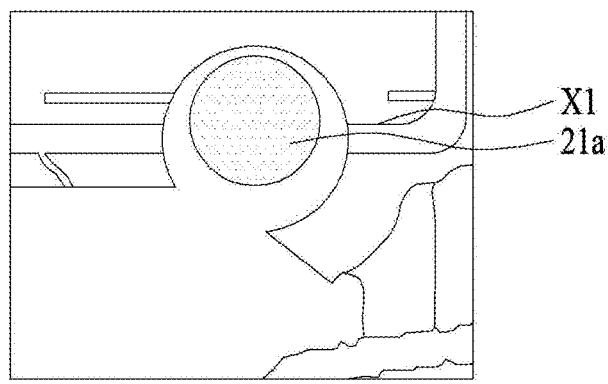
Figure 16C:
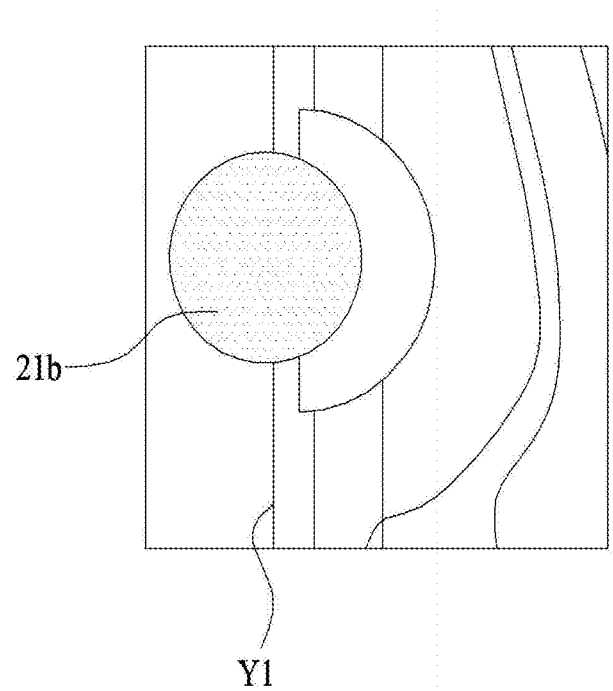

FIG. 16a is a view showing typical bonding between a circuit board 18-1 and a coil board 18-2, FIG. 16b is an enlarged view of a first bonding region 19-1 of FIG. 16a, and FIG. 16c is an enlarged view of a second bonding region 19-2 of FIG. 16a.

Referring to FIG. 16a, the lower surface of the coil board 1802 is provided with a pad, and the upper surface of the circuit board 18-1 is provided with a bonding portion to be bonded to the pad of the coil board 18-2.

The coil board 18-2 is positioned such that the lower surface thereof faces upwards, and the circuit board 18-1 is positioned such that the upper surface thereof faces the lower surface of the coil board 18-2. Here, the circuit board 18-1 may be disposed on the coil board 18-2 such that the bonding portion provided on the upper surface of the circuit board 18-1 is aligned with the pad provided on the lower surface of the coil board 18-2.

After the circuit board 18-1 is disposed on the coil board 18-2, the pad of the coil board 18-2 is bonded to the bonding portion of the circuit board 18-1 by means of solders 21a and 21b.

The circuit board 18-1 is positioned such that the lower surface thereof faces the upper surface of a base, and the combined structure in which the bonding portion of the circuit board 18-1 is bonded to the pad of the coil board 18-2 is coupled to the base.

Referring to FIG. 16b, the first solder 21a, which is positioned at one side of the upper surface of the circuit board 18-1 perpendicular to the x-axis, protrudes from the edge X1 of the circuit board 18-1 in a direction perpendicular to the optical axis (for example, in the y-axis direction).

Referring to FIG. 16c, the second solder 21b, which is positioned at one side of the upper surface of the circuit board 18-1 parallel to the y-axis, protrudes from the edge Y1 of the circuit board 1801 in a direction perpendicular to the optical axis (for example, in the x-axis direction).

Furthermore, because the first and second solders 21a and 21b protrude toward the base from the lower surface of the circuit board 18-1, the base has to be provided with additional recesses corresponding to the first and second solders 21a and 21b in order to stably mount the circuit board 18-1 on the base.

Furthermore, because the circuit board 18-1 is provided with additional circuit patterns, the bonding portion of the circuit board 18-1 cannot be freely designed, thereby restricting the size of the bonding portion. Hence, because the bonding portion has a reduced size, bonding force between the first and second solders 21a and 21b and the bonding portion is reduced. As a result, the bonding portion is damaged or cracks may occur in the first and second solders 21a and 21b in the event of an impact, and electrical connection may be interrupted.

Figure 17A:
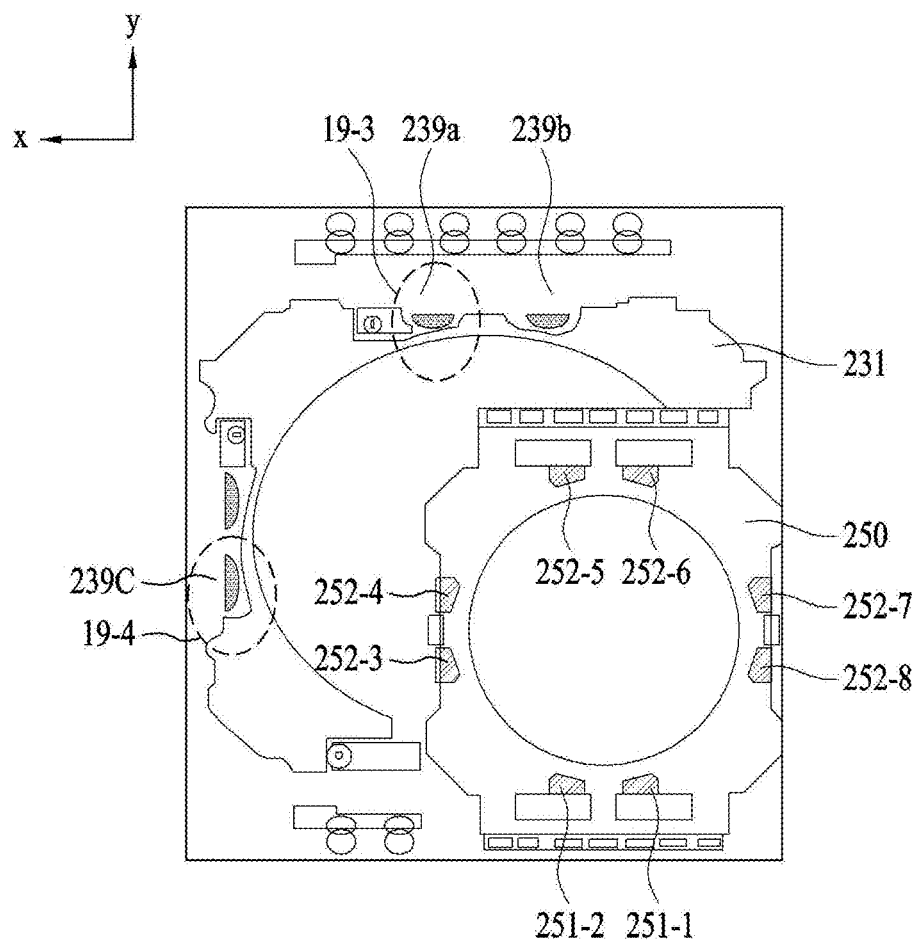
FIG. 17a is a view showing bonding between the circuit board and the coil board according to the embodiment.
Figure 17B:
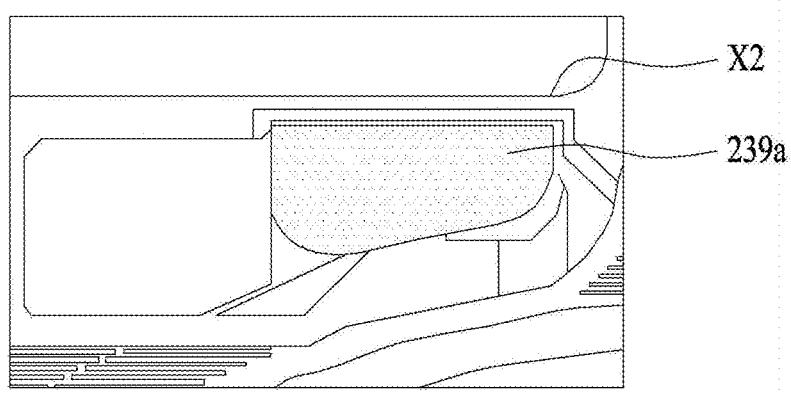
Figure 17C:
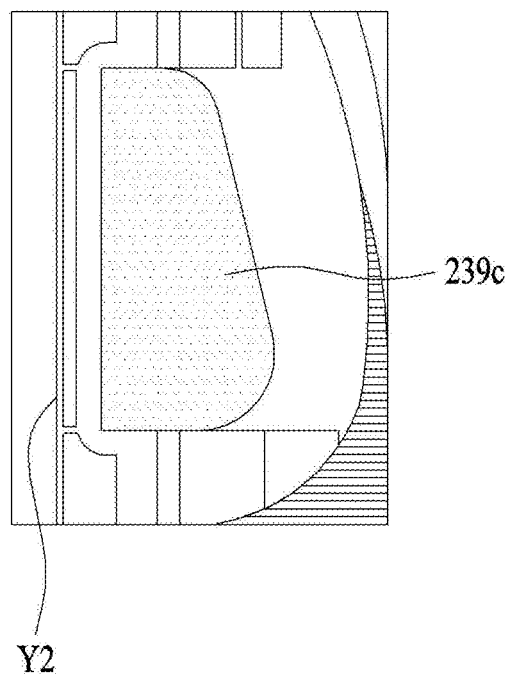

FIG. 17a is a view showing bonding between the circuit board 250 and the coil board 231 according to the embodiment, FIG. 17b is an enlarged view of a first bonding region 19-3 in FIG. 17a, and FIG. 17c is an enlarged view of a second bonding region 19-4 in FIG. 17a.

Referring to FIG. 17a, bonding portions (not shown) are provided on the upper surface of the coil board 231, and the first pads 252-1 to 252-8, which are to be bonded to the bonding portions of the coil board 231, are provided on the upper surface of the circuit board 250.

The circuit board 250 is coupled to the upper surface of the base 210. Subsequently, the coil board 231 is disposed on the circuit board 250 such that the bonding portions are aligned with the first pads 252-1 to 252-8 of the circuit board 250.

The first pads 252-1 to 252-8 of the circuit board 250 are bonded to the bonding portions of the coil board 231 by means of the solders 239a to 239c. Since the coil board 231 is bonded to the circuit board 250 after the circuit board 250 is coupled to the base 210, the embodiment may help inhibit misalignment between the circuit board 250 and the coil board 231.

The solders 239a to 239c may be structures that protrude upwards the upper surface of the circuit board 250 and the upper surface of the coil board 231. Accordingly, the embodiment does not need additional recesses in the base 210 corresponding to the solders 239a to 239c in order to mount the circuit board 250 on the base 210. For example, the solders 239a to 239c may not protrude downwards from the lower surface of the circuit board 250.

Referring to FIG. 17b, the solder 239a, which is positioned at one side of the upper surface of the circuit board 250 parallel to the x-axis, does not protrude from the edge X2 of the circuit board 250 in a direction perpendicular to the optical axis (for example, in the y-axis direction).

Referring to FIG. 17c, the solder 239c, which is positioned at one side of the upper surface of the circuit board 250 parallel to the y-axis, does not protrude from the edge Y2 of the circuit board 250 in a direction perpendicular to the optical axis (for example, in the x-axis direction). Consequently, the embodiment is able to inhibit an electrical short between the solders 239a and 239b and the elastic support members 220-1 to 220-4.

Since the bonding portions 236-1 to 236-8 are provided on the coil board 231, which has simpler circuit patterns or wiring patterns than the circuit board 250, restriction on size of the bonding portions 236-1 to 236-8 is alleviated, thus enabling freedom in design of the bonding portions 236-1 to 236-8. Consequently, the embodiment is able to inhibit damage to the bonding portions and cracks in the solders attributable to impact, which would otherwise be generated owing to reduction of bonding force between the solders and the bonding portions of the coil board.

Figure 18:
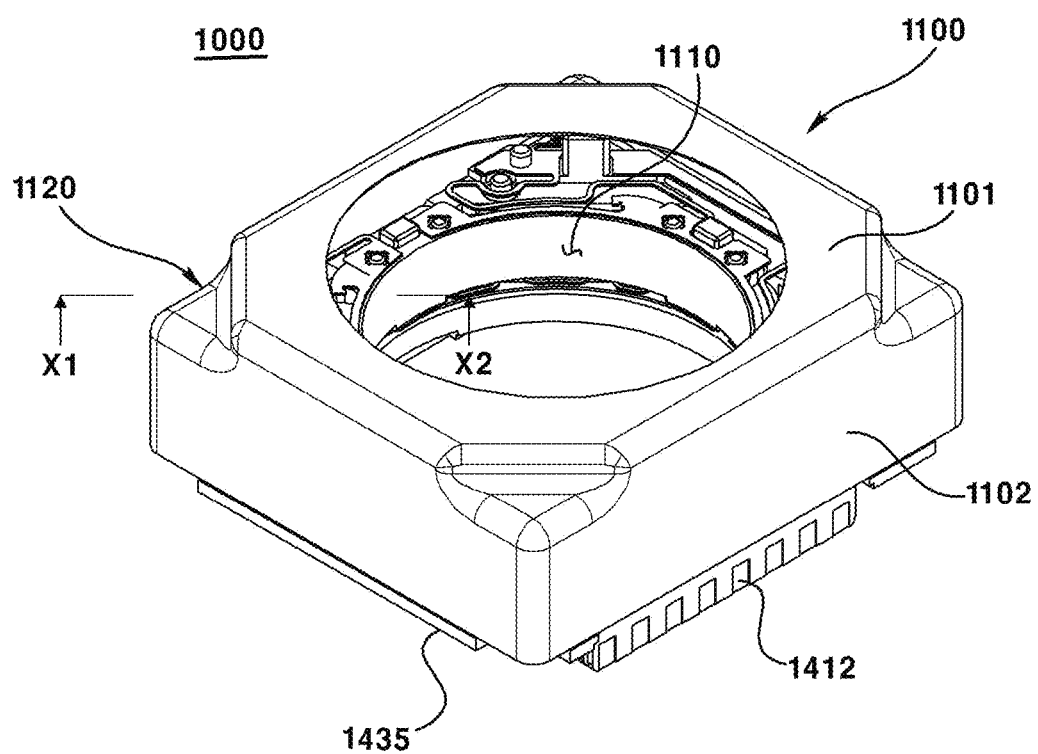
FIG. 18 is a perspective view of a lens moving apparatus according to another embodiment.
Figure 19:
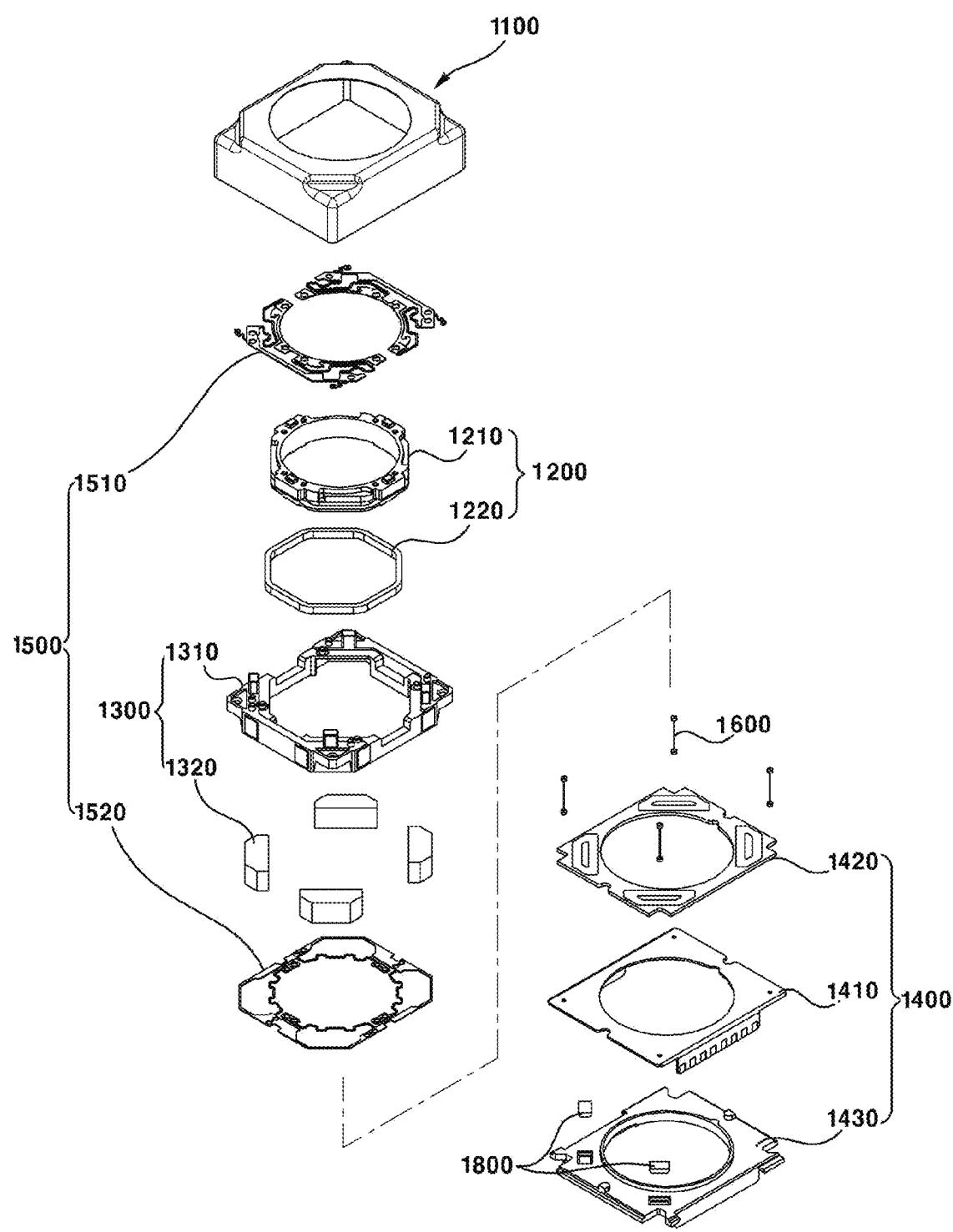
FIG. 19 is an exploded perspective view of the lens moving apparatus illustrated in FIG. 18.
Figure 20:
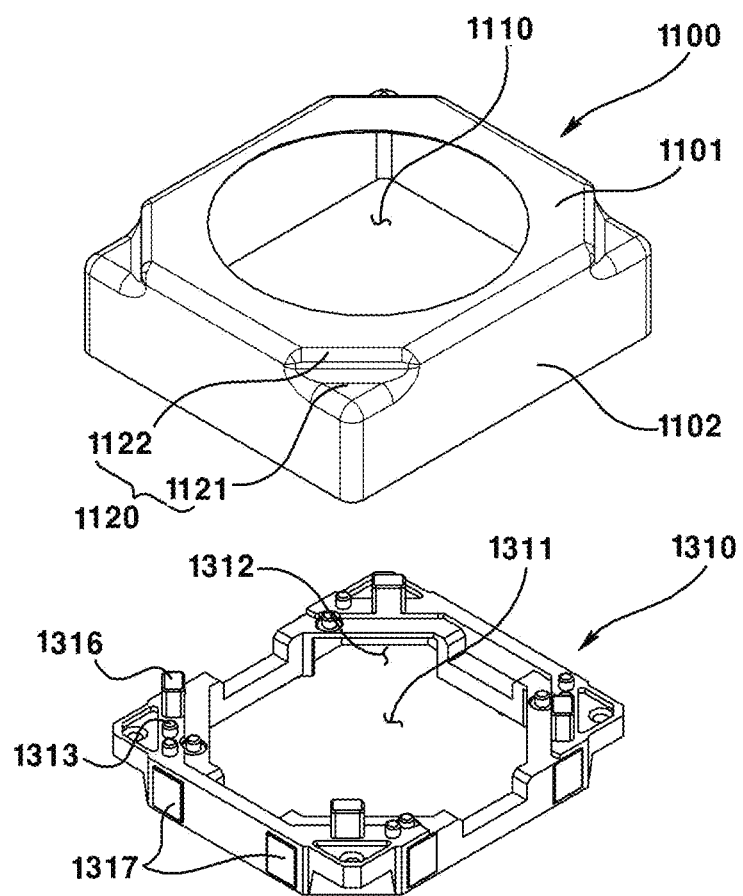
FIG. 20 is an exploded perspective view of some components of the lens moving apparatus illustrated in FIG. 19.
Figure 21:
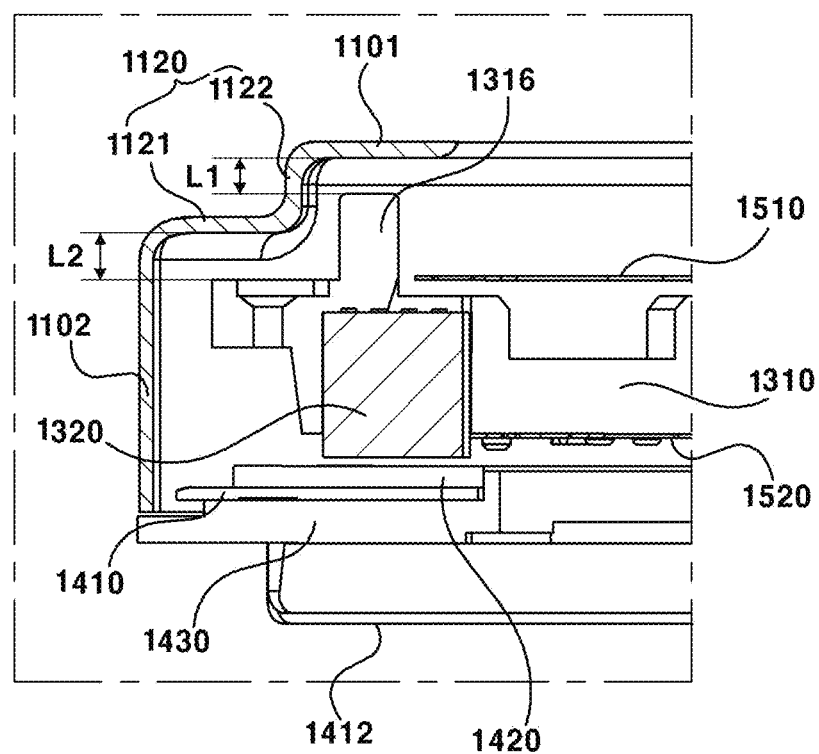
FIG. 21 is a cross-sectional view taken along line X1-X2 in FIG. 18.
Figure 22:
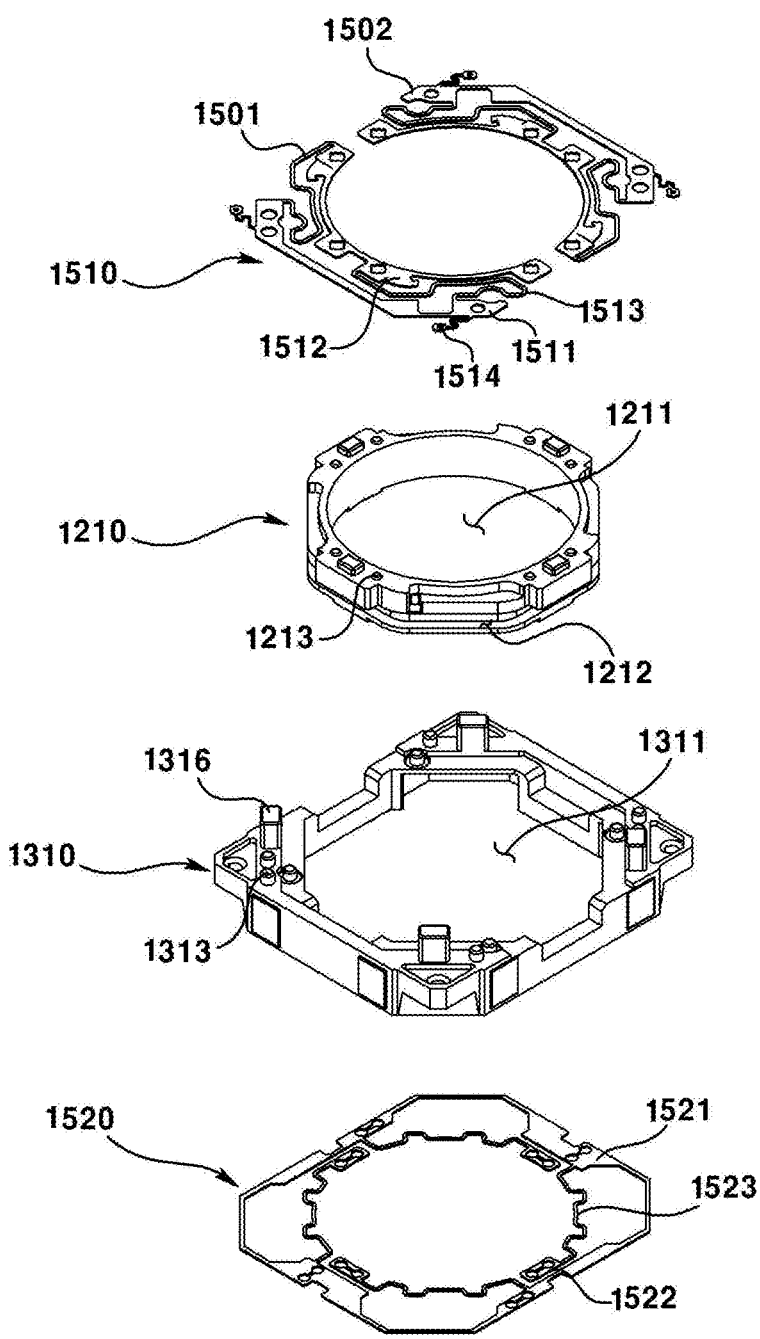
FIGS. 22 and 23 are exploded perspective views of some components of the lens moving apparatus illustrated in FIG. 19.
Figure 23:
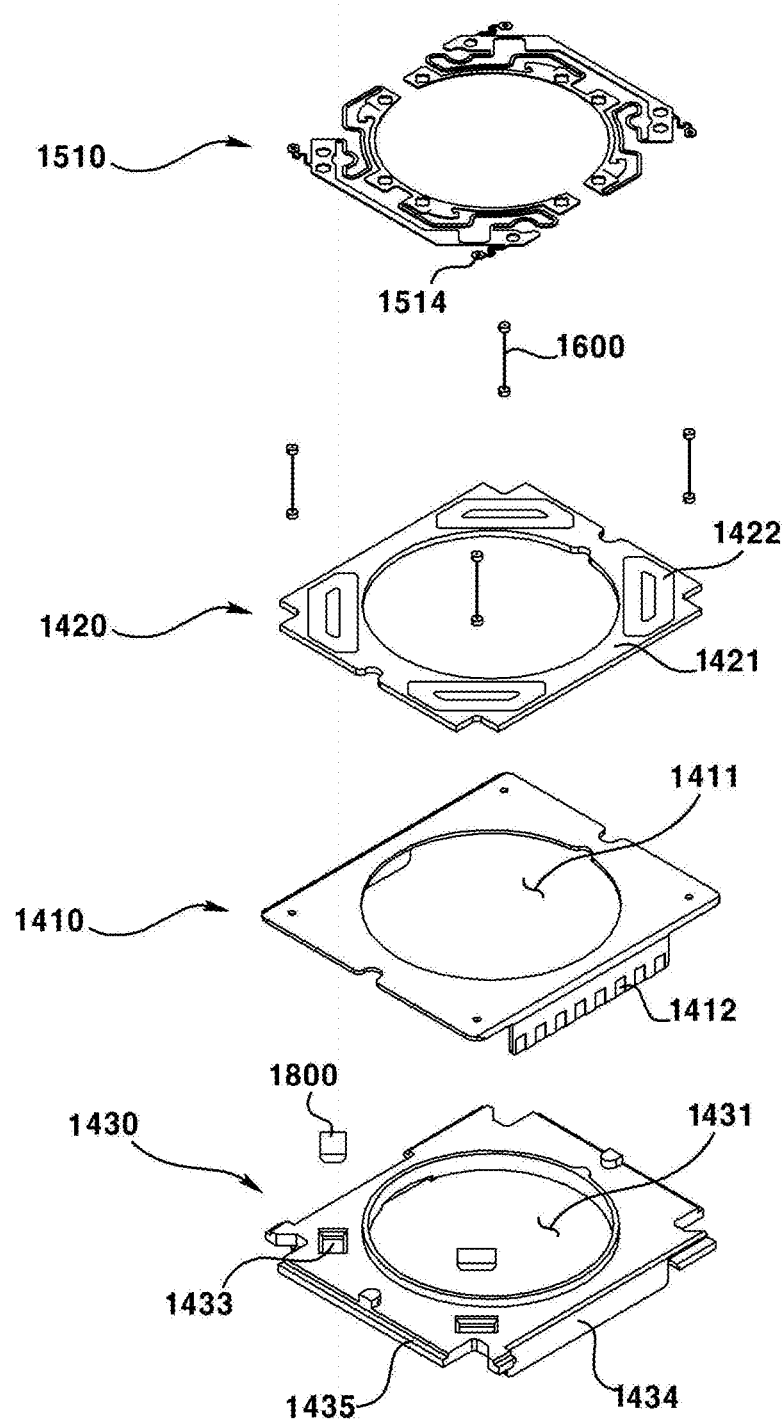

FIG. 18 is a perspective view of a lens moving apparatus 1000 according to another embodiment, and FIG. 19 is an exploded perspective view of the lens moving apparatus 1000 illustrated in FIG. 18. FIG. 20 is an exploded perspective view of some components of the lens moving apparatus 1000 illustrated in FIG. 19, and FIG. 21 is a cross-sectional view taken along line X1-X2 in FIG. 18. FIGS. 22 and 23 are exploded perspective views of some components of the lens moving apparatus 1000 illustrated in FIG. 19.

The lens moving apparatus 1000 may include a cover member 1100, a first movable unit 1200, a second movable unit 1300, a stationary unit 1400, a first support member 1500, second support members 1600, and AF and OIS feedback sensors 1800. However, one or more of the cover member 1100, the first movable unit 1200, the second movable unit 1300, the stationary unit 1400, the first support member 1500, the second support members 1600, and the AF and OIS feedback sensors 1800 of the lens moving apparatus 1000 may be omitted or modified. In particular, the AF and OIS feedback sensors 1800 are components for autofocus feedback control and handshaking correction feedback control, and one or more of the sensors may be omitted.

One of an AF drive coil 1220, a drive magnet 1320 and an OIS drive coil 1422 may be referred to as a 'first drive unit', another component may be referred to as a 'second drive unit', and the one remaining component may be referred to as a 'third drive unit'. The AF drive coil 1220, the drive magnet 1320 and the OIS drive coil 1422 may be interchangeably disposed with respect to one another.

One of the AF drive coil 1220 and the OIS drive coil 1422 may be referred to as a 'first coil', and the other may be referred to as a 'second coil'.

The cover member 1100 may define the appearance of the lens moving apparatus 1000. The cover member 1100 may be configured to have the shape of an approximate rectangular parallelepiped having an open bottom. However, the shape of the cover member 1100 is not limited thereto. The cover member 1100 may be made of a non-magnetic material. If the cover member 1100 is made of a magnetic material, the magnetic force of the cover member 1100 may affect the drive magnet 320. The cover member 1100 may be made of a metal. More specifically, the cover member 1100 may be made of a metal plate. In this case, the cover member 1100 may shield the interior against electromagnetic interference (EMI). Owing to these characteristics of the cover member 1100, the cover member 1100 may be referred to as an 'EMI shield can'. The cover member 1100 may inhibit electric waves, which are generated outside the lens moving apparatus, from being introduced thereinto. Furthermore, the cover member 1100 may inhibit electric waves, which are generated inside the cover member 1100, from being emitted outside.

The cover member 1100 may include a top plate 1101 and a side plate 1102. The cover member 1100 may include the side plate 1102, which extends downwards from the outer periphery of the top plate 1101. In an example, the cover member 1100 may be coupled to a base 1430. The side plate 1102 of the cover member 110 may be coupled at part thereof to the base 1430. The lower end of the side plate 1102 of the cover member 1100 may be disposed in a depressed portion 1435 in the base 1430. The inner surface of the side plate 1102 of the cover member 1100 may be brought into direct contact with the outer lateral side surface of the base 1430. The inner surface of the side plate 1102 of the cover member 1100 may be coupled to the base 1430 by means of an adhesive (not shown). In another example, the cover member 1100 may be directly coupled to the upper surface of a printed circuit board. The first movable unit 1200, the second movable unit 1300, the stationary unit 1400, the first support member 1500 and the second support members 1600 may be disposed in the internal space defined by the cover member 1100 and the base 1430. By virtue of this configuration, the cover member 1100 is able to protect the internal components from external shocks and to inhibit the entry of external contaminants. The top plate 1101 may include an opening 1110. The side plate 1102 may extend downwards from the top plate 1101.

The cover member 1100 may include the opening 1110 and depressed portions 1120. The depressed portions 1120 in the cover member 1100 may be omitted or modified.

The opening 1110 may be formed in the top plate 1101 of the cover member 1100. The opening 1110 may function to allow a lens or a lens module 400 (see FIG. 29) to be exposed upwards. The opening 1110 may be configured to have a shape corresponding to that of the lens module. The size of the opening 1110 may be larger than the diameter of the lens module so as to allow the lens module to be mounted through the opening 1110. Light, which is introduced through the opening 1110, may pass through the lens module. Here, the light having passed through the lens module may be converted into an electric signal and may then be obtained as an image at an image sensor.

The depressed portions 1120 may be formed in the corners of the top plate 1101 of the cover member 1100. The embodiment may have a characteristic by which the depressed portions serving as mechanical stoppers for the housing 1310 are positioned at the corners of the cover member 1100. By virtue of this characteristic, the direction of movement of the housing 1310 may coincide with the direction of disposition of the mechanical stoppers. Here, stroke dispersion of the housing 1310 may be reduced. For reference, the housing 1301 may move in a diagonal direction by virtue of the drive magnets 1320, which are provided as corner magnets.

The depressed portions 1120 may overlap at least part of stoppers 1316 in a direction perpendicular to the optical axis. Accordingly, each of the depressed portions 1120 according to the embodiment may serve as a mechanical stopper for the housing 1310, which functions in a diagonal direction. The depressed portions 1120 may be formed by bending the cover member 1100. Here, the bent portions of the cover member 1100 may be round. The round portions of the cover member 1100 may be referred to as "round portions". The depressed portions 1120 may be integrally formed with the cover member 1100.

When the cover member 1100 is viewed from above, each of the depressed portions 1120 may have an isosceles right triangular shape, without being limited thereto. The depressed portions 1120 may be disposed at the four corners of the cover member 1100 so as to be symmetrical with one another. Here, the housing 1310 may be provided with four stoppers 1316 corresponding to the four depressed portions 1120, without being limited thereto. Consequently, the four depressed portions 1120 may serve as mechanical stoppers by virtue of interaction with the stoppers 1316 in any of four directions corresponding to the diagonal directions.

Each of the depressed portions 1120 may include a stepped plate 1121 and a connecting plate 1122. However, one or more of the stepped plate 1121 and the connecting plate 1122 of the depressed portion 1120 may be omitted or modified.

The stepped plate 1121 may be parallel to the top plate 1101 of the cover member 1100. Alternatively, the stepped portion 1121 may be positioned so as not to be parallel to the top plate 1101 of the cover member 1100. The stepped plate 1121 may intersect the connecting plate 1122. The stepped plate 1121 may be perpendicular to the side plate 1102 of the cover member 1100. When viewed from above, the stepped plate 1121 may have an isosceles right triangular shape, without being limited thereto.

The connecting plate 1122 may connect the stepped plate 1121 to the top plate 1101 of the cover member 1100. The connecting plate 1122 may be perpendicular to the stepped plate 1121 and the top plate 1101 of the cover member 1100. The connecting plate 1122 may overlap the stopper 1316 in a direction perpendicular to the optical axis. Accordingly, the connecting plate 1122 may come into contact with the stopper 1316 of the housing 1310. When the stopper 1316 of the housing 1310 comes into contact with the connecting plate 1122, further movement of the housing 1310 may be restricted. The connecting plate 1122 may be obliquely connected to the side plate 1102 of the cover member 1100. For example, the connecting plate 112 may be connected to the side plate 1102 of the cover member 1100 at an angle of 135°.

The first movable unit 1200 may be coupled to a lens module, which is a component of a camera module (the lens module may also be referred to as a component of the lens moving apparatus). The first movable unit 200 may accommodate the lens module therein.

The outer peripheral surface of the lens module may be coupled to the inner peripheral surface of the first movable unit 1200. The first movable unit 1200 may be moved by virtue of interaction with the second movable unit 1300 and/or the stationary unit 1400. Here, the first movable unit 1200 may move along with the lens module. The first movable unit 1200 may move for the purpose of implementation of autofocus function. In this case, the first movable unit 1200 may be referred to as an 'AF movable unit'. However, the disclosure is not limited to adaptation of the first movable unit 1200 only to implement an autofocus function. The first movable unit 1200 may also move for the purpose of implementation of handshake correction.

The first movable unit 1200 may include a bobbin 1210 and an AF drive coil 1220. However, one or more of the bobbin 1210 and the AF drive coil 1220 of the first movable unit 1200 may be omitted or modified.

The bobbin 1210 may be disposed in a bore 1311 in the housing 1311 so as to be moved in a direction parallel to the optical axis. The bobbin 1210 may be disposed inside the housing 1310. The bobbin 1210 may be disposed in the bore 1311 in the housing 1310. The bobbin 1210 may move with respect to the housing 1310 in the optical-axis direction. The bobbin 1210 may be coupled to the lens module. The outer peripheral surface of the lens module may be coupled to the inner peripheral surface of the bobbin 1210. The AF drive coil 1220 may be coupled to the bobbin 1210. The AF drive coil 1220 may be coupled to the outer peripheral surface of the bobbin 1210. The lower portion of the bobbin 1210 may be coupled to a lower elastic member 1520. The upper portion of the bobbin 1210 may be coupled to the upper elastic member 1510.

The bobbin 1210 may include a bore 1211, a drive coupling portion 1212, an upper coupling portion 1213 and a lower coupling portion (not shown). However, one or more of the bore 1211, the drive coupling portion 1212, the upper coupling portion 1213 and the lower coupling portion of the bobbin 1210 may be omitted.

The bore 1211 may be formed inside the bobbin 1210. The bore 1211 may be formed so as to be open upwards and downwards. The lens module may be coupled to the bore 1211. The bore 1211 may be provided in the inner peripheral surface thereof with a threaded portion that corresponds to a threaded portion formed in the outer peripheral surface of the lens module. In other words, the bore 1211 may be threadedly coupled to the lens module. An adhesive is disposed between the lens module and the bobbin 1210. Here, the adhesive may be epoxy, which is hardened by ultraviolet, heat or a laser.

The AF drive coil 1220 may be coupled to the driver coupling portion 1212. The driver coupling portion 1212 may be formed on the outer peripheral surface of the bobbin 1210. The driver coupling portion 1212 may be embodied as a groove, which is formed by depressing part of the outer peripheral surface of the bobbin 1210. Here, the driver coupling portion 1212 may receive at least part of the AF drive coil 1220. The driver coupling portion 1212 may be integrally formed with the outer peripheral surface of the bobbin 1210. In an example, the driver coupling portion 1212 may be continuously formed along the outer peripheral surface of the bobbin 1210. Here, the AF drive coil 1220 may be wound around the driver coupling portion 1212. In another example, the driver coupling portion 1212 may include a plurality of driver coupling portions, which are spaced apart from each other. In this case, the AF drive coil 1220 may also include a plurality of AF drive coils, which are respectively coupled to the plurality of driver coupling portions 1212. In a further example, the driver coupling portion 1212 may be configured so as to be open upwards and downwards. Here, the AF drive coil 1220, which has been previously wound, may be fitted on the bobbin through the bore thereof and may be fitted in and coupled to the driver coupling portion 1212.

The upper coupling portion 1213 may be coupled to the upper elastic member 1510. The upper coupling portion 1213 may be coupled to an inner part or a first inner frame 512 of the upper elastic member 1510. The upper coupling portion 1213 may protrude upwards from the upper surface of the bobbin 1210. In an example, the protrusions of the upper coupling portion 1213 may be fitted in a groove or hole in the first inner frame 1512 of the upper elastic member 1510. Here, the protrusions of the upper coupling portion 1213 may be fused by heat in the state of being fitted in the holes in the first inner frame 1512, thereby securing the upper elastic member 1510 between the fused protrusions and the upper surface of the bobbin 1210.

The lower coupling portion may be coupled to the lower elastic member 1520. The lower coupling portion may be coupled to an inner part or a second inner frame 1522 of the lower elastic member 1520. The lower coupling portion may protrude downward from the lower surface of the bobbin 210. In an example, the protrusions of the lower coupling portion may be fitted into the grooves or holes in the second inner frame 1522 of the lower elastic member 1520 and may be coupled thereto. Here, the protrusions of the lower coupling portion may be fused by heat in the state of being fitted in the holes in the second inner frame 1522, thereby securing the lower elastic member 1520 between the fused protrusions and the lower surface of the bobbin 1210.

The AF drive coil 1220 may be disposed on the bobbin 1210. The AF drive coil 1220 may be disposed on the outer peripheral surface of the bobbin 1210. The AD drive coil 1220 may be directly wound around the bobbin 1210. The AF drive coil 1220 may face the drive magnets 1320. Here, when a magnetic field is created around the AF drive coil 1220 by the supply of current to the AF drive coil 1220, the AF drive coil 1220 may be moved relative to the drive magnet 1320 by virtue of electromagnetic interaction between the AF drive coil 1220 and the drive magnets 1320.

The AF drive coil 1220 may perform electromagnetic interaction with the drive magnets 1320. The AF drive coil 1220 may move the bobbin 1210 in the optical-axis direction with respect to the housing 1310 by virtue of the electromagnetic interaction with the drive magnets 1320. In an example, the AF drive coil 1220 may be a single coil, which is integrally formed. In another example, the AF drive coil 1220 may include a plurality of coils, which are spaced apart from each other. The AF drive coils 1220 may include four coils, which are spaced apart from each other. Here, the four coils may be disposed on the outer peripheral surface of the bobbin 1210 such that two adjacent coils thereof define an angle of 90° therebetween.

The AF drive coil 1220 may include a pair of lead wires for the supply of power. Here, the pair of lead wires of the AF drive coil 1220 may be conductively connected to first and second upper springs 1501 and 1502, which are components of the upper elastic member 1510.

In other words, power may be supplied to the AF drive coil 1220 by way of the upper elastic member 1510. More specifically, power may be supplied to the AF drive coil 1220 by way of a printed circuit board, a circuit board 1410, the support members 1600 and the upper elastic member 1510 in this order. Alternatively, power may be supplied to the AF drive coil 1220 by way of the lower elastic member 1520.

The second movable unit 1300 may accommodate therein at least part of the first movable unit 1200. The second movable unit 1300 may be moved by the first movable unit 1200 or may be moved along with the first movable unit 1200. The second movable unit 1300 may be moved by virtue of interaction with the stationary unit 1400. The second movable unit 1300 may be moved for handshake correction. Here, the second movable unit 1300 may be referred to as an 'OIS movable unit'. When the second movable unit 1300 is moved for handshake correction, the second movable unit 1300 may be moved along with the first movable unit 1200.

The second movable unit 1300 may include the housing 1310 and the drive magnets 1320. However, one or more of the housing 1310 and the drive magnets 1320 of the second movable unit 1300 may be omitted or modified.

The housing 1310 may be disposed outside the bobbin 1210. The housing 1310 may accommodate therein at least part of the bobbin 1210. In an example, the housing 1310 may be configured to have a rectangular parallelepiped shape. The housing 1310 may include four side surfaces and four corner portions, each of which is disposed between two adjacent side surfaces.

The drive magnets 1320 may be disposed on the housing 1310. The drive magnets 1320 may be respectively disposed on the four corner portions. The housing 1310 may be disposed inside the cover member 1100. At least part of the outer peripheral surface of the housing 1310 may be configured to have a shape corresponding to that of the inner peripheral surface of the cover member 1100. In particular, the outer peripheral surface of the housing 1310 may be configured to have a shape corresponding to that of the inner peripheral surface of the side plate 1102 of the cover member 1100. The housing 1310 may be made of an insulation material. The housing 1310 may be made of a material, which is different from that of the cover member 1100.

The housing 1310 may be formed through injection molding in consideration of productivity. The outer surface of the housing 1310 may be spaced apart from the inner surface of the side plate 1102 of the cover member 1100. The housing 1310 may be moved for OIS drive in the space defined between the housing 1310 and the cover member 1100. The upper elastic member 1510 may be coupled to an upper portion of the housing 1310. The lower elastic member 1520 may be coupled to a lower portion of the housing 1310.

The housing 1310 may include the bore 1311, a driver coupling portion 1312, a upper coupling portion 1313, a lower coupling portion (not shown), the stoppers 1316 and protrusions 1317. However, one or more of the bore 1311, the driver coupling portion 1312, the upper coupling portion 1313, the lower coupling portion (not shown), the stoppers 1316 and the protrusions 1317 of the housing 1310 may be omitted or modified.

The bore 1311 may be formed in the housing 1310. The bore 1311 may be formed inside the housing 1310. The bore 1311 may be formed vertically through the housing 1310. The bobbin 1210 is disposed in the bore 1311. The bobbin 1210 may be movably disposed in the bore 1311. At least part of the bore 1311 may be configured to have a shape corresponding to that of the bobbin 1210. The inner peripheral surface of the housing 1310, which defines the bore 1311, may be positioned so as to be spaced apart from the outer peripheral surface of the bobbin 1210. The inner peripheral surface of the housing 1310, which defines the bore 1311, may be provided with a stopper, which protrudes inwards therefrom so as to mechanically restrict the movement of the bobbin 1210 in the optical-axis direction.

The drive magnets 1320 may be coupled to the driver coupling portions 1312. The driver coupling portions 1312 may be formed in the housing 1310. The driver coupling portions 1312 may be formed in the inner peripheral surface of the housing 1310. In this case, the driver magnets 1320 disposed in the driver coupling portions 1312 have an advantage in electromagnetic interaction with the AF drive coil 1220 positioned inside the drive magnets 1320. The driver coupling portions 1312 may be open at the lower ends thereof. In this case, This is advantageous from the aspect of electromagnetic interaction of the drive magnets 1320 disposed in the driver coupling portions 1312 with the OIS drive coil 1420 positioned under the drive magnets 1320. The driver coupling portions 1312 may be embodied as grooves, which are formed by depressing the inner peripheral surface of the housing 1310 outwards. The driver coupling portions 1312 may include a plurality of driver coupling portions. The plurality of driver coupling portions 1312 may be respectively provided with the drive magnets 1320 received therein. In an example, the driver coupling portions 1312 may be composed of four driver coupling portions. The four driver coupling portions 1312 may be respectively provided with the drive magnets 1320 disposed therein. The driver coupling portions 1312 may be formed in the corner portions of the housing 1310.

The upper coupling portion 1313 may be coupled to the upper elastic member 1510. The upper coupling portion 1313 may be coupled to a first outer part 1511 of the upper elastic member 1510. The upper coupling portion 1313 may protrude upwards from the upper surface of the housing 1310. In an example, protrusions of the upper coupling portion 1313 may be fitted into grooves or holes in the first outer part or the first outer frame 1511 of the upper elastic member 1510 and may be secured thereto. Here, the protrusions of the upper coupling portion 1313 may be fused by heat in the state of being fitted in the holes in the first outer frame 1511, thereby securing the upper elastic member 1510 between the fused protrusions and the upper surface of the housing 1310.

The lower coupling portion may be coupled to the lower elastic member 1520. The lower coupling portion may be coupled to a second outer part or a second outer frame 1521 of the lower elastic member 1520. The lower coupling portion may protrude downwards from the lower surface of the housing 1310. In an example, protrusions of the lower coupling portion may be fitted into grooves or holes in the second outer frame 1521 of the lower elastic member 1520, and may be coupled thereto. Here, the protrusions of the lower coupling portion may be fused by heat in the state of being fitted in the holes in the second outer frame 1521, thereby securing the lower elastic member 1520 between the fused protrusions and the lower surface of the housing 1310.

The stopper 1316 may protrude from the corner region of the upper surface of the housing 1310. The stopper 1316 may overlap at least part of the depressed portion 1316 in a direction perpendicular to the optical axis. Here, the stopper 1316 may serve as a mechanical stopper functioning in diagonal directions by virtue of interaction between the stopper 1316 and the connecting plate 1122. In other words, when the housing 1310 moves in a diagonal direction, the stopper 1316 comes into contact with the connecting plate 1122 of the depressed portion 1120, thereby restricting further movement of the housing 1310. The stopper 1316 may overlap the connecting plate 1122 in a direction perpendicular to the optical axis.

The outer surface of the stopper 1316 may face the inner surface of the connecting plate 1122. The outer surface of the stopper 1316 may be parallel to the inner surface of the connecting plate 1122. Consequently, as the stopper 1316 moves, the outer surface of the stopper 1316 may come into surface contact with the connecting plate 1122. In this case, since the contact area between the stopper 1316 and the connecting plate 1122 is increased, stroke dispersion of the housing 1310 can be reduced. The stopper 1316 may have a rectangular parallelepiped shape. The corner portions of the rectangular parallelepiped may be round.

The distance between the upper surface of the stopper 1316 and the lower surface of the top plate 1101 of the cover member 1100 (see L1 in FIG. 21) may be shorter than the distance between the upper surface of the housing 1310 and the lower surface of the stepped plate 1121 (see L2 in FIG. 21). In this case, the stopper 1316 may also serve as a mechanical stopper functioning in the optical-axis direction.

The protrusions 1317 may protrude from the side surface of the housing 1310. The outer surface of the protrusion 1317 may face the inner surface of the side plate 1102 of the cover member 1100. The outer surface of the protrusion 1317 may be parallel to the inner surface of the cover member 1100. Here, the protrusion 1317 may serve as a mechanical stopper functioning in the x-axis and/or y-axis direction by virtue of interaction between the protrusion and the cover member 1100.

The drive magnets 1320 may be disposed on the housing 1310. The drive magnets 1320 may be disposed outside the AF drive coil 1220. The drive magnets 1320 may face the AF drive coil 1220. The drive magnets 1320 may perform electromagnetic interaction with the AF drive coil 1220. The drive magnets 1320 may be disposed above the OIS drive coil 1420. The drive magnets 1320 may face the OIS drive coil 1420.

The drive magnets 1320 may perform electromagnetic interaction with the OIS drive coil 1420. The drive magnets 1320 may be used in both autofocus and handshake correction functions. Alternatively, the drive magnets 1320 may include a plurality of magnets, which are separately used in autofocus and handshake correction functions. The drive magnets 1320 may be disposed on the corner regions of the housing 1310. Here, the drive magnets 1320 may be referred to as 'corner magnets'. Each of the corner magnets may be configured to have a rectangular parallelepiped shape, with the inner lateral surface being greater than the outer lateral surface.

The drive magnets 1320 may include a plurality of magnets, which are spaced apart from each other. The drive magnets 1320 may include four drive magnets, which are spaced apart from each other. The four drive magnets may be disposed such that two adjacent drive magnets thereof define an angle of 90° therebetween. In other words, the drive magnets 1320 may be disposed at regular intervals on the four corners of the housing 1310. In this case, it is possible to realize efficient employment of the inner volume of the housing 1310. The drive magnets 1320 may be bonded to the housing by means of adhesive.

The stationary unit 1400 may be disposed under the housing 1310. The stationary unit 1400 may be disposed under the second movable unit 1300. The stationary unit 1400 may face the second movable unit 1300. The stationary unit 1400 may support the second movable unit 1300 in a movable manner. The stationary unit 1400 may move the second movable unit 1300. At this time, the first movable unit 120 may also move along with the second movable unit 1300.

The stationary unit 1400 may include the circuit board 1410, the circuit member 1420 and the base 1430. However, one or more of the circuit board 1410, the circuit member 1420 and the base 1430 of the stationary unit 1400 may be omitted or modified.

The circuit board 1410 may be disposed on the upper surface of the base 1430. The circuit board 1410 may supply power to the circuit member 1420. The circuit board 1410 may be coupled to the circuit member 1420. The circuit board 1410 may be coupled to the printed circuit board disposed under the base 1430. The circuit board 1410 may be disposed under the lower surface of the circuit member 1420. The circuit board 1410 may be disposed on the upper surface of the base 1430. The circuit board 1410 may be disposed between the circuit member 1420 and the base 1430.

The circuit board 1410 may include a flexible printed circuit board (FPCB). The circuit board 1410 may be bent at a partial region thereof. The circuit board 1410 may supply power to the AF drive coil 1220. In an example, the circuit board 1410 may supply power to the AF drive coil 1220 by way of the support members 1600 and the upper elastic member 1510.

The circuit board 1410 may include a bore 1411 and a terminal rib 1412. However, one or more of the bore 1411 and the terminal rib 1412 of the circuit board 1410 may be omitted or modified.

The bore 1411 may be formed in the circuit board 1410. The bore 1411 may be formed in the central region of the circuit board 1410. The bore 1411 may be formed through the circuit board 1410. The bore 1411 may allow light, having passed through the lens module, to pass therethrough. The bore 1411 may be configured to have a circular shape. However, the shape of the bore 1411 is not limited thereto.

The terminal rib 1412 may be formed at the circuit board 1410. The terminal rib 1412 may be formed by bending part of the circuit board 1410 downwards. At least part of the terminal rib 1412 may be exposed to the outside. The terminal rib 1412 may be coupled to the printed circuit board disposed under the base 1430 through soldering. The lower end of the terminal rib 1412 may come into direct contact with the printed circuit board. The terminal rib 1412 may be disposed at a terminal-coupling portion 1434 of the base 1430.

The circuit member 1420 may be disposed on the base 1430. The circuit member 1420 may be disposed on the circuit board 1410. The circuit member 1420 may be disposed on the upper surface of the circuit board 1410. The circuit member 1420 may be disposed under the drive magnets 1320. The circuit member 1420 may be disposed between the drive magnets 1320 and the base 1430. The circuit member 1420 may face the drive magnets 1320. Here, when a magnetic field is generated around the circuit member 1420 by the supply of current to the circuit board 1420, the drive magnets 1320 are able to move with respect to the circuit member 1420 by virtue of the electromagnetic interaction between the circuit member 1420 and the drive magnets 1320. The circuit member 1420 may perform electromagnetic interaction with the drive magnets 1320. The circuit member 1420 may move the housing 1310 and the bobbin 1210 with respect to the base 1430 in a direction perpendicular to the optical-axis direction by virtue of electromagnetic interaction with the drive magnets 1320.

The circuit member 1420 may be provided in the corners thereof with escape cuts through which the support members 1600 pass, without being limited thereto. In another embodiment, the circuit member 1420 may be provided with through holes through which the support members 1600 pass.

The circuit member 1420 may include a board portion 1421 and an OIS drive coil 1422. However, one or more of the board portion 1421 and the OIS drive coil 1422 of the circuit member 1420 may be omitted or modified.

The board portion 1421 may be a circuit board. The board portion 1421 may be an FPCB. The board portion 1421 may be integrally formed with the OIS drive coil 1422. The support members 1600 may be coupled to the board portion 1421. The board portion 1421 may be provided with holes or escape cuts through which the support members 1600 pass. The lower ends of the support members 600 may be coupled to the lower surface of the board portion 1421 through soldering. The board portion 1421 may have a bore.

The board portion 1421 may have the bore formed therethrough. The bore in the board portion 421 may be formed so as to correspond to the bore 1411 in the board portion 1410.

The OIS drive coil 1422 may include at least one coil. The OIS drive coil 1422 may be a fine pattern coil (FP coil), which is integrally formed with the board portion 1421. The OIS drive coil 1422 may include a plurality of coils, which are spaced apart from each other. The OIS drive coil 1422 may include four coils, which are spaced apart from each other. Here, the four coils may be disposed on the coil portion 1421 such that two adjacent coils thereof define an angle of 90° therebetween. The four coils may be independently controlled. Power may be supplied to the OIS drive coil 1422 by way of the printed circuit board, the circuit board 1410 and the coil portion 1421.

The OIS drive coil 1422 may face the drive magnets 1320 in a direction parallel to the optical axis. Here, when a magnetic field is created around the OIS drive coil 1422 by the supply of current to the OIS drive coil 1422, the drive coil 1422 is able to move with respect to the OIS drive coil 1422 by virtue of electromagnetic interaction between the OIS drive coil 1422 and the drive magnets 1320. The OIS drive coil 1422 may perform electromagnetic interaction with the drive magnets 1320. The OIS drive coil 1422 is able to move the housing 1310 and the bobbin 1210 with respect to the base 1430 in a direction perpendicular to the optical axis by virtue of electromagnetic interaction with the drive magnets 1320.

The base 1430 may be disposed on the lower surface of the circuit board 1410. The circuit board 1410 may be disposed on the upper surface of the base 1430. The OIS drive coil 1420 may be disposed on the base 1430. The base 1430 may be coupled to the cover member 1100. The base 1430 may be coupled to the lower end of the side plate 1102 of the cover member 1100.

Figure 29:
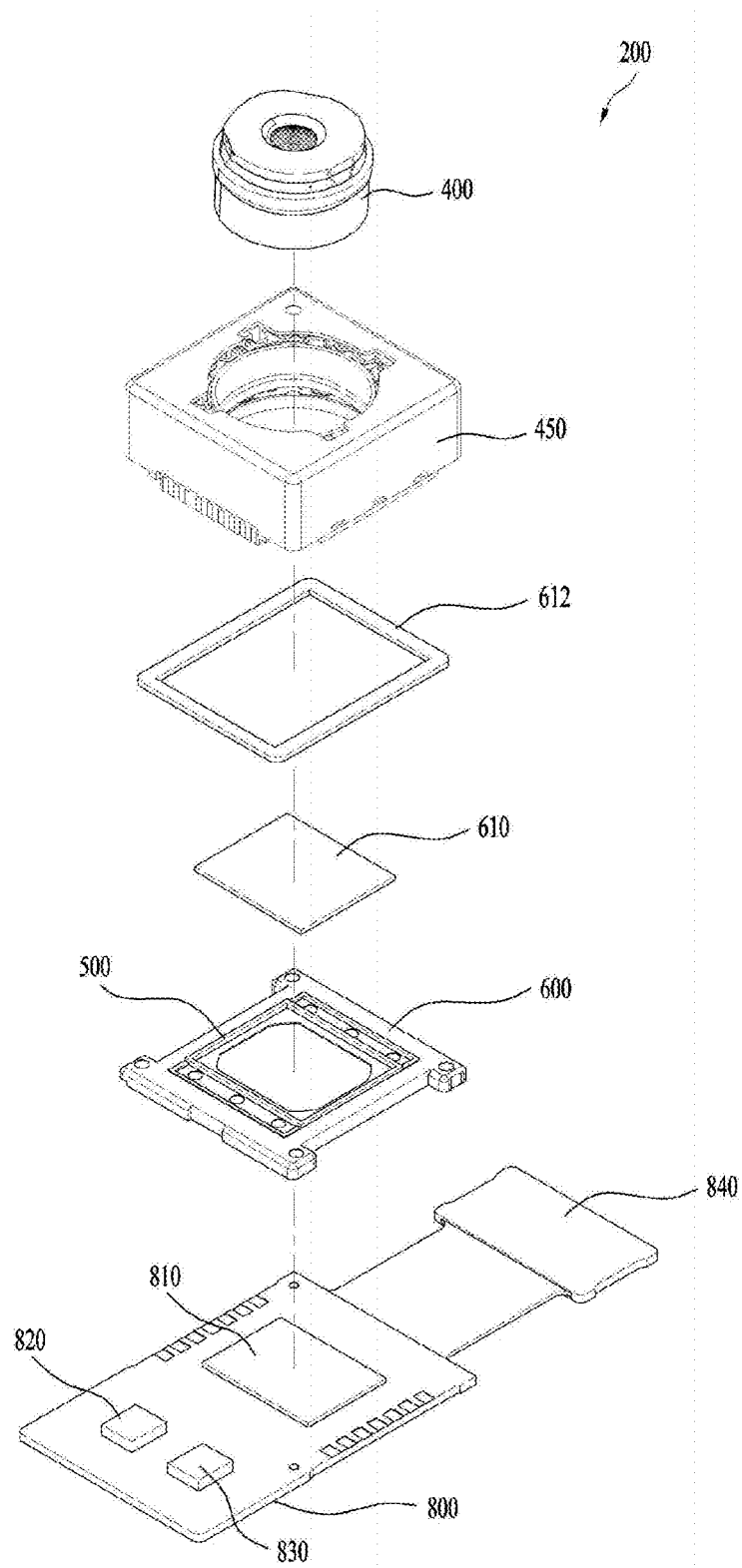
FIG. 29 is an exploded perspective view of a camera module according to an embodiment.

In a camera module, the base 1430 may be disposed on the upper surface of the printed circuit board (for example, a second holder 800 in FIG. 29). Here, an additional holder member may be disposed between the base 1430 and the printed circuit board. The base 1430 may serve as a sensor holder functioning to protect an image sensor mounted on the printed circuit board.

The base 1430 may include a bore 1431, a contaminant collector (not shown), a sensor-coupling portion 1433, a terminal-coupling portion 1434 and a depressed portion 1435. However, one or more of the bore 1431, the contaminant collector, the sensor-coupling portion 1433, the terminal-coupling portion 1434 and the depressed portion 1435 of the base 1430 may be omitted or modified.

The bore 1431 may be formed in the base 1430. The bore 1431 may be formed vertically through the base 1430. An infrared filter may be disposed in the bore 1431. Here, the infrared filter may be coupled to an additional holder member disposed under the base 1430. Light, having passed through the bore 1431 of the lens module, may be introduced into an image sensor. In other words, light, having passed through the lens module, may be introduced into the image sensor through the bore 411 in the circuit board 1410 and the bore 1431 in the base 1430. The bore 1431 may be configured to have a circular shape. However, the shape of the bore 1431 is not limited thereto.

The contaminant collector may collect contaminants, which are introduced into the lens moving apparatus. The contaminant collector may include a recess, which is formed by depressing the upper surface of the base 1430, and an adhesive portion disposed in the recess. The adhesive portion may include an adhesive material. Contaminants, which are introduced into the lens moving apparatus, may adhere to the adhesive portion.

The OIS feedback sensor 1800 may be disposed in the sensor-coupling portion 1433. The sensor-coupling portion 1433 may accommodate at least part of the OIS feedback sensor 1800. The sensor-coupling portion 1433 may be a groove, which is formed by depressing the upper surface of the base 1430. The sensor-coupling portion 1433 may be positioned so as to be spaced apart from the contaminant collector. The sensor-coupling portion 1433 may be composed of a plurality of grooves. For example, the sensor-coupling portion 1433 may be composed of two grooves. In this case, each of the two grooves is provided with the OIS feedback sensor 1800 disposed therein.

The terminal rib 1412 of the circuit board 1410 may be disposed on the terminal-coupling portion 1434. The terminal-coupling portion 1434 may be embodied as a groove, which is formed by depressing part of a lateral side surface of the base 1430. The terminal-coupling portion 1434 may receive at least part of the terminal rib 1412 of the circuit board 1410. The terminal-coupling portion 1434 may have a width that corresponds to the width of the terminal rib 1412. The terminal-coupling portion 1434 may have a length that corresponds to the length of the terminal rib 1412 of the circuit board 1410.

The depressed portion 1435 may be formed in the side surface of the base 1430. The depressed portion 1435 may be formed throughout the entire outer peripheral surface of the base 1430. The depressed portion 1435 may be formed by depressing an upper portion of the side surface of the base 1430. Alternatively, the depressed portion 1435 may be formed by causing a lower portion of the side surface of the base 1430 to protrude. The lower end of the side plate 1102 of the cover member 1100 may be disposed in the depressed portion 1435.

The first support member 1500 may be coupled both to the bobbin 1210 and to the housing 1310.

The first support member 1500 may elastically support the bobbin 1210. At least part of the first support member 1500 may have elasticity. The first support member 1500 may be referred to as a 'first elastic member'. The first support member 1500 may support the bobbin 1210 in a movable manner. The first support member 1500 may support the bobbin 1210 such that the bobbin 1210 is movable with respect to the housing 1310 in the optical-axis direction. In other words, the first support member 1500 may support the bobbin 1210 such that the bobbin 1210 performs AF drive. In this case, the first support member 1500 may be referred to as an 'AF support member'.

The first support member 1500 may include the upper elastic member 510 and the lower elastic member 520. However, one or more of the upper elastic member 1510 and the lower elastic member 1520 of the first support member 1500 may be omitted or modified.

The upper elastic member 1510 may be disposed above the bobbin 1210, and may be coupled both to the bobbin 1210 and to the housing 1310. The upper elastic member 1510 may be coupled to both the bobbin 1210 and the housing 1310. The upper elastic member 1510 may be coupled both to an upper portion of the bobbin 1210 and to an upper portion of the housing 1310. The upper elastic member 1510 may elastically support the bobbin 1210. At least part of the upper elastic member 1510 may have elasticity. The upper elastic member 1510 may support the bobbin 1210 in a movable manner. The upper elastic member 1510 may support the bobbin 1210 such that the bobbin 1210 is movable with respect to the housing 1310 in the optical-axis direction. The upper elastic member 1510 may be embodied as a leaf spring.

The upper elastic member 1510 may include two upper springs 1501 and 1502, which are spaced apart from each other. The two upper springs 1501 and 1502 may be coupled to a pair of lead wires of the AF drive coil 1220. The two upper springs 1501 and 1502 may be used as conductive lines for supplying power to the AF drive coil 1220. The upper springs 1501 and 1502 may have elasticity. Here, each of the upper springs 1501 and 1502 may be referred to as a "support unit" or "elastic unit".

The upper elastic member 1510 may include the first outer frame 1511, the first inner frame 1512, a first connecting portion 1513 and a coupling portion 1514. However, one or more of the first outer frame 1511, the first inner frame 1512, the first connecting portion 1513 and the coupling portion 514 of the upper elastic member 1510 may be omitted or modified.

The first outer frame 1511 may be coupled to the housing 1310. The first outer frame 1511 may be coupled to an upper portion of the housing 1310. The first outer frame 1511 may include a hole or groove, which is coupled to the upper coupling portion 1313 of the housing 1310.

The first inner frame 1512 may be coupled to the bobbin 1210. The first inner frame 1512 may be coupled to an upper portion of the bobbin 1210. The first inner frame 1512 may be coupled to the upper coupling portion 1213 of the bobbin 1210. The first inner frame 1512 may include a hole or groove, which is coupled to the upper coupling portion 1213 of the bobbin 1210.

The first connecting portion 1513 may connect the first outer frame 1511 to the first inner frame 1512. The connecting portion 1513 may elastically connect the first outer frame 1511 to the first inner frame 1512. The first connecting portion 1513 may have elasticity. Here, the first connecting portion 1513 may be referred to as a 'first elastic portion'. The first connecting portion 1513 may be bent twice or more.

The coupling portion 1514 may be coupled to the second support members 1600. The coupling portion 1514 may be coupled to the second support members 1600 through soldering. In an example, the coupling portion 1514 may include holes through which the second support members 1600 pass. In another example, the coupling portion 1514 may include grooves into which the second support members 1600 are coupled. The coupling portion 1514 may extend from the first outer frame 1511. The coupling portion 1514 may extend outwards from the first outer frame 1511. The coupling portion 1514 may include a bent portion.

The lower elastic member 1520 may be disposed under the bobbin 1210, and may be coupled both to the bobbin 1210 and to the housing 1310. The lower elastic member 1520 may be coupled both to the bobbin 1210 and to the housing 1310. The lower elastic member 1520 may be coupled both to a lower portion of the bobbin 1210 and to a lower portion of the housing 1310. The lower elastic member 1520 may elastically support the bobbin 1210. At least part of the lower elastic member 1520 may have elasticity. The lower elastic member 1520 may support the bobbin 1210 in a movable manner. The lower elastic member 1520 may support the bobbin 1210 such that the bobbin 1210 is movable with respect to the housing 1310 in the optical-axis direction. The lower elastic member 1520 may be embodied as a leaf spring. In an example, the lower elastic member 1520 may be integrally formed.

The lower elastic member 1520 may include the second outer frame 1521, the second inner frame 1522 and a second connecting portion 523. However, one or more of the second outer frame 1521, the second inner frame 1522 and the second connecting portion 1523 of the lower elastic member 1520 may be omitted or modified.

The second outer frame 1521 may be coupled to the housing 1310. The second outer frame 1521 may be coupled to a lower portion of the housing 1310. The second outer frame 1521 may be coupled to the lower coupling portion of the housing 1310. The second outer frame 1521 may include a hole or groove, which is coupled to the lower coupling portion of the housing 1310.

The second inner frame 1522 may be coupled to the bobbin 1210. The second inner frame 1522 may be coupled to a lower portion of the bobbin 210. The second inner frame 1522 may be coupled to the lower coupling portion of the bobbin 210. The second inner frame 1522 may include a hole or groove, which is coupled to the lower coupling portion of the bobbin 1210.

The second connecting portion 1523 may connect the second outer frame 1521 to the second inner frame 1522. The second connecting portion 1523 may elastically connect the second outer frame 1521 to the second inner frame 1522. The second connecting portion 1523 may have elasticity. Here, the second connecting portion 1523 may be referred to as an "elastic portion". The second connecting portion 1523 may be bent twice or more.

The second support members 1600 may be coupled both to the housing 1310 and to the stationary unit 1400.

The second support members 1600 may support the housing 1310 in a movable manner. The second support members 1600 may elastically support the housing 1310. At least part of each of the second support members 1600 may have elasticity. Here, the second support members 1600 may be referred to as 'second elastic members'. In an example, the second support members 1600 may support the housing 1310 with respect to the stationary unit 1400 in a direction perpendicular to the optical-axis direction. The bobbin 1210 may move along with the housing 1310. In another example, the second support members 1600 may support the housing 1310 such that the housing 1310 is tiltable with respect to the stationary unit 1400. In other words, the second support members 1600 may support the housing 1310 and the bobbin 1210 such that the housing 1310 and the bobbin 1210 perform OIS drive. Here, the second support members 1600 may be referred to as 'OIS support members'. In an example, the second support members 1600 may be embodied as wires. In another example, the second support members 1600 may be embodied as leaf springs.

The lower ends of the second support members 1600 may be coupled to the circuit board 410. The second support members 1600 may extend through the circuit board 1410. In this configuration, the lower ends of the second support members 1600 may be coupled to the lower surface of the circuit board 1410. The upper ends of the second support members 1600 may be coupled to the coupling portion 1514 of the upper elastic member 1510. The upper ends of the second support members 1600 may extend through the coupling portion 1514 of the upper elastic member 1510. In this configuration, the upper ends of the second support members 1600 may be coupled to the upper surface of the coupling portion 1514 of the upper elastic member 1510 through soldering.

In a modification, the lower ends of the second support members 1600 may be coupled to the board portion 1421 of the circuit member 1420, and the circuit member 1420 may support the movable unit 1300 in a movable manner.

In another embodiment, the lower ends of the second support members 1600 may be coupled to the base 1430. The upper ends of the second support members 1600 may be coupled to the housing 1310. The configuration of the second support members 1600 are not limited thereto, and any configuration of the second support members 1600 may be provided as long as it is possible to support the second movable unit 1300 such that the second movable unit 1300 is movable with respect to the stationary unit 1400.

The second support members 1600 may include a plurality of second support members. The second support members 1600 may include a plurality of wires. The upper ends of the plurality of wires may be coupled to the upper elastic member 1510. The lower ends of the plurality of wires may be coupled to the circuit board 1410. The plurality of wires may be used as conductive lines.

A damper (not shown) may be disposed at the second support members 1600. The damper may be disposed at the second support members 1600 and the housing 1310. The damper may be disposed at the first support member 1500. The damper may be disposed at the first support member 1500 and/or the second support members 1600 so as to inhibit a resonance phenomenon from occurring in the first support member 1500 and/or the second support members 1600. A shock absorber may be provided to one or more of the first support member 1500 and the second support members 1600. The shock absorber may be formed by changing the shape of part of the first support member 1500 and/or the second support members 1600.

The AF feedback sensor may be provided for autofocus feedback. The AF feedback sensor may detect movement of the bobbin 1210 in the optical-axis direction. The AF feedback sensor may detect an amount of movement of the bobbin 1210 in the optical-axis direction and may provide the controller with the detected amount of movement in real time. The AF feedback sensor may be disposed at the bobbin 1210. The AF feedback sensor may be disposed at the housing 1310. For example, the AF feedback sensor may be a hall sensor. In this case, a sensing magnet, which is detected by the AF feedback sensor, may be further disposed.

The OIS feedback sensor 1800 may be provided for handshake correction feedback. The OIS feedback sensor 1800 may detect movement of the housing 1310. The OIS feedback sensor 1800 may detect movement or tilting of the housing 1310 and/or the bobbin 1210 in a direction perpendicular to the optical-axis direction The OIS feedback sensor 1800 may detect the intensity of a magnetic field of the drive magnets 1320. The OIS feedback sensor 1800 may detect the intensity of a magnetic field of the drive magnets 1320 disposed at the housing 1310. The OIS feedback sensor 1800 may detect the position of the housing 1310. The OIS feedback sensor 1800 may detect the amount of movement of the housing 1320 in a direction perpendicular to the optical axis. Here, the amount of movement of the housing 1310 in a direction perpendicular to the optical axis may correspond to the amount of movement of the bobbin 1210 and the lens module coupled to the bobbin 1210.

The OIS feedback sensor 180 may be disposed at the stationary unit 1400. The OIS feedback sensor 180 may be disposed on the lower surface of the circuit board 1410. The OIS feedback sensor 1800 may be conductively connected to the circuit board 1410. The OIS feedback sensor 1800 may be disposed at the base 1430. The OIS feedback sensor 1800 may be accommodated in the sensor-coupling portion 1433 formed in the upper surface of the base 1430. The OIS feedback sensor 1800 may be a hall sensor. The OIS feedback sensor 1800 may be a hall integrated circuit (Hall IC). The OIS feedback sensor 1800 may detect the magnetic force of the drive magnets 1320. In other words, the OIS feedback sensor 1800 may detect variation in magnetic force attributable to movement of the drive magnets 1320, and may thus detect an amount of displacement of the housing 1310 when the housing 1310 moves. The OIS feedback sensor 1800 may include a plurality of OIS feedback sensors. For example, two OIS feedback sensors 1800 may be provided so as to detect movement of the housing 1310 in the x-axis and y-axis directions (the optical axis is the z-axis).

Figure 24:
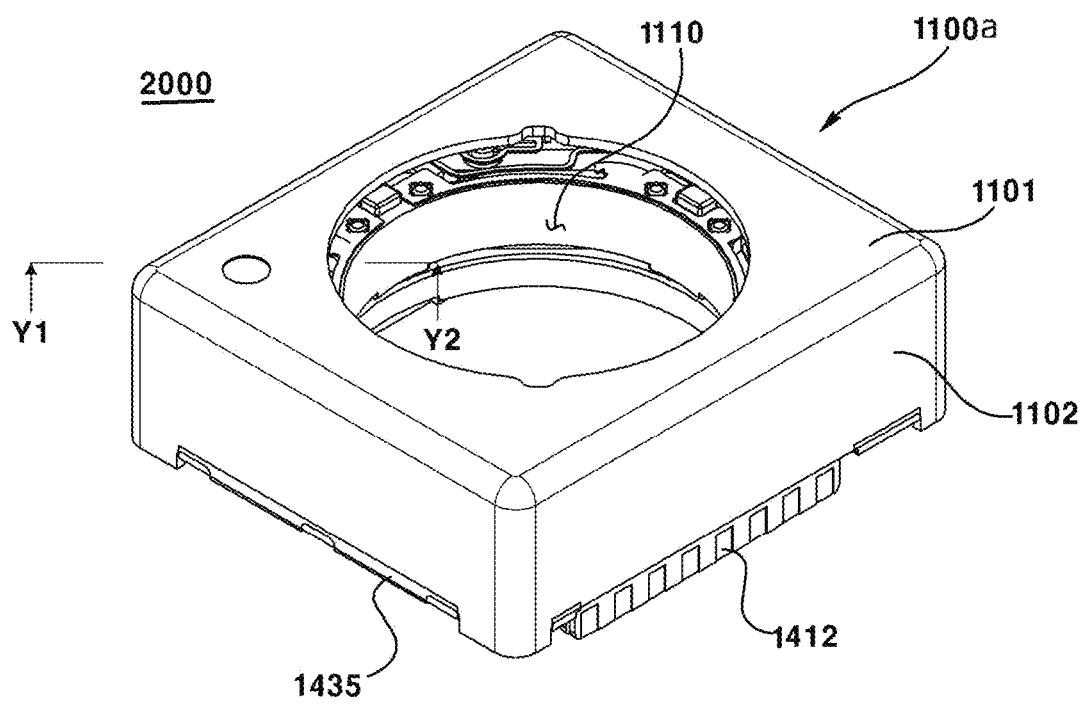
FIG. 24 is a perspective view of a lens moving apparatus according to a further embodiment.
Figure 25:
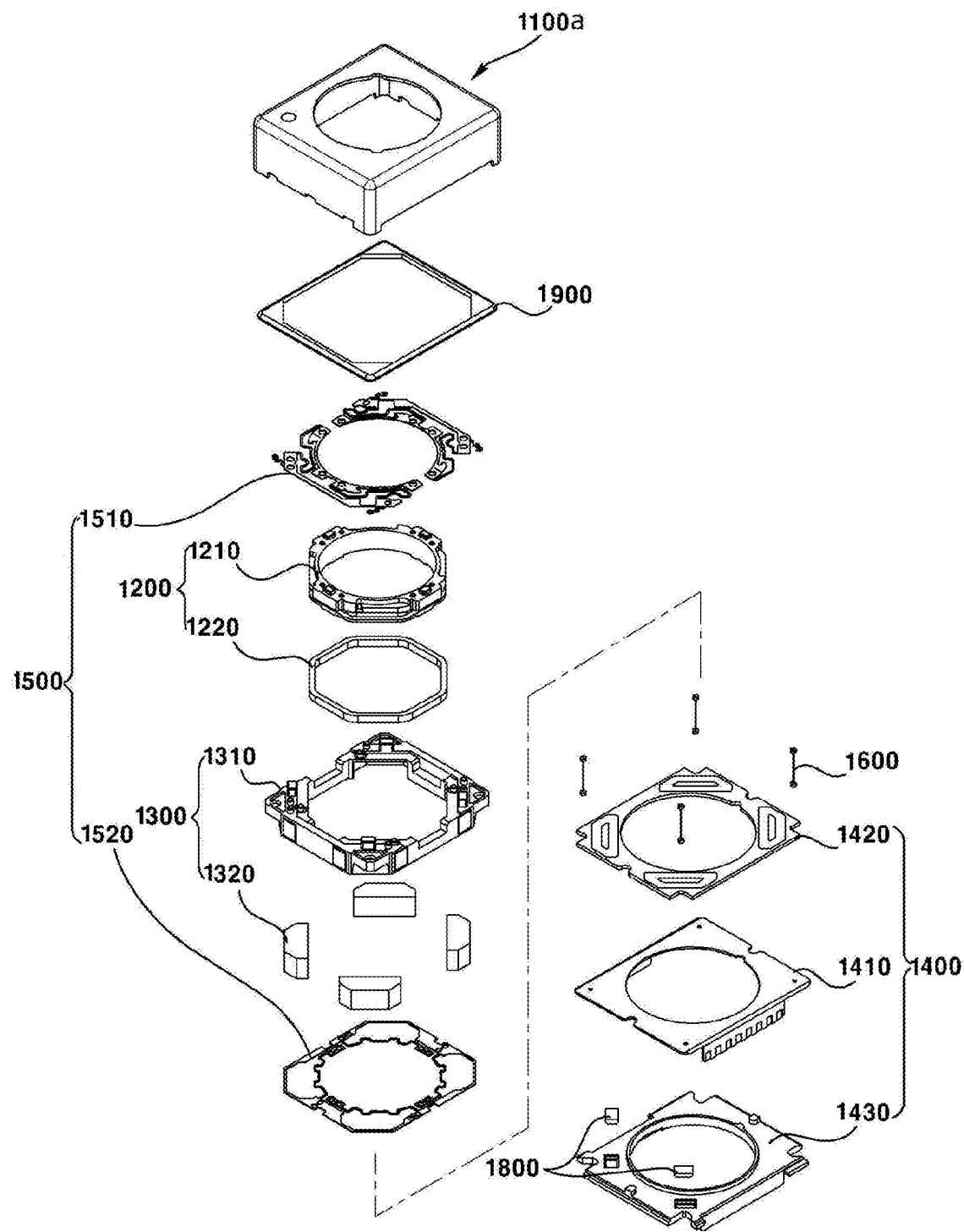
FIG. 25 is an exploded perspective view of the lens moving apparatus illustrated in FIG. 24.
Figure 27:
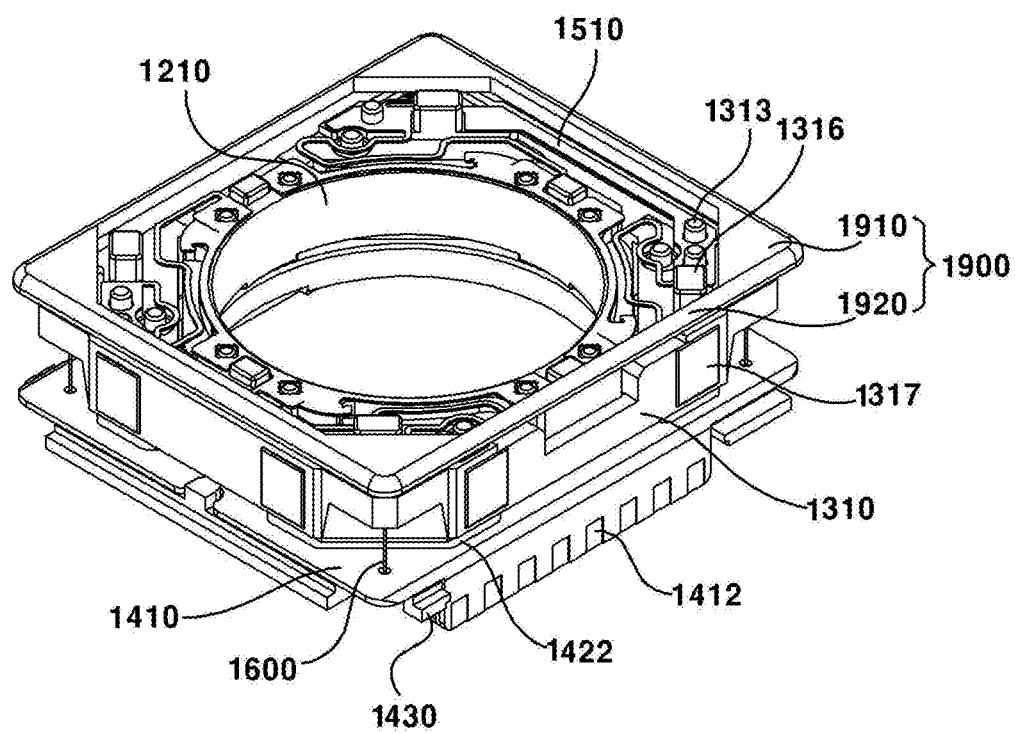
FIG. 27 is a perspective view of the lens moving apparatus illustrated in FIG. 24, from which a cover member 1100a is removed.
Figure 28:
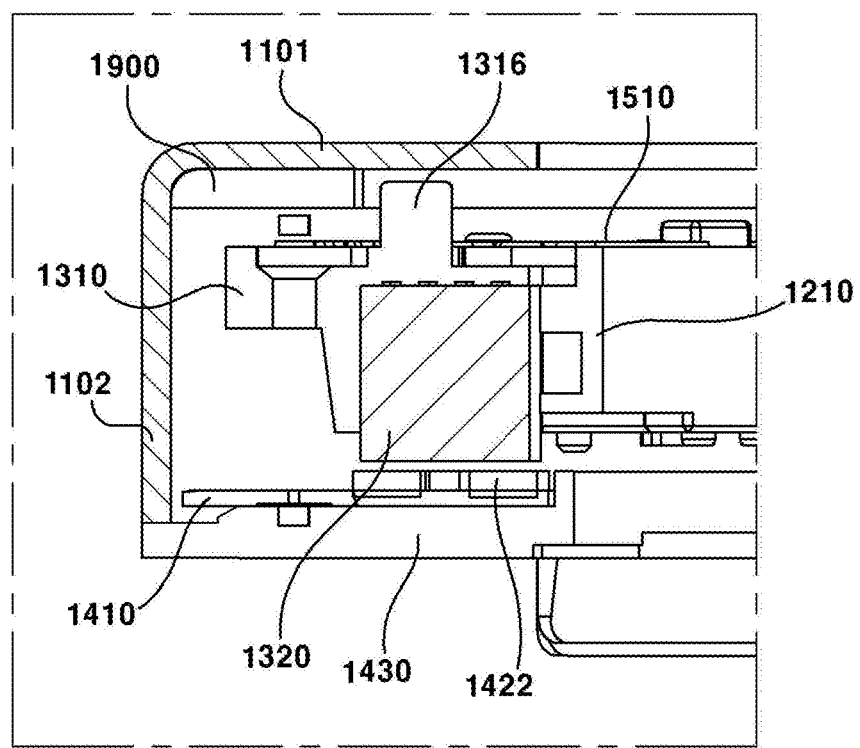
FIG. 28 is a cross-sectional view taken along line Y1-Y2 in FIG. 24.

FIG. 24 is a perspective view of a lens moving apparatus 2000 according to a further embodiment, and FIG. 25 is an exploded perspective view of the lens moving apparatus 2000 illustrated in FIG. 24. FIG. 26 is an exploded perspective view of some components of the lens moving apparatus 2000 illustrated in FIG. 25, and FIG. 27 is a perspective view of the lens moving apparatus 2000 illustrated in FIG. 24, from which a cover member 1100a is removed. FIG. 28 is a cross-sectional view taken along line Y1-Y2 in FIG. 24.

The lens moving apparatus 2000 may include the cover member 1100a, the first movable unit 1200, the second movable unit 1300, the stationary unit 1400, the first support member 1500, the second support members 1600 and the AF and OIS feedback sensors 1800.

The description of the cover member 1100, the first movable unit 1200, the second movable unit 1300, the stationary unit 1400, the first support member 1500, the second support members 1600 and the AF and OIS feedback sensors 1800 of the lens moving apparatus 1000, which are illustrated in FIGS. 18 and 19, may also be taken as a description of the cover member 1100a, the first movable unit 1200, the second movable unit 1300, the stationary unit 1400, the first support member 1500, the second support members 1600 and the AF and OIS feedback sensors 1800 of the lens moving apparatus 2000. Hereinafter, a description will be given of characteristics of this embodiment that are different from those of the embodiment illustrated in FIGS. 18 and 19.

The depressed portion 1120 may be omitted in the embodiment illustrated in FIG. 24, and a spacer 1900, which serves as the depressed portion 1120, may be provided as a separate component independent of the cover member 1100.

The cover member 1100*a* may be configured to have a rectangular parallelepiped shape with a lower surface being open. In other words, the cover member 1100*a* illustrated in FIG. 14 may have no depressed portion 1120, compared to the embodiment illustrated in FIGS. 18 and 19.

The spacer 1900 may be disposed inside the upper corners of the cover member 1100*a*. The spacer 1900 may be disposed above the housing 1310. At least part of the spacer 1900 may overlap the stoppers 1316 in a direction perpendicular to the optical axis. Consequently, the spacer 1120 according to the embodiment may serve as a mechanical stopper for the housing 1310, which functions in a diagonal direction.

The spacer 1900 may include corner portions 1910 and side portions 1920. However, one or more of the corner portions 1910 and the side portions 1920 of the spacer 1900 may be omitted or modified.

The corner portions 1910 may be disposed inside the upper corners of the cover member 1100*a*. The corner portions 1910 may be brought into contact with the stoppers 1316 by the movement of the housing 1310. Accordingly, the corner portions 1910 may serve as mechanical stoppers for the housing 1310. When viewed from above, each of the corner portions 1910 may have the shape of an isosceles right triangle. The thickness of the corner portion 1910 may correspond to the height of the depressed portion 1120 (height of the connecting plate 1122) of the embodiment illustrated in FIGS. 18 and 19. The corner portions 1910 may be disposed at the four upper corners of the cover member 1100*a*. Consequently, the four corner portions 1901 may serve as mechanical stoppers, which interact with stoppers 1316 at four locations that correspond to the diagonal directions. The four corner portions 1910 may be connected to one another via the side portions 1920.

Since the corner portions 1910 of the spacer 1900, which serve as mechanical stoppers for the housing 1310, are positioned at the corners of the cover member 1100*a*, the directions of movement of the housing 1310 may coincide with the directions of disposition of the mechanical stopper. In this case, the stroke dispersion of the housing 1310 may be reduced. For reference, the housing 1310 may move in diagonal directions by virtue of the drive magnets 1320, which are provided as corner magnets.

The side portions 1920 may connect the plurality of corner portions 1910 to each other. The side portions 1920 may be disposed at the side edges of the cover member 1100*a*, at which the top plate 1101 meets the side plate 1102. The side portions 1920 may be coupled to the inner surface of the cover member 1100.

FIG. 29 is an exploded perspective view illustrating a camera module 200 according to an embodiment.

Referring to FIG. 29, the camera module 200 may include a lens module 400, the lens moving apparatus 450, an adhesive member 710, a filter 610, a first holder 600, a second holder 800, an image sensor 810, a motion sensor 820, a controller 830, and a connector 840.

The lens module 400 may be mounted in the bobbin 110 or 1210 of the lens moving apparatus 450.

The lens moving apparatus 450 may be one of the lens moving apparatuses 100, 1000 and 2000 according to the previous embodiments.

The lens module 400 may include at least one lens. The lens module 400 may include a lens and a lens barrel. The lens module 400 may include one or more lenses (not shown) and a lens barrel accommodating the lenses. The configuration of the lens module 400 is not limited to a lens barrel, and the lens module 400 may have any other configuration as long as the lens module can support one or more lenses. The lens module 400 may be moved along with the bobbin 210 or 1210. The lens module 400 may be coupled to the bobbin 210 or 1210 via an adhesive (not shown). In an example, the lens module 400 may be threaded with the bobbin 210 or 1210. The light that has passed through the lens module 400 may be radiated to the image sensor.

The first holder 600 may be located under the base 210 of the lens moving apparatus 450. The filter 610 may be mounted on the first holder 600, and the first holder 600 may have a raised portion 500 on which the filter 610 is seated.

The adhesive member 612 may couple or attach the base 210 or 1430 of the lens moving apparatus 450 to the first holder 600. In addition to the attachment function described above, the adhesive member 612 may serve to inhibit contaminants from entering the lens moving apparatus 450.

The adhesive member 612 may be, for example, epoxy, thermohardening adhesive, ultraviolet hardening adhesive or the like.

The filter 610 may serve to inhibit light within a specific frequency band, having passed through the lens module 400, from being introduced into the image sensor 810. The filter 610 may be an infrared-light-blocking filter, without being limited thereto. Here, the filter 610 may be oriented parallel to the X-Y plane.

The filter 610 may be disposed between the lens module 400 and the image sensor 810. In an example, the filter 610 may be disposed at the first holder 600, which is provided independently of the base 210 or 1430. In another example, the filter 610 may be mounted in the bore or through hole 1431 in the base 210 or 1430.

The region of the first holder 600 in which the filter 610 is mounted may be provided with a bore or a through hole so as to allow the light that passes through the filter 610 to be introduced into the image sensor 810.

For example, the filter 610 may be made of film material or glass material. The filter 610 may be manufactured by applying infrared screening coating material to a flat plate-shaped optical filter such as a cover glass for protecting an imaging area. In an example, the filter 610 may be an infrared-absorbing filter. In another example, the filter 610 may be an infrared-reflecting filter.

The second holder 800 may be disposed under the first holder 600, and the image sensor 810 may be mounted on the second holder 800. The light that passes through the filter 610 is introduced into the image sensor 810 so as to form an image on the image sensor 810.

The second holder 800 may include, for example, various circuits, devices, and a controller in order to convert the image, formed on the image sensor 810, into electrical signals and to transmit the electrical signals to an external component.

The image sensor 810 may be mounted on the second holder 800 using surface-mount technology (SMT), and a circuit pattern may be formed on the second holder 800. For example, the second holder 800 may be embodied as a circuit board, such as a PCB or FPCB, to which various devices are coupled. In another example, the image sensor may be coupled to the second holder 800 using a flip-chip mounting technology.

The image sensor 810 may receive an image contained in the light introduced through the lens moving apparatus, and may convert the received image into electrical signals.

The filter 610 and the image sensor 810 may be disposed so as to be spaced apart from each other while facing each other in the first direction.

For example, the image sensor 810 and the lens module 400 may be positioned such that optical axes thereof coincide with each other. In other words, the optical axis of the image sensor 810 may be aligned with the optical axis of the lens module 400. Consequently, the image sensor 810 may be irradiated with light that has passed through the lens module 400. The image sensor 810 may convert light, which is radiated to an effective imaging area, into electrical signals. The image sensor 810 may be, for example, one of a charge-coupled device (CCD), a metal oxide semiconductor (MOS), CPD and CID. However, the kind of the image sensor is not limited thereto, and the image sensor may have any configuration, as long as it is possible to convert incident light into electrical signals.

The motion sensor 820 may be mounted on the second holder 800, and may be conductively connected to the controller 830 through the circuit pattern formed on the second holder 800.

The motion sensor 820 outputs rotational angular speed information regarding the movement of the camera module 200. The motion sensor 820 may be embodied as a dual-axis or triple-axis gyro sensor or an angular speed sensor.

The controller 830 may be mounted on the second holder 800, and may be conductively connected to the second position sensor 240 or 1800 and the second coil 230 or 1420 of the lens moving apparatus 450. For example, the second holder 800 may be conductively connected to the circuit board 250 or 1410 of the lens moving apparatus 450, and the controller 820 mounted on the second holder 800 may be conductively connected to the second position sensor 240 or 1800 and the second coil 230 or 1420 through the circuit board 250 or 1410.

The controller 830 may output a driving signal, which is capable of performing handshake correction for the OIS movable unit of the lens moving apparatus 450, based on output signals provided from the second position sensor 240 or 1800 of the lens moving apparatus 450.

The controller 830 may individually control direction, intensity, amplitude or the like of current supplied to the first coil 120 or 1220 and the second coil 230 or 1420 of the lens moving apparatus 450.

The controller 830 may perform one or more of autofocus function and a handshake correction function of the camera module 200 by controlling the lens moving apparatus 450. In other words, the controller 830 may move or tilt the lens module 400 in the optical axis direction or in a direction perpendicular to the optical axis by controlling the lens moving apparatus 450. Furthermore, the controller 830 may perform one or more of feedback control of autofocus function and feedback control of handshake correction function.

The controller 830 may perform feedback control of an autofocus function in such a manner as to receive positions of the bobbin 210 and the housing 310 detected by the first position sensor 170 and then to control current applied to the first coil 120 or 1220 based on the received positional result.

For example, the first position sensor 170 disposed at the housing 140 or 1310 detects a magnetic field of the second magnet 180, which is a sensing magnet disposed at the bobbin 110 or 1210.

When the bobbin 110 or 1210 moves with respect to the housing 140 or 1310, the amount of a magnetic field detected by the first position sensor 170 varies. The first position sensor 170 detects an amount of movement of the bobbin 110 or 1210 or the position of the bobbin 110 or 1210 in this way, and transmits the detected value to the controller 830.

The controller 830 determines whether further movement of the bobbin 110 or 1210 is performed based on the received detected value. Since this procedure is performed in real time, it is possible to more precisely perform an autofocus function of the camera module according to the embodiment through autofocus feedback control.

In addition, the controller 830 may perform feedback control of handshake correction in such a manner as to receive positions of the bobbin 210 and the housing 1310 detected by the second position sensor 240 or 1800 and then to control current applied to the second coil 230 or 1420.

For example, when power or a driving signal is supplied to the second coil 230 or 1420, the magnets 130 or 1320 move with respect to the second coil 230 or 1420 by virtue of electromagnetic interaction between the second coil 230 or 1420 and the magnets 130 or 1320. At this time, the housing 140 or 1310 with the magnets 130 or 1320 coupled thereto moves along with the magnets 130 or 1320. In other words, the housing 140 or 1310 moves with respect to the base 210 or 1430 in a horizontal direction (in a direction perpendicular to the optical axis). At this time, the housing 140 or 1310 may be tilted with respect to the base 210 or 1430. Meanwhile, as the housing 140 or 1310 moves in a horizontal direction, the bobbin 110 or 1210 moves along with the housing 140 or 1310. The movement of the housing 140 or 1310 causes the lens module 400 coupled to the bobbin 110 or 1210 to be moved with respect to the image sensor 810 in a direction parallel to a direction toward the image sensor 810. In other words, the embodiment is able to perform handshake correction by supplying power to the second coil 230 or 1420.

In order to realize more precise handshake correction function of the camera module, feedback control of handshake correction may be performed. The second position sensor 240 or 1800 disposed on the base 210 or 1430 detects a magnetic field of the magnets 130 or 1320 disposed on the housing 140 or 1310. Accordingly, when the housing 140 or 1310 moves with respect to the base 210 or 1430, the size of a magnetic field detected by the second position sensor 240 or 1800 varies. The pair of sensors 240a and 240b or 1800 detect an amount of movement or a position of the housing 140 or 1310 in horizontal directions (in the x-axis and y-axis directions) in this way, and transmits the detected value to the controller 830. The controller 830 determines whether further movement of the housing 140 or 1310 is performed based on the received detected value. Since this procedure is performed in real time, it is possible to more precisely perform handshake correction function of the camera module according to the embodiment through feedback control of handshake correction.

The connector 840 may be conductively connected to the second holder 800, and may have a port for electrical connection of an external component.

The lens moving apparatus 100 according to the embodiment may be embedded in an optical instrument, which is intended to form an image of an object in a space so as to increase a user's visual perception using reflection, refraction, absorption, interference, diffraction and the like, which are properties of light, which is intended to record an image formed through a lens and to reproduce the image, or which is intended to perform optical measurement, propagation or transmission of an image or the like.

For example, the optical instrument according to the embodiment may be any one of a mobile phone, a smartphone, a portable smart device, a digital camera, a laptop computer, a digital broadcasting terminal, a Personal Digital Assistant (PDA), a Portable Multimedia Player (PMP), and a navigation tablet PC, but is not limited thereto. The optical instrument is not limited thereto, and any kind of device for capturing an image or a photograph may be referred to as the optical instrument.

Figure 30:
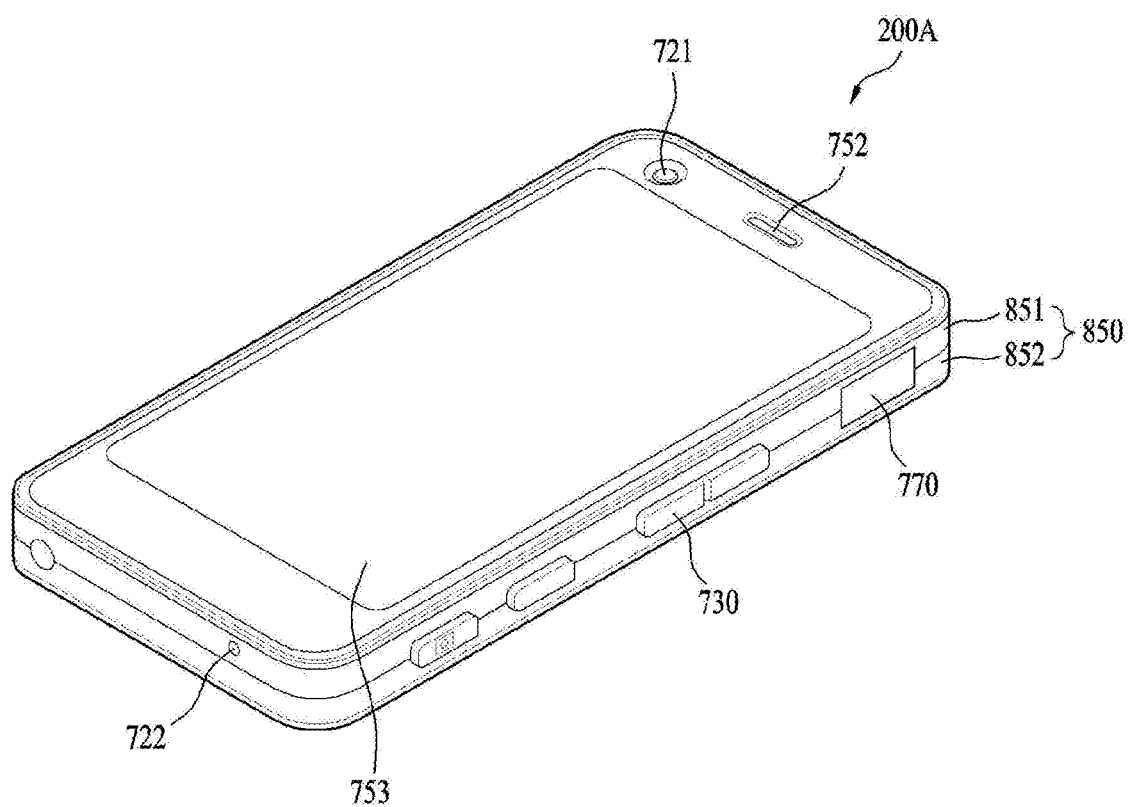
FIG. 30 is a perspective view illustrating a portable terminal according to an embodiment.
Figure 31:
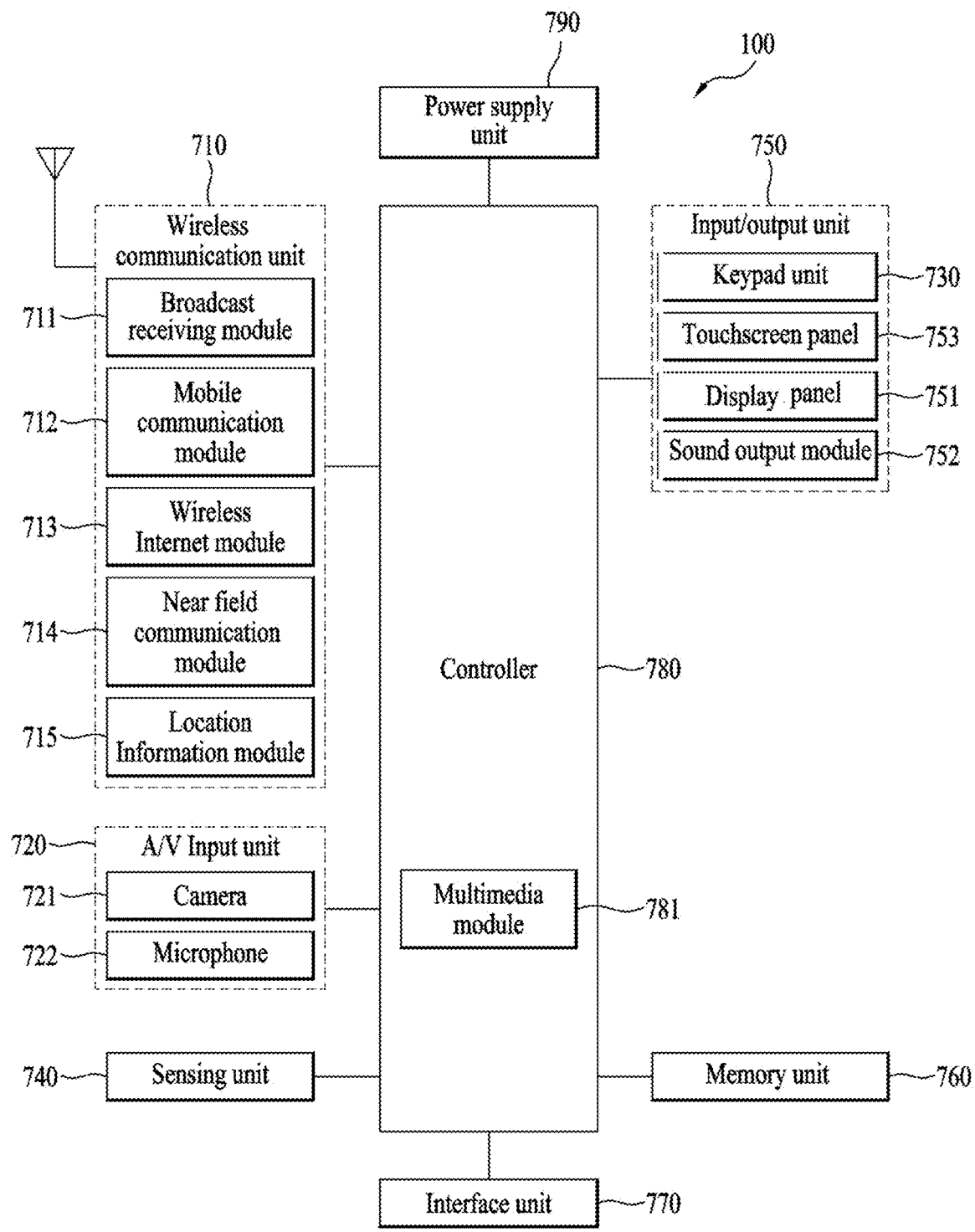
FIG. 31 is a view illustrating the configuration of the portable terminal illustrated in FIG. 30.

FIG. 30 is a perspective view illustrating a portable terminal 200A according to an embodiment. FIG. 31 is a view illustrating the configuration of the portable terminal illustrated in FIG. 30.

Referring to FIGS. 30 and 31, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 30 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. A variety of electronic components of the terminal may be mounted in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast reception module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera module 200 illustrated in FIG. 30.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. For example, when the terminal 200A is a slide-type phone, the sensing unit 740 may detect whether the slide-type phone is open or closed. In addition, the sensing unit 740 serves to sense, for example, whether power is supplied from the power supply unit 790, or whether the interface unit 770 is coupled to an external component.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touch screen panel 753. The keypad unit 730 may generate input data in response to input to a keypad.

The display module 751 may include a plurality of pixels, the color of which varies in response to electrical signals. For example, the display module 751 may include at least one of a liquid crystal display, a thin-film transistor liquid crystal display, an organic light-emitting diode display, a flexible display and a 3D display.

The sound output module 752 may output audio data received from the wireless communication unit 710 in, for example, a call-signal-receiving mode, a call mode, a recording mode, a voice recognition mode, or a broadcast-receiving mode, or may output audio data stored in the memory unit 760.

The touch screen panel 753 may convert variation in capacitance, caused by a user's touch on a specific region of a touch screen, into electrical input signals.

The memory unit 760 may store programs for the processing and control of the controller 780, and may temporarily store input/output data (e.g. a phone book, messages, audio, still images, pictures, and moving images). For example, the memory unit 760 may store images captured by the camera 721, for example, pictures or moving images.

The interface unit 770 serves as a passage for connection between the terminal 200A and an external component. The interface unit 770 may receive power or data from the external component, and may transmit the same to respective constituent elements inside the terminal 200A, or may transmit data inside the terminal 200A to the external component. For example, the interface unit 770 may include, for example, a wired/wireless headset port, an external charger port, a wired/wireless data port, a memory card port, a port for the connection of a device having an identification module, an audio input/output (I/O) port, a video I/O port, and an earphone port.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be provided inside the controller 780, or may be provided separately from the controller 780.

The controller 780 may perform pattern recognition processing, by which writing or drawing input to a touch screen is perceived as characters and images, respectively.

The power supply unit 790 may supply power required to operate the respective constituent elements upon receiving external power or internal power under the control of the controller 780.

The features, configurations, effects and the like described above in the embodiments are included in at least one embodiment, but are not necessarily limited to only one embodiment. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving apparatus, which is capable of inhibiting electrical short between solders and support members, damage to bonding portions of a coil board and generation of cracks in solders, and a camera module and an optical device each including the lens moving apparatus.

The invention claimed is:

1. A lens moving apparatus comprising:
a housing;
a bobbin disposed in the housing;
a first coil disposed on the bobbin;
magnets disposed on the housing;
a coil board comprising second coils disposed under the housing so as to be spaced apart from each other and connectors connected to the second coils;
a circuit board disposed under the coil board and comprising first pads disposed at positions corresponding to the connectors; and
a conductive adhesive member for bonding the first pads to the corresponding connectors,
wherein each of the connectors comprises a recess, which is depressed from an outer surface of the coil board so as to expose an upper surface of a corresponding one of the first pads, and a bonding portion disposed near the recess, and
wherein the conductive adhesive member is disposed on an upper surface of the bonding portion and an upper surface of the first pad that is exposed through the recess so as to conductively connect the bonding portion to the first pad.

2. The lens moving apparatus according to claim 1, wherein
the conductive adhesive member is spaced apart from an outer surface of the circuit board, and is positioned inside the outer surface of the circuit board.

3. The lens moving apparatus according to claim 2, wherein the bonding portion of the coil board is disposed so as to be aligned with a corresponding one of the first pads in a direction parallel to an optical axis.

4. The lens moving apparatus according to claim 1, wherein
the conductive adhesive member protrudes from an upper surface of the coil board in a direction toward the coil board from the circuit board.

5. The lens moving apparatus according to claim 4, wherein a lower surface of the conductive adhesive member covers the upper surface of the pad of the circuit board and the upper surface of the bonding portion of the coil board.

6. The lens moving apparatus according to claim 5, wherein an upper surface of the conductive adhesive member is positioned higher than an upper surface of the coil board.

7. The lens moving apparatus according to claim 1, comprising:
upper elastic members coupled both to an upper portion of the bobbin and to an upper portion of the housing;
a lower elastic member coupled both to a lower portion of the bobbin and to a lower portion of the housing; and
support members disposed on side portions of the housing,
wherein each of the support members comprises an upper terminal portion, a lower terminal portion, and an elastic deformation portion connecting the upper terminal portion to the lower terminal portion, and
wherein each of the upper terminal portions of the support members is connected to a corresponding one of the upper elastic members.

8. The lens moving apparatus according to claim 7, wherein
the circuit board comprises at least one second pad spaced apart from the first pads, and
wherein the at least one second pad is connected to at least one of the lower terminal portions of the support members.

9. The lens moving apparatus according to claim 2, wherein at least one side of an upper surface of the circuit board is provided with two first pads, which are spaced apart from each other, and two second pads, which are spaced apart from each other, and
wherein the two second pads are positioned between the two first pads.

10. The lens moving apparatus according to claim 1, wherein the coil board further comprises wires or patterns connecting the second coils to the bonding portions of the connectors.

11. The lens moving apparatus according to claim 1, comprising:
a cover member including a top plate and a side plate; and
a base disposed under the circuit board,
wherein the housing includes a stopper protruding from an upper surface of a corner of the housing,
wherein the cover member includes a depressed portion, which is formed by depressing a corner of the top plate, and
wherein the stopper overlaps at least part of the depressed portion in a direction perpendicular to an optical axis.

12. The lens moving apparatus according to claim 1, wherein the recess is provided in a first region of at least one side of an upper surface of the coil board,
the at least one side of the upper surface of the coil board is provided with a second region, which is a remaining region excluding the first region, and
the first region is depressed lower than the second region.

13. The lens moving apparatus according to claim 2, wherein the conductive adhesive member is solder or conductive paste.

14. The lens moving apparatus according to claim 1, wherein the coil board comprises a conductive layer and an insulation layer disposed on the conductive layer, and
wherein the bonding portion is a portion of the conductive later exposed from the insulation layer.

15. The lens moving apparatus according to claim 13, wherein a first surface of the conductive adhesive member that faces toward the outer surface of the circuit board is a flat surface.

16. The lens moving apparatus according to claim 15, wherein a second surface of the conductive adhesive member is a curved surface, and the second surface of the conductive adhesive member faces the first surface of the conductive adhesive member.

17. The lens moving apparatus according to claim 9, wherein the circuit board comprises a terminal rib bent at the upper surface of the circuit board and provided with a plurality of terminals, and
wherein the plurality of terminals are conductively connected to the first pads and the second pads.

18. A lens moving apparatus comprising:
a housing;
a bobbin disposed in the housing;
a first coil disposed on the bobbin;
a magnet disposed on the housing;
a coil board comprising a second coil disposed under the housing and a connector connected to the second coil;

a circuit board disposed under the coil board and comprising a first pad; and a conductive adhesive member for bonding the first pad to the connector, wherein the connector comprises:

a recess depressed from an outer surface of the coil board so as to expose an upper surface of the first pad; and a bonding portion disposed near the recess, and wherein the conductive adhesive member conductively connects the bonding portion to the first pad.

19. The lens moving apparatus according to claim 18, wherein the conductive adhesive member is disposed on an upper surface of the bonding portion and an upper surface of the first pad exposed through the recess.

20. A camera module comprising:

a lens barrel;

a lens moving apparatus according to claim 1 for moving the lens barrel; and an image sensor.

\* \* \* \* \*